(12) United States Patent
Crawforth

(10) Patent No.: US 12,393,649 B1
(45) Date of Patent: Aug. 19, 2025

(54) LEDGER-BASED VALIDATION AND RE-ENCODING OF DIGITAL MEDIA

(71) Applicant: SWEAR Inc., Boise, ID (US)

(72) Inventor: Jason Lealand Crawforth, Boise, ID (US)

(73) Assignee: SWEAR Inc., Boise, ID (US)

( * ) Notice: Subject to any disclaimer, the term of this patent is extended or adjusted under 35 U.S.C. 154(b) by 0 days.

(21) Appl. No.: 18/664,064

(22) Filed: May 14, 2024

(51) Int. Cl.
*G06F 21/16* (2013.01)
*G06F 21/12* (2013.01)
*H04N 19/40* (2014.01)

(52) U.S. Cl.
CPC ............ *G06F 21/16* (2013.01); *G06F 21/121* (2013.01); *H04N 19/40* (2014.11)

(58) Field of Classification Search
CPC ........ G06F 21/64; G06F 21/16; G06F 21/121; G06F 21/10; H04N 5/913; H04L 2209/60; H04L 2209/605; H04L 2463/103; G11B 20/00166; G11B 20/00173

See application file for complete search history.

(56) References Cited

U.S. PATENT DOCUMENTS

| 11,163,855 | B1 * | 11/2021 | Crawforth | ................ H04L 9/14 |
| 2008/0005802 | A1 * | 1/2008 | Fierstein | .......... G11B 20/00086 726/28 |
| 2019/0163924 | A1 * | 5/2019 | Resch | ................. G06F 21/6218 |
| 2019/0318066 | A1 * | 10/2019 | Davis | ..................... G06Q 30/06 |
| 2020/0275166 | A1 * | 8/2020 | Jordan | .................... G06F 21/10 |

\* cited by examiner

*Primary Examiner* — Daniel B Potratz
(74) *Attorney, Agent, or Firm* — Holland & Hart LLP

(57) ABSTRACT

Methods, systems, and devices that support ledger-based validation and re-encoding of media data are described. A computer system may obtain a purported copy of a set of media data. The computer system may determine whether the purported copy is a valid copy of the original set of media data. Based on determining that the purported copy is a valid copy, the computer system may generate one or more additional copies of the set of media data, each of which may be encoded in accordance with a different encoding scheme, such as to support providing the one or more additional copies to other computer systems for playback. For each additional copy, the computer system may write one or more cryptographic representations of the additional copy to an immutable ledger, such as to support the validation of the additional copy when provided to another computer system for playback.

30 Claims, 11 Drawing Sheets

LEDGER-BASED VALIDATION AND RE-ENCODING OF DIGITAL MEDIA

BACKGROUND

The following relates generally to systems and techniques for validating media data, and more specifically to ledger-based validation and re-encoding of media data (e.g., digital media data).

Examples of media data include video, image, and audio data (which may in some cases include telephonic conversation data). Technology continues to develop for altering media data in ways that are imperceptible to a human consumer (e.g., a human viewer or listener), including such technologies that leverage artificial intelligence, among other examples. For example, technology continues to develop for altering image data-even at the pixel level-such that a human viewer of an altered image cannot determine that the image has been altered. Like technology continues to develop for altering other types of media data, such as video and audio data. In general, technologies for altering all types of media data continue to evolve and improve in sophistication, proliferation, case of use, and lack of detectability.

Improvements in technologies for altering media data give rise, however, to technological problems related to identifying altered media data. Absent technological solutions to such problems, altered media data may be passed off as unaltered media data, or unaltered media data may be plausibly disparaged as altered media data. Thus, technological solutions are desired for identifying altered media data and ensuring the trustworthiness of media data generally.

SUMMARY

A computer system (e.g., a media platform) may obtain (e.g., receive) a purported copy of media data. The computer system may validate the purported copy—e.g., using ledger-based techniques as described herein. If the purported copy is determined to be a valid (e.g., true) copy of the media data, the computer system may create one or more additional copies of the validated copy, each of which may additionally be considered a valid copy. Relative to the initially validated copy (e.g., the purported copy subject to the validation procedure), the computer system may re-encode each additional copy such that each additional copy is encoded differently than the initially validated copy and also differently than any other additional copy that the computer system creates based on the initially validated copy. For example, each additional copy may be encoded in accordance with a different codec, may be converted to a different file format, may be compressed in accordance with a different compression algorithm, or may be encoded to support playback with a different resolution, bit rate, or aspect ratio, or any combination thereof, among other possibilities. Encoding the additional copies differently may beneficially support subsequently distributing (e.g., streaming) the different copies to different client (e.g., playback) systems in accordance with the different capabilities or preferences of those client systems, among other possible benefits.

In some examples, for each additional copy created, the computer system may create one or more cryptographic representations (e.g., hashes) of the additional copy and write the one or more cryptographic representations of the additional copy to an immutable ledger (e.g., a blockchain or other form of distributed ledger). Thus, a client system that receives one of the additional copies (e.g., from the computer system) may validate that additional copy based on one or more corresponding entries in the immutable ledger, as the additional copy may be considered a purported copy of the media data from the perspective of the client system. For example, the client system may create one or more candidate cryptographic representations of the additional copy, which may be compared against the one or more cryptographic representations of the additional copy that were previously written to the immutable ledger in order to validate (e.g., determine the validity of) the additional copy as received by the client system.

A method is described. The method may include obtaining, by a first computer system, a purported copy of a set of media data, where the purported copy of the set of media data is encoded in accordance with a first encoding scheme, determining, by the first computer system, that at least a portion of the purported copy of the set of media data is valid, where the portion of the purported copy of the set of media data being valid is based on the portion of the purported copy being a valid copy of a corresponding portion of the set of media data, encoding, by the first computer system and based on determining that at least the portion of the purported copy of the set of media data is valid, at least the portion of the purported copy of the set of media data in accordance with a second encoding scheme that is different from the first encoding scheme to obtain a re-encoded version of the set of media data, the re-encoded version of the set of media data including a re-encoded version of the portion of the set of media data, creating, by the first computer system, one or more cryptographic representations of the re-encoded version of the set of media data, and writing the one or more cryptographic representations of the re-encoded version of the set of media data to an immutable ledger.

An apparatus is described. The apparatus may include one or more memories storing processor-executable code and one or more processors coupled with the one or more memories, the one or more processors individually or collectively operable to execute the code to cause the apparatus to obtain, by a first computer system, a purported copy of a set of media data, where the purported copy of the set of media data is encoded in accordance with a first encoding scheme, determine, by the first computer system, that at least a portion of the purported copy of the set of media data is valid, where the portion of the purported copy of the set of media data being valid is based on the portion of the purported copy being a valid copy of a corresponding portion of the set of media data, encode, by the first computer system and based on determining that at least the portion of the purported copy of the set of media data is valid, at least the portion of the purported copy of the set of media data in accordance with a second encoding scheme that is different from the first encoding scheme to obtain a re-encoded version of the set of media data, the re-encoded version of the set of media data including a re-encoded version of the portion of the set of media data, create, by the first computer system, one or more cryptographic representations of the re-encoded version of the set of media data, and write the one or more cryptographic representations of the re-encoded version of the set of media data to an immutable ledger.

Another apparatus is described. The apparatus may include means for obtaining, by a first computer system, a purported copy of a set of media data, where the purported copy of the set of media data is encoded in accordance with a first encoding scheme, means for determining, by the first computer system, that at least a portion of the purported copy of the set of media data is valid, where the portion of the purported copy of the set of media data being valid is based on the portion of the purported copy being a valid copy of a corresponding portion of the set of media data, means for encoding, by the first computer system and based on determining that at least the portion of the purported copy of the set of media data is valid, at least the portion of the purported copy of the set of media data in accordance with a second encoding scheme that is different from the first encoding scheme to obtain a re-encoded version of the set of media data, the re-encoded version of the set of media data including a re-encoded version of the portion of the set of media data, means for creating, by the first computer system, one or more cryptographic representations of the re-encoded version of the set of media data, and means for writing the one or more cryptographic representations of the re-encoded version of the set of media data to an immutable ledger.

A non-transitory computer-readable medium storing code is described. The code may include instructions executable by one or more processors to obtain, by a first computer system, a purported copy of a set of media data, where the purported copy of the set of media data is encoded in accordance with a first encoding scheme, determine, by the first computer system, that at least a portion of the purported copy of the set of media data is valid, where the portion of the purported copy of the set of media data being valid is based on the portion of the purported copy being a valid copy of a corresponding portion of the set of media data, encode, by the first computer system and based on determining that at least the portion of the purported copy of the set of media data is valid, at least the portion of the purported copy of the set of media data in accordance with a second encoding scheme that is different from the first encoding scheme to obtain a re-encoded version of the set of media data, the re-encoded version of the set of media data including a re-encoded version of the portion of the set of media data, create, by the first computer system, one or more cryptographic representations of the re-encoded version of the set of media data, and write the one or more cryptographic representations of the re-encoded version of the set of media data to an immutable ledger.

Some examples of the method, apparatuses, and non-transitory computer-readable medium described herein may further include operations, features, means, or instructions for determining, by the first computer system, that a second portion of the purported copy of the set of media data is invalid, where the second portion of the purported copy of the set of media data being invalid is based on the second portion of the purported copy not being a valid copy of a corresponding second portion of the set of media data, encoding, by the first computer system and despite determining that the second portion of the purported copy of the set of media data is invalid, the second portion of the purported copy of the set of media data in accordance with the second encoding scheme to obtain a re-encoded version of the second portion of the purported copy of the set of media data, and refraining, by the first computer system and based on determining that the second portion of the purported copy of the set of media data is invalid, from creating a cryptographic representation of the re-encoded version of the second portion of the purported copy of the set of media data.

Some examples of the method, apparatuses, and non-transitory computer-readable medium described herein may further include operations, features, means, or instructions for storing at the first computer system, outputting to a third computer system separate from the first computer system, or writing to the immutable ledger, an indication that the re-encoded version of the second portion of the purported copy of the set of media data is invalid.

Some examples of the method, apparatuses, and non-transitory computer-readable medium described herein may further include operations, features, means, or instructions for determining, by the first computer system, that a second portion of the purported copy of the set of media data is invalid, where the second portion of the purported copy of the set of media data being invalid is based on the second portion of the purported copy not being a valid copy of a corresponding second portion of the set of media data, and refraining, by the first computer system and based on determining that the second portion of the purported copy of the set of media data is invalid, from encoding the second portion of the purported copy of the set of media data in accordance with the second encoding scheme.

In some examples of the method, apparatuses, and non-transitory computer-readable medium described herein, the purported copy of the set of media data includes a plurality of portions, and encoding at least the portion of the purported copy of the set of media data in accordance with the second encoding scheme is based on determining that at least a threshold quantity of portions from among the plurality of portions are each a valid copy of a respective portion of the set of media data.

Some examples of the method, apparatuses, and non-transitory computer-readable medium described herein may further include operations, features, means, or instructions for encoding, by the first computer system and based on determining that at least the portion of the purported copy of the set of media data is valid, at least the portion of the purported copy of the set of media data in accordance with a third encoding scheme that is different from the first encoding scheme and the second encoding scheme to obtain a second re-encoded version of the set of media data, the second re-encoded version of the set of media data including a second re-encoded version of the portion of the set of media data, creating, by the first computer system, one or more cryptographic representations of the second re-encoded version of the set of media data, and writing the one or more cryptographic representations of the second re-encoded version of the set of media data to the immutable ledger.

In some examples of the method, apparatuses, and non-transitory computer-readable medium described herein, operations, features, means, or instructions for determining that at least the portion of the purported copy of the set of media data is valid may include operations, features, means, or instructions for creating, by the first computer system, a candidate cryptographic representation based on the portion of the purported copy of the set of media data, and determining that the candidate cryptographic representation matches a trusted cryptographic representation, the trusted cryptographic representation included in the immutable ledger and based on the corresponding portion of the set of media data.

In some examples of the method, apparatuses, and non-transitory computer-readable medium described herein, operations, features, means, or instructions for determining that the candidate cryptographic representation matches the trusted cryptographic representation may include operations, features, means, or instructions for receiving, by the first computer system, the trusted cryptographic representation from a second computer system associated with the immutable ledger and comparing, by the first computer system, the candidate cryptographic representation and the trusted cryptographic representation.

In some examples of the method, apparatuses, and non-transitory computer-readable medium described herein, operations, features, means, or instructions for determining that the candidate cryptographic representation matches the trusted cryptographic representation may include operations, features, means, or instructions for transmitting, by the first computer system, the candidate cryptographic representation to a second computer system associated with the immutable ledger and receiving, by the first computer system from the second computer system, an indication that the candidate cryptographic representation matches the trusted cryptographic representation.

In some examples of the method, apparatuses, and non-transitory computer-readable medium described herein, the first encoding scheme is in accordance with a first codec and the second encoding scheme is in accordance with a second codec that is different than the first codec.

In some examples of the method, apparatuses, and non-transitory computer-readable medium described herein, the first encoding scheme is in accordance with a first file format and the second encoding scheme is in accordance with a second file format that is different than the first file format.

In some examples of the method, apparatuses, and non-transitory computer-readable medium described herein, the first encoding scheme is associated with a first compression ratio and the second encoding scheme is associated with a second compression ratio that is different than the first compression ratio.

In some examples of the method, apparatuses, and non-transitory computer-readable medium described herein, the first encoding scheme includes a first encryption scheme and the second encoding scheme includes a second encryption scheme that is different than the first encryption scheme.

In some examples of the method, apparatuses, and non-transitory computer-readable medium described herein, the second encoding scheme is associated with at least one of a different resolution, a different bit rate, or a different aspect ratio than the first encoding scheme.

Some examples of the method, apparatuses, and non-transitory computer-readable medium described herein may further include operations, features, means, or instructions for causing, by the first computer system, the re-encoded version of the set of media data to be stored at a target computer system, where the target computer system is the first computer system or a different computer system, and where the re-encoded version of the set of media data is available for playback or distribution based on being stored at the target computer system.

Some examples of the method, apparatuses, and non-transitory computer-readable medium described herein may further include operations, features, means, or instructions for receiving, by the first computer system, a request for playback of media content associated with the set of media data, and outputting, by the first computer system, the re-encoded version of the set of media data in response to the request for playback.

Some examples of the method, apparatuses, and non-transitory computer-readable medium described herein may further include operations, features, means, or instructions for outputting, by the first computer system, an indication of validity in response to the request for playback, where the indication of validity is based on determining that at least the portion of the purported copy of the set of media data is valid, determining that at least the re-encoded version of the portion of the set of media data is valid, or both.

In some examples of the method, apparatuses, and non-transitory computer-readable medium described herein, operations, features, means, or instructions for creating the one or more cryptographic representations of the re-encoded version of the set of media data may include operations, features, means, or instructions for creating, for one or more portions of the re-encoded version of the set of media data, a respective cryptographic representation of each of the one or more portions of the re-encoded version of the set of media data.

In some examples of the method, apparatuses, and non-transitory computer-readable medium described herein, operations, features, means, or instructions for writing the one or more cryptographic representations of the re-encoded version of the set of media data to the immutable ledger may include operations, features, means, or instructions for outputting the one or more cryptographic representations from the first computer system to a second computer system, where the second computer system is configured to write the one or more cryptographic representations to the immutable ledger, the immutable ledger being remote from the first computer system.

In some examples of the method, apparatuses, and non-transitory computer-readable medium described herein, the immutable ledger is or includes a blockchain.

Details of one or more implementations of the subject matter described in this disclosure are set forth in the accompanying drawings and the description below. Other features, aspects, and advantages will become apparent from the description, the drawings, and the claims.

DETAILED DESCRIPTION

Figure 1:
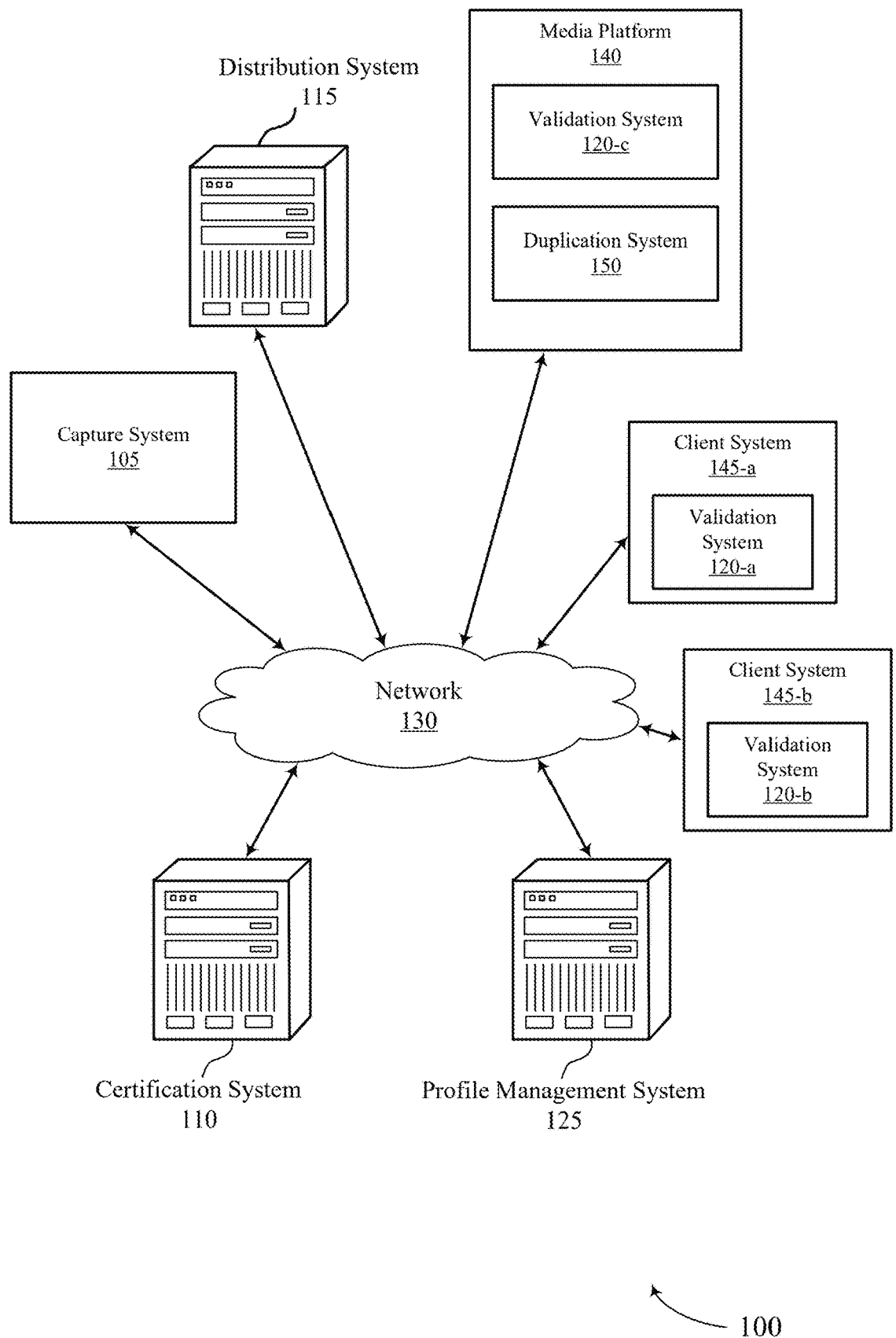
FIG. 1 illustrates an example of a computing environment that supports ledger-based validation and re-encoding of media data in accordance with aspects of the present disclosure.

Media data may include image data, video data, audio data (including, in some cases, telephonic conversation data), or any combination thereof. A variety of techniques are described herein for capturing (e.g., recording or otherwise obtaining) media data in a manner that supports subsequent validation (e.g., authentication) of a purported copy (e.g., any copy that is potentially a copy) of the media data, where validation may refer generally to determining whether the purported copy is a true (e.g., unaltered) copy of the media data or whether one or more aspects (e.g., portions, segments) of the purported copy are invalid (e.g., differ from, have been altered relative to) the captured version of the media data (e.g., the original media data). For example, such techniques may include creating one or more cryptographic representations (e.g., hashes) of the captured version of the media data, writing the one or more cryptographic representations to an immutable ledger (e.g., a blockchain or other form of distributed ledger), and later using the one or more cryptographic representations—e.g., as previously written to the immutable ledger—as a baseline for comparison against one or more corresponding candidate cryptographic representations of the purported copy, where a match indicates validity and a mismatch indicates invalidity (e.g., alteration) of the aspects of the purported copy upon which a candidate cryptographic representation is based.

Also described herein are a variety of techniques related to the validation and related processing of media data by a computer system (e.g., a media platform, which may be a media distribution platform such as a media streaming platform). For example, the computer system may obtain (e.g., receive) a purported copy of media data. The computer system may validate the purported copy—e.g., using ledger-based techniques as described herein. If the purported copy is determined to be a valid (e.g., true) copy of the media data, the computer system may create one or more additional copies of the validated copy, each which may additionally be considered a valid copy. Relative to the initially validated copy (e.g., the purported copy subject to the validation procedure), the computer system may re-encode each additional copy such that each additional copy is encoded differently than the initially validated copy and also differently than any other additional copy that the computer system creates based on the initially validated copy. For example, each additional copy may be encoded in accordance with a different codec, may be converted to a different file format, may be compressed in accordance with a different compression algorithm, or may be encoded to support playback with a different resolution, bit rate, or aspect ratio, or any combination thereof, among other possibilities. Encoding the additional copies differently may beneficially support subsequently distributing (e.g., streaming) the different copies to different client (e.g., playback) systems in accordance with the different capabilities or preferences of those client systems, among other possible benefits.

In some examples, for each additional copy created, the computer system may create one or more cryptographic representations (e.g., hashes) of the additional copy and write the one or more cryptographic representations of the additional copy to an immutable ledger (e.g., a blockchain or other form of distributed ledger). For instance, the computer system may perform, for an additional copy, some or all of the same processing that a capture system may perform for an initially captured copy of media data. Thus, a client system that receives one of the additional copies (e.g., from the computer system) may validate that additional copy, as the additional copy may be considered a purported copy of the media data from the perspective of the client system. For example, the client system may create one or more candidate cryptographic representations of the additional copy, which may be compared against the one or more cryptographic representations of the additional copy that were previously written to the immutable ledger in order to validate (e.g., determine the validity of) the additional copy as received by the client system. Although examples may be described herein in which one or functions are ascribed to a media platform, it is to be understood that such functions may alternatively be performed by any type of computer system in accordance with the teachings herein.

These and other aspects of the disclosure are further described herein with reference to process diagrams, apparatus diagrams, system diagrams, and flowcharts that relate to systems and techniques that support ledger-based validation and re-encoding of digital media.

FIG. 1 illustrates an example of a computing environment 100 that supports systems and techniques for identifying altered media data in accordance with aspects of the present disclosure. Computing environment 100 includes a capture system 105, a certification system 110, a distribution system 115, validation systems 120, a profile management system 125, a media platform 140, client systems 145, and a duplication system 150. In the example illustrated in FIG. 1, validation systems 120-a and 120-b are included in client systems 145-a and 145-b respectively, a validation system 120-c is included in the media platform 140, and the duplication system 150 is included in the media platform 140.

The capture system 105, the certification system 110, the distribution system 115, the profile management system 125, the media platform 140, and the client systems 145 may each be communicatively coupled with a network 130 and thus, via network 130, with each other. The network 130 may include any network or communications infrastructure via which the capture system 105, the certification system 110, the distribution system 115, the profile management system 125, the media platform 140, and the client systems 145 may exchange data. For example, network 130 may include aspects of one or more wired networks (e.g., the Internet) or one or more wireless networks (e.g., cellular networks) as well as public networks or private networks. The capture system 105, the certification system 110, the distribution system 115, the profile management system 125, the media platform 140, and the client systems 145 may each be communicatively coupled with the network 130 via one or more communications links, which may be considered part of the network 130.

In some examples, to support subsequently identifying whether a set of media data has been altered, the set of media data may be divided into one or more segments (e.g., by the capture system 105 or the duplication system 150). Such segments may alternatively be referred to as subsets of media data. For each subset of media data, a cryptographic representation thereof may be created—for example, each subset of media data may be hashed, and the resulting hash may be the cryptographic representation of the subset of media data. The hash of each subset may be transmitted to the certification system 110, either in real time (e.g., while a video is still being recorded or created, or within some threshold amount of time after recording or creation, subsets of the video are hashed and transmitted to the certification system) or in batches (e.g., a complete video is recorded or created, then segmented, hashed, and the hashes transmitted to the certification system with some delay or queuing of subsets of the video).

The certification system 110 may create an immutable ledger for the set of media data. The certification system 110 may create a new ledger entry for each subset and may write to (e.g., add to) each ledger entry the hash of the corresponding subset. The certification system 110 may render the ledger immutable at least in part by also creating a blockchain for the set of media data, where each ledger entry includes a block of the blockchain. For example, once a ledger entry is otherwise complete, the certification system 110 may create an additional hash-which may be referred to as a blockchain hash—by hashing the content of the ledger entry in conjunction with the blockchain hash for the preceding ledger entry. Thus, each ledger entry may include a blockchain hash that is based in part on the content of the ledger entry and in part on the content of the preceding ledger entry, such that the blockchain hash in each ledger entry is, includes, is included in, or corresponds to a block of a blockchain.

In some cases, for each subset of a set of media data, additional data may be collected or created and transmitted to the certification system 110 (e.g., by the capture system 105 of the duplication system 150). As one example, metadata for each subset may be collected and transmitted to the certification system 110 (e.g., in un-hashed form). As another example, for each subset, the corresponding metadata may be hashed, and the resulting metadata hash may be transmitted to the certification system 110. In some cases, the certification system 110 may write the un-hashed metadata and the metadata hash for each subset to the ledger entry for the subset. In such cases, the blockchain hash for a ledger entry may also be based on such additional data. The immutable ledger may subsequently be leveraged to determine whether a given set of media data is or is not identical to the set of media data originally captured, and thus whether the media data has been altered.

A validation system 120 may receive a set of media data and validate the received set of media data based on whether the certification system 110 includes a corresponding immutable ledger, and if so, based on validating the received media data against the contents of the corresponding immutable ledger.

The validation system 120 may check with the certification system 110 to determine whether an immutable ledger exists for the received set of media data. If no immutable ledger exists for the received set of media data, the validation system 120 may notify a user (e.g., of the media platform or the client system 145) that the received set of media data cannot be validated. If an immutable ledger does exist for the received set of media data, the certification system 110 may determine whether the immutable ledger remains valid. For example, the certification system 110 may evaluate the validity of the corresponding blockchain, and determine the validity of the immutable ledger based on the blockchain. If the immutable ledger is not valid, the certification system 110 may notify the validation system 120, which in turn may notify a user that the received set of media data cannot be validated, or that the immutable ledger for the received set of media data has been compromised.

If the certification system 110 indicates that an immutable ledger for the received set of media data is present and valid, the validation system 120 may divide the received set of media data into one or more subsets, consistent with how media data may be segmented when initially captured or created. For each subset of media data, the validation system 120 may create a candidate cryptographic representation (e.g., hash), which may be compared against a trusted version thereof—the trusted version being stored in the immutable ledger. In some cases, the certification system 110 may transmit the trusted version to the validation system 120, and the validation system 120 may perform the comparison. In some cases, the validation system 120 may transmit the candidate cryptographic representation to the certification system 110, and the certification system 110 may perform the comparison and inform the validation system 120 of the result. In some case, along with comparisons of candidate media subset hashes, similar comparisons may also be performed for metadata-based hashes.

For each set of media data, based on such candidate hash comparisons, a trust score may be determined, either by the validation system 120 or by the certification system 110. In some cases, the trust score for a subset of media data may also be determined based on metadata for the set of media data, including the existence or absence of one or more types of metadata or the substance of one or more types of metadata (where substance may include a quality of a given type of metadata, such as an accuracy of GPS metadata corresponding to a set of media data 210). In some cases, a trust score may be determined for each subset of the set of media data. The validation system 120 may present the trust score(s) to a user, and in some cases may present the trust score(s) while concurrently presenting (e.g., playing) the validated set of media to the user. For example, the validation system 120 may present a video to the user and, for each subset of the video (e.g., each 15 seconds of the video), concurrently present a corresponding trust score, possibly along with indicia of corresponding metadata. In some cases, a set of media data may be validated in real time (e.g., while the validation system is playing the media data, it is concurrently validating at least some aspects of the media data). In some cases, a set of media data may be validated and then presented to the user.

The technological solutions described herein, including the distribution of different functionalities across different networked systems, may have many technical benefits. For example, the certification system 110 may use a different cryptographic algorithm to create the blockchain hashes than that used to initially hash each subset of the set of media data upon capture, or to create candidate hashes by the validation system 120. Further, the cryptographic algorithm used to initially hash each subset of the set of media data may vary from one set of media data to another, and it may not be known to the validation system 120 other than via the certification system 110. These and the other technological solutions described herein, including the distribution of different functionalities, thus may beneficially improve the security of the certification system 110 and the immutability of the ledger.

Further, the technological solutions described herein may have a wide variety of beneficial applications. For example, an individual or other entity may capture media data in accordance with the techniques described herein to ensure it won't be disparaged as "fake" later. Or an individual or other entity may validate media data in accordance with the techniques described herein to prove or disprove its legitimacy. In some cases, an individual or other entity may use a smartphone or other recording system to record a video, and as the video is being recorded, the recording system may upload related hashes to the certification system, which may create a corresponding immutable ledger that supports subsequent identification of whether a purported copy of the video includes altered media data. As another example, a police body camera or audio recorder, or a traffic or other surveillance camera, may capture video or audio in accordance with the techniques described herein to ensure its subsequent trustworthiness, either as evidence in a court of law or otherwise. As another example, a smartphone or other recording system may include an application configured to capture audio data associated with a phone call (which may be referred to as telephonic conversation data), or a server may be configured to capture telephonic conversation data whenever joined to a phone call, in order to provide verifiable phone conversations. In some cases, such as where a device that records media data lacks certain processing capabilities, or lacks the capability or opportunity to communicate with the certification system 110 in real time, the device that records the media data may subsequently transfer the media data to a second device, and the second device may process the media data (e.g., segment and hash the media data) or upload related data (e.g., hashes of the media data) to the certification system 110 in accordance with the techniques described herein. As can be seen from these examples and the other examples described herein, which are in no way intended to be limiting, a wide variety of scenarios exist in which capturing media data in a way that supports subsequent validation or validating media data to determine whether it has been altered may be desired.

Further, a computer system (e.g., the media platform 140) may use techniques as described herein to beneficially able to determine whether purported copies of media data that are uploaded or otherwise imported into or ingested by the computer system are valid (e.g., unaltered, legitimate, authentic, true) copies of the set of media data of which they are purportedly a copy. The computer system may further be able to generate one or more additional copies of such media data, which may be encoded using different encoding schemes to support subsequent playback in accordance with those other encoding schemes (e.g., subsequent playback by one or more client systems 145), and which may be trusted to be substantively true and correct copies of the original set of media data, just reencoded to support playback by a wider variety of client systems 145. Further, to further improve overall levels of trust, the one or more additional copies may themselves have trusted cryptographic representations thereof written to an immutable ledger (e.g., as hosted by the certification system 110), to support subsequent validation of those additional copies (e.g., by a validation system 120 at a client system 145, upon receipt of such an additional copy).

The above and other aspects of the techniques described herein are now further described with reference to the computing environment 100. The capture system 105 may collect and process media data in accordance with the techniques described herein. For example, the capture system 105 may obtain (e.g., record, ingest, receive, intake, capture) and process media data to support subsequent validation of the captured media data by a validation system 120. Media data may include image data, video data, or audio data (including but not limited to telephonic conversation data, which may refer to audio data associated with a voice call). In some cases, image or video data may be captured at least in part by a camera, microphone, an application configured to capture telephonic conversation data, or other media data capture device included in or communicatively coupled with the capture system 105. In some cases, video or audio data may be captured at least in part by a sniffer or like piece of hardware, software, or firmware included in or communicatively coupled with the capture system 105.

The capture system 105 may include one or more hardware, software, or firmware components that implement the functions ascribed herein to the capture system 105. For example the capture system 105 may in some cases include one or more components for capturing media data (e.g., a camera, a microphone, a sniffer, or another capture mechanism), one or more components for capturing metadata for the media data (e.g., sensors or system clocks), one or more components for processing captured media data and metadata in accordance with the techniques described herein (e.g., processor, memory, and computer-executable instructions, which may be processor-executable and stored in memory), and one or more components for exchanging data with other aspects of computing environment 100 (e.g., a transceiver, an antenna, a modem, a network interface, or like components for communicating with other aspects of computing environment 100 via one or more wired or wireless communications links). In some cases, the capture system 105 may be or include aspects of a smartphone, a tablet, a computer (e.g., laptop, desktop, or server-grade computer), or other like device configured to support the functions ascribed herein to the capture system 105. The capture system 105 may in some cases comprise one or more software applications hosted by such a device. In some cases, the capture system 105 may comprise one or more software applications specific to capturing a particular type of media data (e.g., a software application specific to capturing audio data, a software application specific to capturing image data, a software application specific to capturing video data, or a software application specific to capturing telephonic conversation data). In some cases, the capture system 105 may comprise an application for which no media data may be imported, only directly captured using the application. Additionally or alternatively, the capture system 105 may be, include aspects of, be coupled with, or otherwise receive media data captured by a body camera (e.g., a police body camera or an action camera), a surveillance camera (e.g., a traffic or security camera), or some other type of camera, microphone, sniffer, or other means for capturing or intaking media data or associated metadata. In some cases, the capture system 105 may verify a separate device that is configured to provide media data to the capture system 105 (e.g., based on a private/public cryptographic key pair for a user profile associated with the separate device) prior to accepting media data from the separate device.

The capture system 105 may be implemented as a single device implementation or as a multi-device implementation. In a single device implementation, the capture system 105 may include aspects of a single host device that captures and processes media data in accordance with the techniques described herein. For example, the host device may execute one or more software applications configured to cause the host device to implement the functions ascribed herein to capture system 105. In a multi-device implementation, aspects of capture system 105 may be distributed across two or more host devices, and at least one of the host devices may execute one or more software applications configured to cause that host device to implement aspects of the functions ascribed herein to capture system 105. In some cases, a first device (e.g., an audio recorder, body camera, or surveillance camera) may capture media data and transfer the captured media data to a second device (e.g., a computer), and the second device may process the captured media data in accordance with the techniques described herein. Although one capture system 105 is illustrated in FIG. 1, it is to be understood that there can be any quantity of capture systems 105.

The certification system 110 may receive, store, and process data associated with captured media data (e.g., media data captured by the capture system 105) in accordance with the techniques described herein. For example, the certification system 110 may receive, process, and store metadata associated with the captured media data as well as associated cryptographic representations (e.g., hashes of the media data, hashes of related metadata, or hashes of combinations of the media data and related metadata). In some examples, the certification system 110 may not store the captured media data itself (e.g., the capture system 105 or a media platform 140 (or a duplication system 150 therein) may refrain from sending media data itself to the certification system 110, instead sending metadata, cryptographic representations, and other data that is associated with the media data). The certification system 110 may also further process data received by the certification system 110 to create and store additional related data (e.g., to create and store additional metadata or additional cryptographic representations, such as additional hashes).

In some cases, the certification system 110 may store data associated with the captured media data as part of an immutable ledger. The immutable ledger may be a distributed ledger. Additional or alternative, the immutable ledger may be or be based on a blockchain (e.g., each entry of the immutable ledger may be or be included in a respective block of the blockchain). For example, as described herein, at least some entries in the immutable ledger (and thus at least some blocks of the blockchain) may respectively correspond to a subset (e.g., a portion or segment) of the captured media data. In some cases, the certification system 110 may replicate the immutable ledger such that any number of copies of the immutable ledger may be created, which the certification system 110 may store across any number of logically or physically distinct devices or computer systems. The immutable ledger may support subsequent validation of the captured media data, and the certification system 110 may in some cases interact with a validation system 120 in accordance with the techniques described herein to validate media data based on the immutable ledger. For example, the certification system 110 may receive and respond to validation requests issued by a validation system 120. In some cases, the certification system 110 may include one or more computer systems (e.g., servers) for storing immutable ledgers and related data, and one or more computer systems (e.g., servers) for storing metadata for subsets 212 of sets of media data 210. In some cases, the certification system 110 may include one or more computer systems (e.g., servers) for storing immutable ledgers and related data along with metadata for subsets 212 of sets of media data 210.

The certification system 110 may include one or more components for performing the functions ascribed herein to certification system 110, such as one or more components for storing and processing data related to media data captured by the capture system 105 (e.g., processor, memory, and computer-executable instructions, which may be processor-executable and stored in memory), and one or more components for exchanging data with other aspects of computing environment 100 (e.g., a transceiver, an antenna, a modem, a network interface, or like components for communicating with other aspects of computing environment 100 via one or more wired or wireless communications links). In some cases, the certification system 110 may be or include aspects of one or more server-class computers (which may be referred to as servers in the context of computing environment 100), one or more databases, or one or more other storage and processing components. For example, the certification system 110 may include multiple servers or other types of nodes, and some or all of the nodes (e.g., servers) included in the certification system 110 may each store a copy of an immutable ledger, where the immutable ledger includes entries (e.g., blocks of a blockchain) related to media data captured by the capture system 105. In some cases, the certification system 110 may include one or more intermediary system to enhance the efficiency with which the certification system 110 may perform any of the functionalities ascribed herein to the certification system 110 (e.g., an intermediary system to intake new data from the capture system 105, an intermediary system to facilitate lookup of ledger entries based on a validation request from a validation system 120, an intermediary system to collect or store metadata independent of an immutable ledger, etc.).

A validation system 120 may receive media data and validate (e.g., authenticate) the received media in accordance with the techniques described herein. There may be any quantity one or more of validation systems 120 present within the computing environment 100. For instance, in the example of FIG. 1, there may be one validation system 120 included in (or alternatively coupled with) the media platform 140 and there may be a respective validation system 120 included in (or alternatively coupled with) the client systems 145. It is to be understood, however, that there may be any quantity one or more of validation systems 120 present within the computing environment 100 (e.g., as part of any quantity of media platforms 140 or any quantity of client systems 145).

Validating received media, as performed by a validation system 120, may in some cases include determining whether a purported copy of the media data has been altered relative to the corresponding media data as it was captured by the capture system 105. In some cases, the validation system 120 may validate received media data based on the immutable ledger and thus at least in part by interacting with the certification system 110. In some cases, validation system 120 may determine (or receive from the certification system 110) a trust score for the media data, which may be indicative of the existence of or an extent of intervening alternation of the media data between being captured by the capture system 105 and being received by the validation system 120. In some cases, the trust score may be binary (e.g., trusted (unaltered) or un-trusted (altered in any way to any extent)), and in some cases, the trust score may be non-binary (e.g., reflecting degrees of alteration and thus trustworthiness with some granularity or quantization-such as an A/B/C/D/E/F scale, a ten point scale, etc.). The validation system 120 may also present (e.g., display or otherwise make visible or audible to a human viewer or listener) received media data along with (e.g., concurrently with) one or more trust scores associated with the media data (e.g., an overall trust score for the media data, or one or more trust score specific to a subset of the media data) or metadata for the media data.

A validation system 120 may include one or more components for performing the functions ascribed herein to the validation system 120, such as one or more components for receiving media data and validating received media data (e.g., processor, memory, and computer-executable instructions, which may be processor-executable and stored in memory), and one or more components for exchanging data with other aspects of the computing environment 100 (e.g., a transceiver, an antenna, a modem, a network interface, or like components for communicating with other aspects of computing environment 100 via one or more wired or wireless communications links). In some cases, the validation system 120 may be or include aspects of a smartphone, a tablet, a computer (e.g., laptop, desktop, or server-grade computer), or other like device configured to support the functions ascribed herein to the validation system 120. In some cases, the validation system 120 may include, be integrated with, or be communicatively coupled with a media hosting service (e.g., a video hosting service) or a social media service that makes sets of media data available to users (e.g., via the internet). The validation system 120 may in some cases comprise one or more software applications hosted by a host device. In some cases, the validation system 120 may comprise one or more software applications specific to validating a particular type of media data (e.g., a software application specific to validating audio data, specific to validating image data, specific to validating video data, or specific to validating telephonic conversation data).

The distribution system 115 may support the transfer of captured media data from the capture system 105 to a validation system 120 in accordance with the techniques described herein. For example, the distribution system 115 may support a direct (e.g., application-to-application) transfer mechanism between the capture system 105 and the validation system 120. The direct transfer mechanism may be peer-to-peer or peer-to-many (including peer-to-public, such as via social media or a media hosting service). In some cases, the distribution system 115 may include a hosting service for sets of media data (e.g., a video hosting service) or a social media service that makes sets of media data captured by the capture system 105 available to the validation system 120. In some cases, a user of the capture system 105 may configure the capture system 105 to transmit a captured set of media to the validation system 120 as part of or upon completion of a ledger-writing process as described herein. In other cases, a user of the capture system 105 may access, via the capture system 105, a listing of previously captured sets of media data, may select one or more previously captured sets of media data, and may configure the capture system 105 to transmit the selected set(s) of media data to the validation system 120.

In some cases, a validation system 120 may be associated with a particular user, and the user of the capture system 105 may identify the target validation system 120 at least in part by identifying a target user. In some cases, the distribution system 115 may facilitate the transfer of captured media data from the capture system 105 to the validation system 120 along with information (e.g., header information) that the validation system 120 may use to validate the media data (e.g., information identifying a corresponding immutable ledger, ledger entries therein, or a mapping between ledger entries and subsets of media data). In some cases, the distribution system 115 may verify a capture system 105 or validation system 120 (e.g., based on a private/public cryptographic key pair for a user profile associated with the capture system 105 or validation system 120) prior to engaging in additional interactions with the capture system 105 or validation system 120. In some cases, a user may be able to configure the distribution system 115 to make a given set of media data 210 available to other users (validation systems 120) for only a limited amount of time, for only a limited quantity of downloads or views, or for only a limited roster (list) of other users (validation systems 120).

The distribution system 115 may include one or more components for performing the functions ascribed herein to the distribution system 115, such as one or more components for identifying the validation system 120 and routing media data captured by capture system 105 to the validation system 120 (e.g., processor, memory, and computer-executable instructions, which may be processor-executable and stored in memory), and one or more components for exchanging data with other aspects of the computing environment 100 (e.g., a transceiver, an antenna, a modem, a network interface, or like components for communicating with other aspects of the computing environment 100 via one or more wired or wireless communications links). In some cases, the distribution system 115 may be or include aspects of one or more server-class computers (which may be referred to as servers in the context of the computing environment 100), one or more routers or network switches, or one or more other processing and routing components.

In some cases, a validation system 120 may receive media data, including media data captured by the capture system 105, via means other than those involving or supported by the distribution system 115. For example, in some cases, a user of the validation system 120 may import media data into the validation system 120, which the user of the validation system 120 may have received by any means (e.g., via email, multimedia messaging service (MMS), social media, a torrent service, etc.), including vi network 130.

The profile management system 125 may manage user profiles associated with a capture system 105 or a validation system 120 in accordance with the techniques described herein. For example, the profile management system 125 may communicate with a capture system 105 to support the creation of a user profile for a user of the capture system 105 and may communicate with a validation system 120 to support the creation of a user profile for a user of the validation system 120. A user profile that is valid for the capture system 105 may also be valid for the validation system 120, and vice versa. A user profile may correspond to a human user, and organizational user, or in some cases to a device (e.g., a body camera or surveillance camera, or a specific smartphone, may correspond to a unique user profile). An individual may have multiple user profiles (e.g., a user profile for personal use and a user profile for professional/official use). The profile management system 125 may communicate with a capture system 105 or a validation system 120 to support the authentication (e.g., sign in or log in) of a user.

Each user profile may correspond to a public/private cryptographic key pair, which may be used by the other aspects of computing environment 100 in accordance with the techniques described herein (e.g., a capture system 105 may sign a captured set of media data using a private cryptographic key, and the validation system 120 may subsequently verify the origin of the set of media data based on the corresponding public cryptographic key).

In some cases, the profile management system 125 may maintain various types of data for each user profile, which may be referred to as user profile data. In some cases, user profile data may include a history (e.g., list) of sets of media data associated with the user profile (e.g., captured by the capture system 105 when the corresponding user is logged in). An entry in the list for a set of media data may include a date, time, or length of the set of media data. An entry in the list for a set of media data may also include a type (e.g., video, audio, image, telephonic conversation) of the set of media data. An entry in the list for a set of media data may also include additional metadata for the set of media data (e.g., a location of the capture system 105 at a time of creation or intake of the set of media data). In some cases, the history of sets of media data associated a user profile may be publicly visible, or visible to other users who successfully log in or otherwise authenticate themselves to the profile management system 125. In some cases, user profile data may include trust scores (e.g., as determined by a validation system 120 or the certification system 110) for sets of media data associated with the user profile and other reputational data. As a user creates more sets of media data, or as more sets of media data associated with the user are validated by a validation system 120, the user's reputational data may include an indication of increased trustworthiness. In some cases, a validation system 120 or the certification system 110 may determine a trust score a new set of media data based on user profile data for the associated user profile.

The profile management system 125 may include one or more components for performing the functions ascribed herein to the profile management system 125, such as one or more components for storing and processing data user profile data (e.g., processor, memory, and computer-executable instructions, which may be processor-executable and stored in memory), and one or more components for exchanging data with other aspects of computing environment 100 (e.g., a transceiver, an antenna, a modem, or like components for communicating with other aspects of computing environment 100 via one or more wired or wireless communications links). In some cases, the profile management system 125 may be or include aspects of one or more server-class computers (which may be referred to as servers in the context of computing environment 100), one or more databases, or one or more other storage and processing components.

The media platform 140 may provide a hosting and distribution (e.g., streaming) service for media data. For example, the media platform 140 may obtain media data (e.g., via network 130, as provided by one or more capture systems 105 or by the distribution system 115) and make such media data available for playback at the client systems 145 (e.g., available for download by the client systems 145 via network 130 or available for streaming to the client systems 145 via network 130). For example, the media platform 140 may make or be coupled with a system that makes the hosted sets of media data 210 available to client systems 145 via a smartphone application, via a web browser-based application, via a social media network, via a video-hosting service, etc. Though illustrated in the example of FIG. 1 as separate systems, it is to be understood that some or all aspects of the media platform 140 may in some cases be included in the distribution system 115 (e.g., a single computer system-such as a distributed system—may provide some or all of the functionalities ascribed herein to the media platform 140 as well as some or all of the functionalities ascribed herein to the distribution system 115. Thus, for example, the media platform 140 may alternatively be referred to as a media hosting service, media streaming service, media distribution service, or any combination thereof. In some examples, the media platform may be, may include, may be included in, or may be coupled with a social media platform.

The media platform 140 may also support validating media data as well as generating and processing (e.g., re-encoding) additional copies of the media data media data in accordance with techniques as described herein. For example, the media platform 140 may include a validation system 120-*c* (as illustrated in FIG. 1), or the media platform 140 may be coupled with a validation system 120-*c* (e.g., via network 130). Similarly, the media platform 140 may include a duplication system 150 (as illustrated in FIG. 1), or the media platform 140 may be coupled with a duplication system 150 (e.g., via network 130).

The media platform 140 may include one or more components for performing the functions ascribed herein to the media platform 140, such as one or more components for hosting media data, making hosted media data available to client systems 145, validating media data, generating and processing (e.g., re-encoding) additional copies of the media data, or any combination thereof (e.g., processor, memory, and computer-executable instructions, which may be processor-executable and stored in memory), and one or more components for exchanging data with other aspects of the computing environment 100 (e.g., a transceiver, an antenna, a modem, a network interface, or like components for communicating with other aspects of the computing environment 100 via one or more wired or wireless communications links). In some cases, the media platform 140 may be or include aspects of one or more server-class computers (which may be referred to as servers in the context of the computing environment 100), one or more routers or network switches, or one or more other processing and routing components.

A duplication system 150 may provide or otherwise support functionalities described herein as related to one or more additional copies of media data (e.g., additional copies generated based on a validated copy of the media data). For example, the duplication system 150 may be operable to generate one or more additional copies of media data (e.g., after a purported copy of the media data has been validated, that now-validated copy may be used by the duplication system 150 to generate the one or more additional copies). The duplication system 150 may further be operable to re-encode such additional copies in accordance with different encoding schemes, relative to the purported copy upon which they are based and relative to each other. The duplication system 150 may then process each re-encoded copy in like fashion as to at least some aspects of how the capture system 105 may process newly captured media data (e.g., for each additional copy, the duplication system 150 may create one or more cryptographic representations of the additional copy and transmit those one or more cryptographic representations—possibly along with metadata associated with the additional copy—to the certification system 110). The certification system 110 may process such information received from the duplication system 150 for the additional copy in like fashion as to at least some aspects of how the certification system 110 processes information received from the capture system 105 for newly captured media data (e.g., the certification system may write the received information to an immutable ledger), to support later validation of the additional copy in response to a request from a validation system 120, such as a request from a validation system 120 at a client system 145.

A duplication system 150 may include one or more hardware, software, or firmware components that implement the functions ascribed herein to the duplication system 150. For example the duplication system 150 may in some cases include one or more components for processing media data and metadata in accordance with the techniques described herein (e.g., processor, memory, and computer-executable instructions, which may be processor-executable and stored in memory), and one or more components for exchanging data with other aspects of computing environment 100 (e.g., a transceiver, an antenna, a modem, a network interface, or like components for communicating with other aspects of computing environment 100 via one or more wired or wireless communications links). In some cases, the duplication system 150 may be or include aspects of one or more server-class computers (which may be referred to as servers in the context of the computing environment 100), one or more routers or network switches, or one or more other processing and routing components.

A client system 145 may support obtaining media data (e.g., via network 130, such as from the capture system 105, the distribution system 115, or the media platform 140) and playing the media data (e.g., presenting the media data visually, audially, or both) to a user of the client system 145. The client system 145 may include a validation system 120 (as illustrated in FIG. 1) or may be coupled with a validation system 120 (e.g., via network 130). Thus, a client system 145 may support validating media data as well as playing the media data.

A client system 145 may include one or more hardware, software, or firmware components that implement the functions ascribed herein to the client system 145. For example the client system 145 may in some cases include one or more components for presenting media data (e.g., a display screen, a speaker, a video card, a sound card, or another media presentation mechanism), one or more components for processing media data and metadata in accordance with the techniques described herein (e.g., processor, memory, and computer-executable instructions, which may be processor-executable and stored in memory), and one or more components for exchanging data with other aspects of computing environment 100 (e.g., a transceiver, an antenna, a modem, a network interface, or like components for communicating with other aspects of computing environment 100 via one or more wired or wireless communications links). In some cases, the client system 145 may be or include aspects of a smartphone, a tablet, a computer (e.g., laptop, desktop, or server-grade computer), or other like device configured to support the functions ascribed herein to the client system 145. The client system 145 may in some cases comprise one or more software applications hosted by such a device. In some cases, the client system 145 may comprise one or more software applications specific to capturing a particular type of media data (e.g., a software application specific to presenting audio data, a software application specific to presenting image data, a software application specific to presenting video data, or a software application specific to presenting telephonic conversation data).

In the example computing environment 100 illustrated in FIG. 1, the client systems 145 do not include deduplication systems 150. In other examples, however, a client system 145 may include or be coupled with a deduplication system 150.

Numerous variations from the system architecture of the illustrated computing environment 100 are possible. The components of the computing environment 100 and their respective functionalities can be combined or redistributed. For example, the certification system 110 and the profile management system 125 can be combined or distributed across any number of devices. As another example, the distribution system 115 and the media platform 140 can be combined or distributed across any number of devices. Furthermore, the respective functionalities ascribed herein to any of a capture system 105, certification system 110, distribution system 115, profile management system 125, media platform 140, client system 145, validation system 120, or duplication system 150 can be implemented using a single computing device or using any number of distributed computing devices communicatively coupled (e.g., via the network 130).

For clarity and ease of description, computing environment 100 may at times be described, and is illustrated in FIG. 1, as including only one capture system 105, one certification system 110, one distribution system 115, one profile management system 125, one media platform 140, and two client systems 145, but it is to be understood that in practice any number of each such entity may exist. For example, a large number of capture systems 105, media platforms 140, and client systems 145 may exist.

It also to be understood that a single device or computer system may be include or act as a host for, multiple entities illustrated in FIG. 1. For example, a single device (e.g., a client system 145 or media platform 140) may include or act as a host for both a capture system 105 and a validation system 120. For example, a single smartphone or other computer system may be configured to implement the functionalities ascribed herein to the capture system 105 (e.g., by hosting and executing a corresponding software application) and may also be configured to implement the functionalities ascribed herein to the validation system 120 (e.g., by hosting and executing a corresponding software application). Or, as another example, in some case, a single device may include or act as a host for multiple capture systems 105 (e.g., one capture system 105 for video data and one capture system 105 for audio data), multiple validation systems 120 (e.g., one validation system 120 for video data and one validation system 120 for audio data), or any combination thereof.

Figure 2:
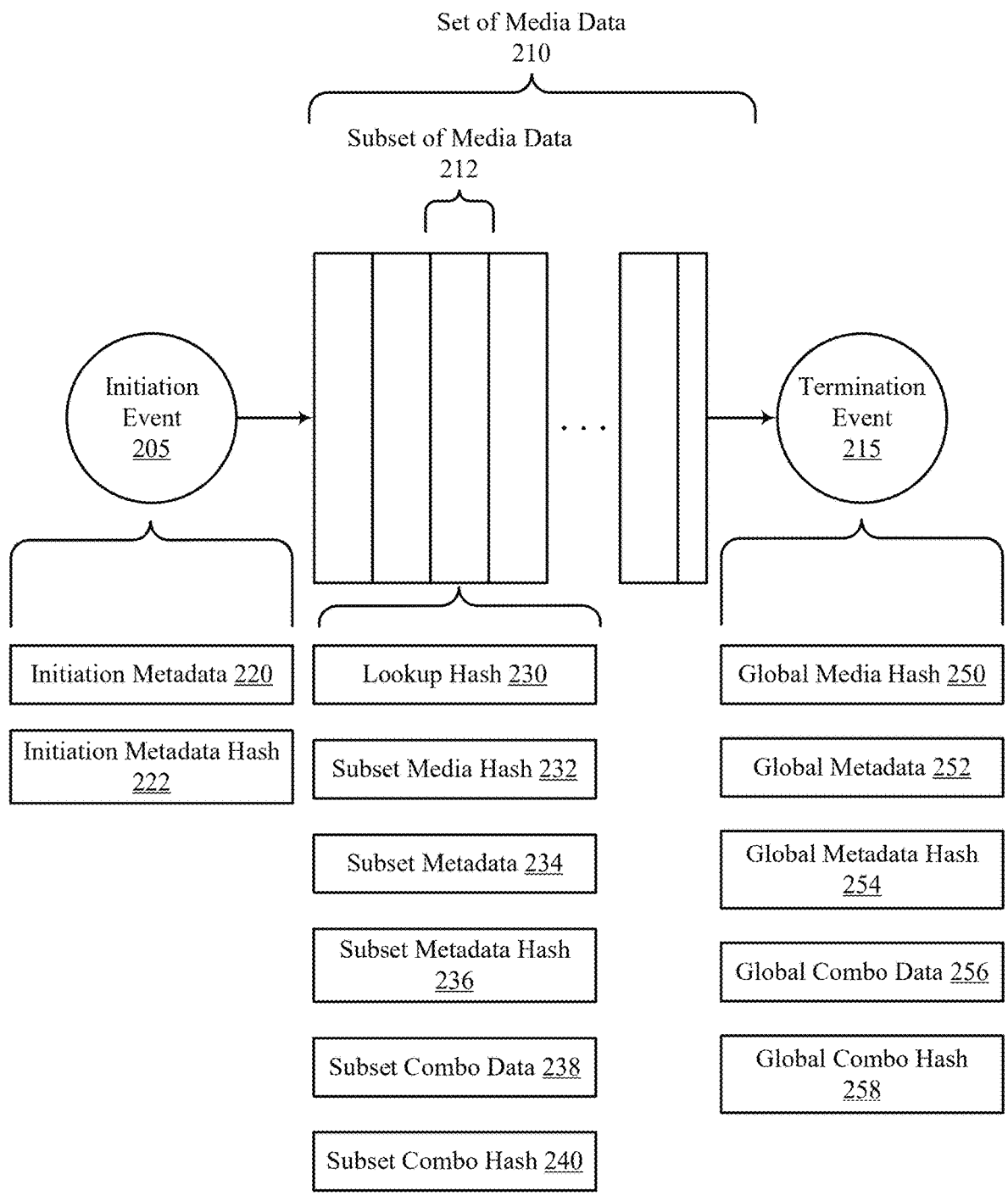
FIG. 2 illustrates an example of a ledger-writing process that supports ledger-based validation and re-encoding of media data in accordance with aspects of the present disclosure.

FIG. 2 illustrates an example of a ledger-writing process 200 that supports identifying altered media data in accordance with aspects of the present disclosure. In some examples, the ledger-writing process 200 may be implemented by aspects of a capture system 105 as described with reference to FIG. 1 (e.g., for media data newly captured by the capture system 105). Additionally or alternatively, one or more aspects of the ledger-writing process may 200 may be implemented by aspects of a duplication system 150 as described with reference to FIG. 1 (e.g., for an additional copy of a validated set of media data).

A capture system 105 may identify an initiation event 205, which may be any event that initiates the recording of a corresponding set of media data 210. Thus, the initiation event 205 may be, for example, a user of the capture system 105 selecting "record" on a digital camera, a digital audio recorder, a software application executed by the capture system 105, etc. The initiation event 205 may also be, for example, a power-on event for the capture system 105, where the capture system 105 may be configured to record the set of media data 210 whenever powered on (e.g., as in some examples wherein the capture system 105 may include aspects of a body camera or surveillance camera, or a server configured to capture telephonic conversation data when joined to a call). The initiation event 205 may also be, for example, the beginning of a new periodic time period associated with the set of media data 210 (e.g., the capture system 105 may be configured to repeatedly record sets of media data 210 having a predefined duration, such as one hour, and may initiate a new set of media data and thus identify an initiation event 205 at the beginning of each new predefined duration).

In some cases, prior to initiation event 205, the capture system 105 may authenticate a user of the capture system 105. For example, the capture system 105 may require the user to provide a username and password, one or more biometric inputs (e.g., for fingerprint recognition, facial recognition, retina recognition, voice recognition, typing or other input cadence recognition, etc.), or other form of authentication credential (e.g., a dongle or digital certificate). The capture system 105 may determine whether the authentication credentials provided by the user correspond to a valid user profile, which may be associated with a public/private cryptographic key pair as assigned and managed by a profile management system 125.

In some cases, the capture system 105 may authenticate the user locally, based on user profile information stored locally at the capture system 105. In some cases, capture system 105 may transmit to a profile management system 125 one or more indications of authentication credentials provided by the user and may receive, from the profile management system 125, an authentication response indicative of whether the authentication credentials provided by the user correspond to a valid user profile. If the authentication credentials provided by the user do not correspond to a valid user profile, the capture system 105 may prompt the user to provide new or additional credentials or create a new and valid user profile. If the authentication credentials provided by the user correspond to a valid profile, the capture system 105 may thereafter identify the initiation event 205, and the capture system 105 or the profile management system 125 may associate set of media data 210 with the profile in accordance with the techniques described herein.

In some cases, prior to the initiation event 205, the capture system 105 may present (display) to the user one or more aspects of metadata (e.g., of any type described herein) that would be captured at that time, were the capture system 105 to begin recording, along with one or more indications of their impact on validity (e.g., color-coding (such as red, yellow, green) or other indicators related to whether a given aspect of metadata is favorable, disfavorable, or neutral for a subsequent validity analysis, such as whether an Internet connection is present or absent or is strong or weak, or whether a large or small amount (e.g., number of sources) of metadata is presently available). For example, the capture system 105 may display GPS- or WiFi-related metadata, indicating to the user what metadata (e.g., what types of metadata) may then be available to be captured. Additionally or alternatively, in some cases, the capture system 105 may present (display) to the user one or more aspects of metadata (e.g., of any type described herein) as captured while recording.

Subsequent to the initiation event 205, the capture system 105 may capture the corresponding set of media data 210 until identifying a termination event 215, which may be any event that terminates the recording of the corresponding set of media data 210. Thus, the set of media data 210 may include any media data captured between the initiation event 205 and the termination event 215. The termination event 215 may be, for example, a user of the capture system 105 selecting "stop recording" on a digital camera, a digital audio recorder, a software application executed by the capture system 105, etc. The termination event 215 may also be, for example, a power-off event for the capture system 105 or the end of a periodic time period associated with the set of media data 210. Where the set of media data 210 comprises data for a single image, the termination event 215 may be the completion of capturing or creating an additional copy of the single image.

The capture system 105 may identify a plurality of subsets of media data 212, and each subset of media data 212 may be a subset of the set of media data 210. For example, a subset of media data 212 may comprise video or audio data of a predefined duration (e.g., 15 second intervals or intervals of some other duration) or of a predetermined amount (e.g., X frames, Y audio samples, Z pixels of an image, or like amount). In some cases, the duration or amount of media data in a subset of media data 212 may be configured by the certification system 110 on a periodic or ad hoc basis and may thus change over time. In some cases, as illustrated in the example of ledger-writing process 200, at least one subset of media data 212 may not correspond to the predefined duration or portion size of other subsets of media data 212 (e.g., due to the set of media data 210 not having a duration or amount of media data evenly divisible by the predefined duration or amount, in which case at least one subset of media data 212 may be a remainder of the set of media data 210).

In some cases, the capture system 105 may identify subsets of media data 212 in real time (e.g., concurrently with capturing set of media data 210). For example, the capture system 105 may capture a first 15 seconds of video and identify the first 15 seconds of video as a first subset of media data 212, capture a second 15 seconds of video and identify the second 15 seconds of video as a second subset of media data 212, and so on. In some cases, the capture system 105 may capture all or some other larger portion of the set of media data 210 (e.g., at a body camera, surveillance camera, smartphone, or tablet computer lacking concurrent connectivity to network 130 or lacking sufficient processing resources to support all aspects of capture system 105), and may then at a later time identify subsets of media data 212 (e.g., by segmenting all or some other larger portion of set of media data 210).

The capture system 105 may identify metadata for the set of media data 210, which may also include metadata specific to the initiation event 205 or the termination event 215, as well as metadata specific to a subset of media data 212 or applicable to the entirety of set of media data 210. Metadata for the set of media data 210 may include, for example, authentication credentials (e.g., user ID, biometric data, etc.), user profile data, time or calendar data (e.g., timestamps, datestamps, etc.), sensor data gathered by one or more devices included in or coupled with the capture system 105 (e.g., temperature data humidity data, other types of environmental data, accelerometer data, velocity data, triangulation data, serving cell data, geographic data (e.g., latitude or longitude or zip code or other political boundary data), the identity of available Wi-Fi networks or other networks, global positioning satellite (GPS) data, other types of location data (e.g., location data related to the location of one or more satellites or other entities as of when the media data is captured), IDs or distances of cellular towers to which the capture system 105 is connected, or any combination thereof.

Metadata for the set of media data 210 may also include, for example, an identity of or metadata for an application (e.g., a software application) used to capture the set of media data 210 (e.g., whether the set of media data 210 was captured with a trusted application).

Metadata for the set of media data 210 may also include, for example, an identity of or other data related to a communications link used for communicating data related to the set of media data 210 to a certification system 110 (e.g., a name of the communications link, a type of the communications link, a communications protocol associated with the communications link, security data for the communications link, or any combination thereof).

Metadata for the set of media data 210 may also include, for example, an identity of, number of, or other data related to additional capture systems 105 within a threshold distance of the capture system 105 at a time associated (e.g., concurrent with) capturing the set of media data 210.

Metadata for the set of media data 210 may also include, for example, a latency between a time associated (e.g., concurrent with) capturing the set of media data 210 or a subset of media data 212 and transmitting data related to the set of media data 210 or the subset of media data 212 (e.g., other associated metadata or an associated hash) to a certification system 110.

In some cases, a user of the capture system 105 may specify one or more types of metadata for the capture system 105 to capture (or not capture) or one or more types of metadata for the capture system 105 to transmit (or not transmit), in hashed or un-hashed form, to a certification system 110.

The capture system 105 may identify metadata specific to the initiation event 205 as initiation metadata 220. Examples of initiation metadata 220 may include authentication credentials (e.g., user ID, biometric data, etc.), user profile data, or any other type of metadata specific to a time or occurrence of the initiation event 205.

The capture system 105 also may create a cryptographic representation based on the initiation metadata 220, which may be referred to as an initiation metadata hash 222. The capture system 105 may create the initiation metadata hash 222 by inputting the initiation metadata 220 into a cryptographic algorithm (e.g., a hashing algorithm), which may yield an initiation metadata hash 222. For brevity and ease of description, "hashing algorithm" and "hash" may be used herein as referring generically to a cryptographic algorithm and corresponding cryptographic representation, and "hashing" an input may refer to creating a cryptographic representation based on the input. For example, a hash as described herein may be a secure hash algorithm (SHA) hash, such as a SHA-256 hash or a SHA-512 hash. It is to be understood that cryptographic algorithms and corresponding cryptographic representations other than hashing algorithms and hashes may also be suitable for at least some aspects of the systems and techniques described herein.

The capture system 105 may transmit, to a certification system 110, one or more of the initiation metadata 220 and the initiation metadata hash 222, and the certification system 110 may be configured to write one or more of the initiation metadata 220 and the initiation metadata hash 222 to an immutable ledger corresponding to set of media data 210 in accordance with the techniques described herein. In some cases, the capture system 105 may transmit to the certification system 110 one or more of the initiation metadata 220 and the initiation metadata hash 222 in real time (e.g., within a threshold amount of time after identifying the initiation metadata 220 or while capturing at least some portion of the set of media data 210). In some cases, for example, the capture system 105 may transmit to the certification system 110 one or more of the initiation metadata 220 and the initiation metadata hash 222 while capturing a subset of media data 212 (e.g., while capturing a first subset of media data 212), which may also correspond to a real time transfer of the initiation metadata 220 and the initiation metadata hash 222. In some cases, the capture system 105 may transmit to the certification system 110 one or more of the initiation metadata 220 and the initiation metadata hash 222 with some latency, which may be in excess of the threshold amount of time. For example, the capture system 105 may not have connectivity to the network 130 at the time of the initiation event 205 and thus may transmit to the certification system 110 one or more of the initiation metadata 220 and the initiation metadata hash 222 subsequent to establishing a communications link with the network 130.

In some cases, for each subset of media data 212 identified by the capture system 105, the capture system 105 may perform certain operations as described herein. FIG. 2 illustrates aspects of these operations with reference to a single subset of media data 212, but it is to be understood that like operations may be performed for each identified subset of media data 212.

In some cases, for each subset of media data 212 identified by the capture system 105, the capture system 105 may create a corresponding lookup hash 230. The capture system 105 may create the lookup hash 230 by hashing the corresponding subset of media data 212. In some cases, the capture system 105 may create the lookup hash 230 using an alternative hashing algorithm that is distinct from a hashing algorithm used by the capture system 105 to create other hashes based on the corresponding subset of media data 212 and other hashes related to the set of media data 210 (e.g., the initiation metadata hash 222, the global media hash 250, and the global metadata hash 254). In some cases, the lookup hash 230 may function as an identifier of an immutable ledger entry corresponding to the subset of media data 212. In some cases, a set of media data 210 or a corresponding immutable ledger may be identified based on other information included in a file that includes the set of media data 210, such as information included in a header of such a file. Such other information may be a unique identifier, metadata, or a hash (e.g., a lookup hash 230 or some other type of hash).

In the context of the systems and techniques described herein, one technical problem may relate to how to support the receipt and validation of only part of the set of media data 210 by a validation system 120, which may be desirable for any number of reasons. For example, some sets of media data 210 may be large, and transferring the entire set of media data 210 from the capture system 105 to the validation system 120 may be undesirable or impractical. As another example, only some aspects of a set of media data 210 may be relevant for a given purpose (e.g., as evidence in a court of law, or of interest to human consumers of the media data). It may also be desirable for a validation system 120 to be able to validate a set of media data 210 received exclusive of any additional information, as this may avoid the need for any special file formats or transmission protocols when sending a set of media data 210 from a capture system 105 to a validation system 120. An additional technical problem in the context of the systems and techniques described herein may relate to how a validation system 120 and a certification system 110 are to efficiently identify an immutable ledger and immutable ledger entry corresponding to a given subset of media data 212. And yet another technical problem in the context of the systems and techniques described herein may relate to how to mitigate the risk of aspect of the systems and techniques described herein being compromised (e.g., hacked), including the risk of altered media data being altered in a way that a validation system 120 may be unable to detect, and including how to maintain security of in the event that a hashing algorithm utilized by the capture system 105 or any other aspect of a computing environment 100 becomes compromised (inverted, whereby input data may be determinable based on output data).

As described herein, technical solutions to these and other technical problems may include using a first hashing algorithm to create all hashes related to the set of media data 210 other than lookup hashes 230 (which thus may be referred to as a primary hashing algorithm) and a second, different hashing algorithm to create lookup hashes 230 (which may thus be referred to as an alternative hashing algorithm). Further, in some cases, the alternative hashing algorithm may be statically configured and globally known (e.g., known by all capture systems 105 and validation systems 120), whereas the primary hashing algorithm may be dynamically determined (e.g., selected from a set of candidate hashing algorithms) by the certification system 110. In some cases, the alternative hashing algorithm may also be dynamically determined and indicated to the capture system 105 (or, in the context of validation) to the validation system 120) by the certification system 110. The certification system 110 may dynamically determine the primary hashing algorithm, such that following the capture of the set of media data 210 by the capture system 105, a person or device in possession of the set of media data 210 may be unable to know or determine the hashing algorithm used by capture system 105 as the primary hashing algorithm without consulting the certification system 110. Additionally, the certification system 110 may select the primary hashing algorithm for a given set of media data 210 from a set of candidate hashing algorithms, each of which may be supported by capture systems 105 and validation systems 120. If one of these candidate hashing algorithms becomes compromised, the certification system 110 may be configured to cease selecting the compromised algorithm for future sets of media data 210. Thus, the capture system 105 using a primary hashing algorithm that is dynamically determined (e.g., selected) by the certification system 110 may increase the robustness and security of the systems and techniques described herein. For example, different hashing algorithms may correspond to different seeds (e.g., numerical seed values) for one or more hashing algorithms. In some cases, the certification system 110 may rotate a set of available (eligible, usable) hashing algorithms on a triggered or scheduled (e.g., periodic) basis. For example, a different set of hashing algorithms may be available each hour or other unit of time, and the certification system 110 may indicate as such to the capture system 105.

While the capture system 105 using a primary hashing algorithm that is dynamically determined (e.g., selected) by the certification system 110 may increase the robustness and security of the systems and techniques described herein, a technical problem may arise, however, as the validation system 120 may need to determine which primary hashing algorithm was used for a set of media data 210 received from a capture system 105 and identify, in coordination with the certification system 110, the immutable ledger corresponding to the set of media data 210. Configuring the capture system 105 to use an alternative hashing algorithm that is globally known a priori, and thus known to the validation system 120, to create lookup hashes 230 may support validation system 120 creating its own lookup hashes 230 for an identified subset of media data 212 without security risks that may be associated with a globally known primary hashing algorithm or with transmitting an indicator of the primary hashing algorithm along with the set of media data 210. Further, the lookup hash 230 may serve as a unique identifier of the immutable ledger entry corresponding to the subset of media data 212, which may also provide a technical solution that supports the validation system 120 being able to validate a set of media data 210 received exclusive of any additional information and via a standard transmission mechanism (e.g., email) as opposed to via some specialized transmission protocol or mechanism.

In some cases, in response to initiation event 205, capture system 105 may transmit to certification system 110 a request for a new immutable ledger (which may be referred to as a new ledger request) and may receive from certification system 110 an indication of a primary hashing algorithm selected from a set of hashing algorithms supported by capture system 105. Capture system 105 may use the indicated primary hashing algorithm to create initiation metadata hash 222 and other hashes associated with set of media data 210. Capture system 105 may use a different, alternative hashing algorithm (e.g., a hashing algorithm globally known a priori, including to capture system 105) to create lookup hash 230.

For each subset of media data 212, along with a lookup hash 230, the capture system 105 may create a corresponding subset media hash 232, which may be a hash of the corresponding subset of media data 212 and may be created using the primary hashing algorithm for the set of media data 210.

For each subset of media data 212, the capture system 105 may also identify subset metadata 234. Subset metadata 234 may include any type of metadata applicable to subset of media data 212. For example, subset metadata 234 may include any metadata collected by the capture system 105 concurrently with capturing the corresponding subset of media data 212, or any metadata identified by the capture system 105 as having been collected concurrently with the capture of the corresponding subset of media data 212 (e.g., through corresponding time stamps).

In some cases, for each subset of media data 212, the capture system 105 may create a corresponding subset metadata hash 236, which may be a hash of the corresponding subset metadata 234 and may be created using the primary hashing algorithm for the set of media data 210.

In addition or as an alternative to subset metadata hash 236, in some cases, for each subset of media data 212, the capture system 105 may combine the corresponding subset metadata 234 with the corresponding subset of media data 212 to create a combined data set, which may be referred to as subset combo data 238. In such cases, the capture system 105 may create a corresponding subset combo hash 240, which may be a hash of the corresponding subset combo data 238 and may be created using the primary hashing algorithm for the set of media data 210.

In some examples, the capture system 105 may compress (e.g., using a compression algorithm or codec) media data (e.g., a subset of media data 212) before creating one or more cryptographic representations thereof (e.g., before creating a corresponding lookup hash 230, subset media hash 232, subset metadata hash 236, subset combo hash 240, global media hash 250, global metadata hash 254, or global combo hash 258). Thus, for example, a cryptographic representation of a set of media data 210 or of a subset of media data 212 may be based on a corresponding compressed version of the set of media data 210 or subset of media data 212. Compressing media data prior to creating a cryptographic representation of the media data may support validation of the compressed media data and may avoid a need to decompress a purported copy of media data in order to perform validation thereof, among other potential benefits. For example, were compression instead performed after creation of the cryptographic representation, then a candidate cryptographic representation subsequently created based on a compressed version of a purported copy of the media data would not match the trusted cryptographic representation that was created for the original media data, even if the purported copy was a valid copy.

In some examples, the capture system 105 may encrypt (e.g., using an encryption scheme) media data (e.g., a subset of media data 212) before creating one or more cryptographic representations thereof (e.g., before creating a corresponding lookup hash 230, subset media hash 232, subset metadata hash 236, subset combo hash 240, global media hash 250, global metadata hash 254, or global combo hash 258). Thus, for example, a cryptographic representation of a set of media data 210 or of a subset of media data 212 may be based on a corresponding encrypted version of the set of media data 210 or subset of media data 212. Encrypting media data prior to creating a cryptographic representation of the media data may support validation of the encrypted media data and may avoid a need to decrypt a purported copy of media data in order to perform validation thereof, among other potential benefits. For example, were encryption instead performed after creation of the cryptographic representation, then a candidate cryptographic representation subsequently created based on an encrypted version of a purported copy of the media data would not match the trusted cryptographic representation that was created for the original media data, even if the purported copy was a valid copy.

The capture system 105 may transmit, to the certification system 110, any lookup hash 230, subset media hash 232, subset metadata 234, subset metadata hash 236, or subset combo hash 240 that is created by the capture system 105, and the certification system 110 may be configured to write any lookup hash 230, subset media hash 232, subset metadata 234, subset metadata hash 236, or subset combo hash 240 received by the certification system 110 to the immutable ledger for the set of media data 210 in accordance with the techniques described herein. In some cases, the capture system 105 may transmit to the certification system 110 one or more of lookup hash 230, subset media hash 232, subset metadata 234, subset metadata hash 236, and subset combo hash 240 in real time. In some cases, real time may mean within a threshold amount of time after creating lookup hash 230, subset media hash 232, subset metadata 234, subset metadata hash 236, or subset combo hash 240 or after completing capture of the set of media data 210. In some cases, real time may mean while capturing a next subset of media data 212. In some cases, real time may mean while capturing any other portion of the set media data 210. In some cases, for example, the capture system 105 may transmit to certification system 110 one or more of lookup hash 230, subset media hash 232, subset metadata 234, subset metadata hash 236, and subset combo hash 240 while capturing another subset of media data 212 (e.g., while capturing an immediately subsequent subset of media data 212). In some cases, the capture system 105 may transmit to the certification system 110 one or more of a lookup hash 230, subset media hash 232, subset metadata 234, subset metadata hash 236, or subset combo hash 240 with some latency, which may be in excess of the threshold amount of time. For example, the capture system 105 may not have connectivity to the network 130 while capturing the corresponding subset of media data 212 and thus may transmit to the certification system 110 one or more of lookup hash 230, subset media hash 232, subset metadata 234, subset metadata hash 236, or subset combo hash 240 subsequent to establishing a communications link with network 130.

Upon identifying the termination event 215, the capture system 105 may create a global media hash 250, which may be a hash of the entirety of the set of media data 210 and may be created using the primary hashing algorithm for the set of media data 210. The capture system 105 may also identify metadata applicable to the entirety of the set of media data 210, which may be referred to as global metadata 252. Examples of global metadata 252 may include authentication credentials (e.g., user ID, biometric data, etc.), user profile data, a duration of the set of media data 210, an application used to create the set of media data 210, or any other type of metadata applicable to the entirety of the set of media data 210. For example, global metadata 252 may include some or all aspects of the initiation metadata 220. The capture system 105 may create a global metadata hash 254, which may be a hash of global metadata 252 and may be created using the primary hashing algorithm for the set of media data 210.

In addition or as an alternative to the global metadata hash 254, in some cases, the capture system 105 may combine global metadata 252 with the corresponding set of media data 210 to create a combined data set, which may be referred to as global combo data 256. In such cases, the capture system 105 may create a corresponding global combo hash 258, which may be a hash of global combo data 256 and may be created using the primary hashing algorithm for the set of media data 210.

The capture system 105 may transmit, to the certification system 110, any of a global media hash 250, global metadata 252, global metadata hash 254, or global combo hash 258 that is created by the capture system 105, and the certification system 110 may be configured to write any global media hash 250, global metadata 252, global metadata hash 254, or global combo hash 258 received by certification system 110 to the immutable ledger for the set of media data 210 in accordance with the techniques described herein. As with other types of metadata and hashes related to the set of media data 210, the capture system 105 may transmit any global media hash 250, global metadata 252, global metadata hash 254, or global combo hash 258 to the certification system 110 in real time (e.g., with a latency within the threshold amount of time) or at some later time (e.g., after establishing connectivity with network 130). In some examples, one or more of a global media hash 250, global metadata hash 254, or global combo hash 258 may be generated, written to the immutable ledger, and used for verification of a set of media data 210 in lieu of any hashes that are specific to a particular subset 212, any hashes that are specific to an initiation event or associated metadata, or any combination thereof. In other examples, one or more of a global media hash 250, global metadata hash 254, or global combo hash 258 may be generated, written to the immutable ledger, and used for verification of a set of media data 210 in combination with one or more hashes that are specific to a particular subset 212, one or more hashes that are specific to an initiation event or associated metadata, or any combination thereof.

In some cases, the termination event 215 may comprise a failure of the capture system 105, such as a loss of power by (e.g., dead battery), malfunction of, or even destruction of (e.g., a dropped or smashed smartphone) the capture system 105. In some cases, the certification system 110 may thus not receive global data, such as a global media hash 250 or may otherwise determine an abrupt end to a sequence of subsets of media data 212. In some such cases, the certification system 110 may create and store a flag (e.g., include in an entry of an immutable ledger, possibly an additional entry) that indicates an abrupt termination event 215, and upon validation, the validation system 120 may present an indication of the abrupt termination event 215 to a user.

In some cases, the capture system 105 may create one or more cryptographic representations as described herein for each subset of media data 212 but may transmit one or more cryptographic representations for only a subset (e.g., some) of the subsets of media data 212. For example, the capture system 105 may create one or more cryptographic representations as described herein for N−1 consecutive subsets of media data 212, then when creating one or more cryptographic representations for the subsequent (Nth) consecutive subset of media data 212, capture system 105 may base some or all of the one or more cryptographic representations for the subsequent (Nth) consecutive subset of media data 212 on some or all of the one or more cryptographic representations created for the N−1 prior subsets of media data 212. This may reduce the amount of information exchange with the certification system 110 while retaining security and authenticity benefits. Additionally or alternatively, steganographic techniques as described herein may be applied to all or some (e.g., every Nth) subsets of media data 212 within a set of media data 210.

In some cases, the capture system 105 may transmit one or more cryptographic representations or one or more types of metadata associated with a set of media data to the certification system 110, but may refrain from transmitting the media data (e.g., may not transmit the media data) to the certification system 110. This may reduce signaling overhead or latencies associated with the interactions between the capture system 105 and the certification system 110, may reduce storage requirements associated with the certification system 110, or any combination thereof, among other potential benefits.

In some cases, the capture system 105 may create a digital signature for the set of media data 210, or each subset of media data 212 included therein, using the private cryptographic key corresponding to the user profile associated with capturing the set of media data 210. The capture system 105 may store any created digital signature in association with the set of media data 210. Additionally or alternatively, the capture system 105 may transmit to a distribution system 115 or a certification system 110 any created digital signature in association with the set of media data 210. A validation system 120 that receives the set of media data 210 may receive the corresponding digital signature(s) as well as the corresponding public cryptographic key. For example, the validation system 120 may receive the digital signature (s) as well as the corresponding public cryptographic key from the capture system 105 or from the distribution system 115 (e.g., as part of a header file associated with the set of media data) or may receive the digital signature(s) from the certification system 110 as part of a validation process. The validation system 120 may verify the origin of the set of media data 210 (e.g., verify the user profile with which the set of media data 210 is associated) based on the digital signature(s) and corresponding public cryptographic key.

In some cases, upon or after the termination event 215, the certification system 110 may transmit to the capture system 105 an indication of the strength of validity for different subsets 212 of the set of media data 210. For example, the certification system 110 may transmit to capture system 105 one or more indications (e.g., to support display of a color-coded timeline or other indicators at the capture system 105) of whether, for a given subset 212, a corresponding aspect of associated metadata is favorable, disfavorable, or neutral for a subsequent validity analysis, such as whether associated latency of upload was fast or slow, associated GPS or other metadata was available or unavailable, consistent or inconsistent, strong or weak, whether a large or small amount (e.g., number of sources) of metadata was captured, or the like. The capture system 105 may also support viewing such indicators in a library of previously captured sets of media data 210.

In some examples, a set of media data 210 may be in accordance with a file format (e.g., container or other type or aspect of a file format) that includes multiple channels. For example, a set of video data may be in accordance with a file format that includes a video channel (that includes image content), an audio channel, and one or more additional channels. The one or more additional channels may include, for example, one or more data channels or one or more other channels into which metadata or other content can be written (e.g., embedded, encoded). In some such examples, the capture system 105 may write metadata associated with the set of media data 210 into one or more such additional channels, each of which may accordingly be referred to as a metadata channel. In some examples, creating a cryptographic representation as described herein may involve creating a cryptical representation of a particular channel or particular combination of channels (e.g., a subset media hash 232 or global media hash 250 may be of one or more of an image channel, an audio channel, or a video channel; a subset metadata hash 236 or global metadata hash 254 may be of one or more metadata channels; a subset combo hash 240 or global combo hash 258 may be of a combination of at least one of an image channel, an audio channel, or a video channel and at least one additional (e.g., metadata) channel). In some cases, multiple cryptographic representations of a same type may be created, each based on a different channel or combination of channels (e.g., one subset media hash 232 based on an image or video channel and another subset media hash 232 based on an audio channel; one subset metadata hash 236 based on one metadata channel and another subset metadata hash 236 based on another metadata channel).

Although aspects of the ledger-writing process 200 have been described with reference to FIG. 2 with respect to examples in which a capture system 105 performs the ledger-writing process 200 for a newly captured set of media data 210, a duplication system 150 may additionally or alternatively perform any aspect of the ledger-writing process 200 for an additional copy of a validated set of media data 210. For example, a duplication system 150 may generate an additional copy of a set of media data and create some or all of the hashes described with reference to FIG. 2 for the additional copy. The duplication system 150 obtain any type of metadata described with reference to FIG. 2 for the base copy that is used to generate the additional copy (e.g., metadata for the purported copy upon which the additional copy is based), and ascribe such metadata to the additional copy for the purposes of performing a ledger-writing process 200 for the additional copy. Additionally or alternative, the duplication system 150 may identify new metadata for the additional copy (e.g., related to a time or other circumstances of the creation of the additional copy), and ascribe such new metadata to the additional copy-instead of or in addition to the metadata for the purported copy upon which the additional copy is based—for the purposes of performing a ledger-writing process 200 for the additional copy.

Figure 3:
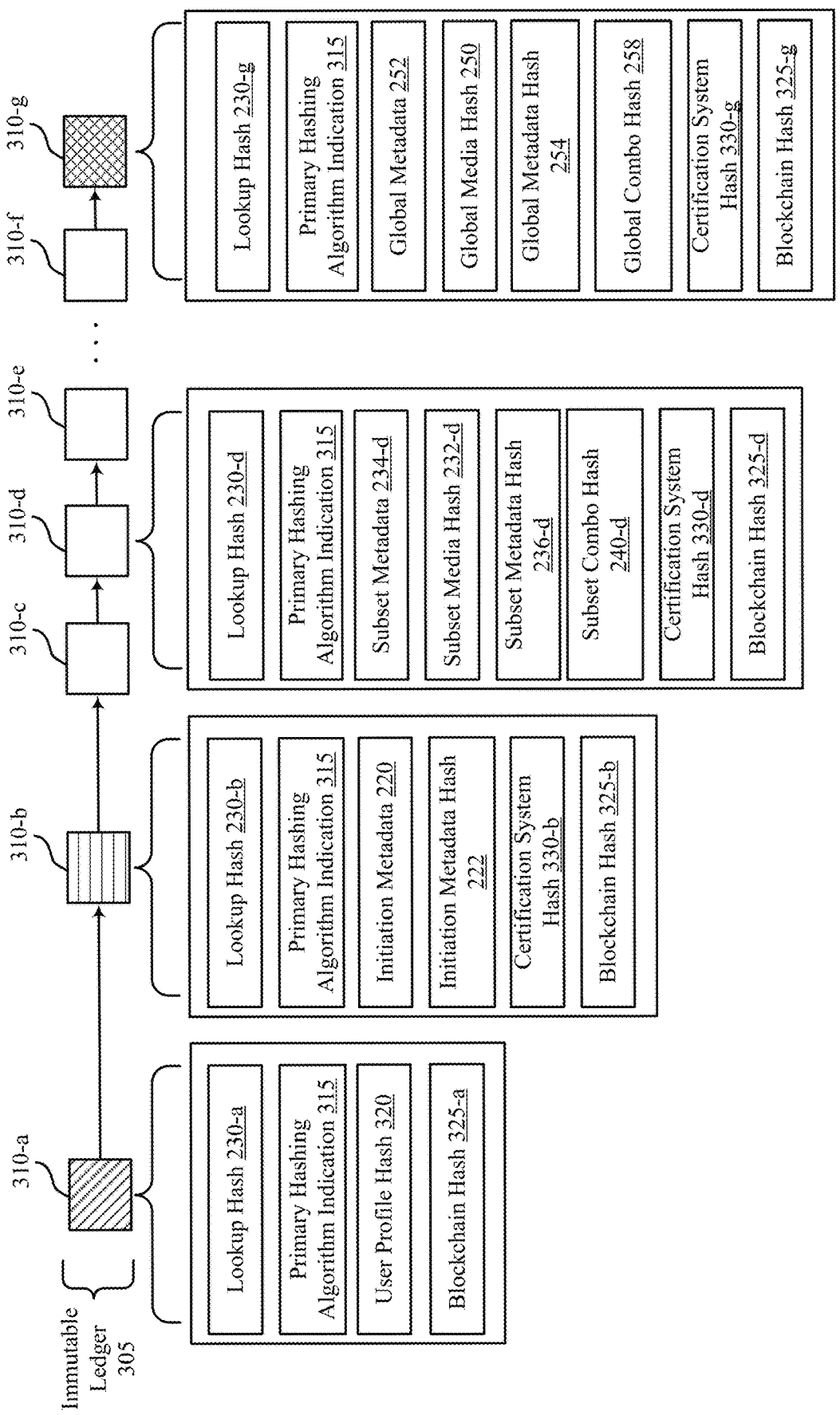
FIG. 3 illustrates an example of an immutable ledger that supports ledger-based validation and re-encoding of media data in accordance with aspects of the present disclosure.

FIG. 3 illustrates aspects of an immutable ledger 305 that supports identifying altered media data in accordance with aspects of the present disclosure. In some examples, the immutable ledger 305 may be created and stored by a certification system 110 as described with reference to FIG. 1. The immutable ledger 305 may correspond to a single set of media data 210 captured by a capture system 105 or generated by a duplication system 150 and may include any number of ledger entries 310. In some cases, the certification system 110 may encrypt the immutable ledger or any other content stored by the certification system, and store such information in encrypted form, in order to further enhance security of the contents of the certification system 110.

In some cases, a first ledger entry 310-a may relate to user profile data associated with the capture of the corresponding set of media data 210. For example, based on receiving a new ledger request from a capture system 105 or a duplication system 150, the certification system 110 may identify a user profile associated with a user of the capture system 105 or a device (e.g., a device ID) included in the capture system 105 that was used to originally capture the media data. Additionally or alternatively, the user profile data may include profile information associated a media platform 140 or a duplication system 150 used to generate the media data, where the media data comprises a copy of a base set of media data. In some cases, the certification system 110 may create a lookup hash 230-*a*, which may serve as a unique identifier of the first ledger entry 310-*a*, by hashing some or all of the user profile data using an alternative hashing algorithm, as described herein. In some cases, the capture system 105 or the duplication system 150 may identify the user profile data, create the lookup hash 230-*a*, and transmit the lookup hash 230-*a* to the certification system 110—the certification system 110 may then store the received lookup hash 230-*a*.

As described herein, the certification system 110 may, based on receiving a new ledger request from a capture system 105 or duplication system 150, determine (e.g., select) a primary hashing algorithm for the corresponding set of media data 210. The certification system 110 may transmit to the capture system 105 or duplication system 150 an indication of the primary hashing algorithm for the corresponding set of media data 210 and also may store as part of the first ledger entry 310-*a* a primary hashing algorithm indication 315 that comprises an indicator of the primary hashing algorithm.

In some cases, the certification system 110, the capture system 105, or a duplication system 150 may create a user profile hash 320, which may be a hash of the user profile data associated with the capture of the corresponding set of media data 210, the generation of an additional copy of the corresponding set of media data 210, or any combination thereof, and may be created using the primary hashing algorithm for the set of media data 210. If created by the capture system 105 or duplication system 150, the capture system 105 or duplication system 150 may transmit the user profile hash 320 to the certification system 110. The certification system 110 may store the user profile hash 320 as part of the first ledger entry 310-*a*. Thus, at least one ledger entry 310 (e.g., the first ledger entry 310-*a*) for the set of media data 210 may be based on user profile data for a user or device of the capture system 105, for a media platform 140 or duplication system 150, or any combination thereof.

The certification system 110 may also create, as part of each ledger entry 310, a blockchain hash 325. In general, the blockchain hash 325 for a given ledger entry 310 may be a hash of all other contents of the given ledger entry 310 as well as the blockchain hash 325 for a preceding ledger entry 310. In the case of the first ledger entry 310-*a*, there may not be a preceding ledger entry 310, and thus, blockchain hash 325-*a* may be a hash of all other contents of first ledger entry 310-*a*. In the case of the second ledger entry 310-*b*, blockchain hash 325-*b* may be a hash of all other contents of the second ledger entry 310-*b* plus blockchain hash 325-*a*.

The certification system 110 may create blockchain hashes 325 using a hashing algorithm that is distinct from any primary hashing algorithm (that is, not included among the set of candidate primary hashing algorithms) and also distinct from the alternative hashing algorithm used for lookup hashes 230. The hashing algorithm used to create blockchain hashes 325 may be referred to as a blockchain hashing algorithm. The certification system 110 may not share the blockchain hashing algorithm outside of the certification system 110 (e.g., may not share the blockchain hashing algorithm with the capture system 105, or the duplication system 150, or the validation system 120). Creating blockchain hashes 325 using a hashing algorithm unknown outside of the certification system 110 may provide a technical solution that enhances the security of the immutable ledger 305 stored by the certification system 110. For example, even if a primary hashing algorithm is compromised, or even if a primary hashing algorithm becomes undesirably known, the contents of the immutable ledger may still be verified against altered versions thereof based on the blockchain hashing algorithm (e.g., whether relevant data, when hashed using the blockchain hashing algorithm, matches a corresponding blockchain hash 325).

In some cases, the second ledger entry 310-*b* may relate to an initiation event 205 for the corresponding set of media data 210. For example, the second ledger entry 310-*b* may include lookup hash 230-*b*, which may be created by the certification system 110 using the alternative hashing algorithm or created by the capture system 105 or duplication system 150 using the alternative hashing algorithm and transmitted by the capture system 105 or duplication system 150 to the certification system 110. In the case of a ledger entry 310 for an initiation event 205, the lookup hash 230 (e.g., lookup hash 230-*b*) may be a hash of the corresponding initiation metadata 220 that is created using the alternative hashing algorithm (and thus is distinct from the corresponding initiation metadata hash 222, which may be created using the primary hashing algorithm). The second ledger entry 310-*b* may also include primary hashing algorithm indication 315. Additionally, the second ledger entry 310-*b* may include initiation metadata 220 and an initiation metadata hash 222, which may be received by the certification system 110 from the capture system 105 or duplication system 150. In some cases, the second ledger entry 310-*b* may include certification system hash 330-*b*. In some cases, certification system hash 330-*b* may be a hash of initiation metadata hash 222 and may be created by the certification system 110 using the blockchain hashing algorithm. In some cases, certification system hash 330-*b* may be a receipt (e.g., a receipt timestamp or identifier, or a hash of a timestamp of receipt or other receipt identifier). Though not shown in the example of FIG. 2, in some cases all ledger entries 310 may include a certification system hash 330 (e.g., ledger entry 310-*a* may include a certification system hash 330-*a*, which may be based on the user profile data associated with ledger entry 310-*a*). The second ledger entry 310-*b* may further include blockchain hash 325-*b*, which may be a hash of all other contents of second ledger entry 310-*b* plus blockchain hash 325-*a* and may be created by the certification system 110 using the blockchain hashing algorithm. In some cases, the certification system 110 may additionally or alternatively store metadata-initiation metadata 220 or any other type of metadata described herein—in an intermediary system or otherwise independent of the immutable ledger 305, which may support enhanced efficiency in retrieving metadata and providing metadata to a validation system 120.

In some cases, the certification system 110 may include alternative or additional blockchain-type hashes in a ledger entry 310. For example, in the alternative or in addition to a blockchain hash 325, the certification system 110 may create a blockchain based on subset metadata 234 or just the subset media hash 232 for a given entry. Thus, an immutable ledger 305 may include one or more blockchains, each block of the blockchain corresponding to some or all of the of the content of a corresponding ledger entry 310. Any blockchain-type hash included in a ledger entry may be created and subsequently utilized in accordance with the teachings herein regarding blockchain hashes 325.

The ledger entries 310-c through 310-f may each respectively correspond to a subset of media data 212 for the set of media data 210. It is to be understood that a set of media data 210 may have any number of subsets of media data 212, and thus an immutable ledger 305 may include any number of corresponding ledger entries 310. The fourth ledger entry 310-d may be a representative example of ledger entries 310-c through 310-f, and thus of a ledger entry 310 corresponding to a subset of media data 212. The fourth ledger entry 310-d may include one or more of a corresponding lookup hash 230-d, which may be received from the capture system 105 or duplication system 150, and a primary hashing algorithm indication 315. The fourth ledger entry 310-d may also include subset metadata 234-d, subset media hash 232-d, and subset metadata hash 236-d, each of which may be received from the capture system 105 or duplication system 150. In some cases, the fourth ledger entry 310-d may further include subset combo hash 240-d, additionally or as an alternative to subset metadata hash 236-d, if created by and received from the capture system 105 or duplication system 150. In some cases, the fourth ledger entry 310-d may further include certification system hash 330-d, which may be a hash of subset metadata hash 236-d or subset combo hash 240-d and may be created by the certification system 110 using the blockchain hashing algorithm. The fourth ledger entry 310-d may further include blockchain hash 325-d, which may be a hash of all other contents of the fourth ledger entry 310-d plus blockchain hash 325-c (not shown, but included in third ledger entry 310-c) and may be created by the certification system 110 using the blockchain hashing algorithm.

In some cases, the immutable ledger 305 may include a final ledger entry 310-g based on a termination event 215 for the corresponding set of media data 210. In some cases, the certification system 110 may create a lookup hash 230-g, which may serve as a unique identifier of the final ledger entry 310-g, by hashing some or all of the global metadata 252 for the set of media data 210 using the alternative hashing algorithm. In some cases, the capture system 105 or duplication system 150 may create the lookup hash 230-g by hashing some or all of the global metadata 252 for the set of media data 210 and may transmit the lookup hash 230-g to the certification system 110—the certification system 110 may then store the lookup hash 230-g received from the capture system 105 or duplication system 150. The final ledger entry 310-g may also include a primary hashing algorithm indication 315. Additionally, the final ledger entry 310-g may include global metadata 252, global media hash 250, and global metadata hash 254, each of which may be received from the capture system 105 or duplication system 150. In some cases, the final ledger entry 310-g may include global combo hash 258, additionally or as an alternative to global metadata hash 254, if created by and received from the capture system 105 or duplication system 150. In some cases, the final ledger entry 310-g may further include certification system hash 330-g, which may be a hash of global metadata hash 254 or global combo hash 258 and may be created by the certification system 110 using the blockchain hashing algorithm. The final ledger entry 310-g may further include blockchain hash 325-g, which may be a hash of all other contents of the final ledger entry 310-g plus blockchain hash 325-f (not shown, but included in the penultimate ledger entry 310-f) and may be created by the certification system 110 using the blockchain hashing algorithm.

In some cases, the certification system 110 may identify (e.g., capture, determine, calculate, or otherwise create) additional metadata for the set of media data 210. The certification system 110 may add such additional metadata to (e.g., incorporate with) metadata received from the capture system 105 or duplication system 150, such that metadata included in the immutable ledger may (and corresponding hashes may also be based on) metadata identified by the certification system 110. For example, the certification system 110 may identify user profile data associated with the set of media data 210 (e.g., by exchanging one or more messages with a profile management system 125) in addition or in the alternative to the capture system 105 or duplication system 150 identifying such metadata. As another example, the certification system 110 generate one or more timestamps indicating when the certification system 110 received one or more aspects of the data received from the capture system 105 or duplication system 150. In some cases, the certification system 110 may generate one or more indications of a latency between when one or more aspects of the data related to the set of media data 210 were generated by the capture system 105 or duplication system 150 (e.g., based on data received from the capture system 105 or duplication system 150) and when such aspects of the data were received by the certification system 110.

While one immutable ledger 305 is illustrated in the example FIG. 3 for case of description and clarity, it is to be understood that certification system 110 may store any number of immutable ledgers 305 respectively corresponding to any number of sets of media data 210. Further, it is to be understood that an immutable ledger 305 may, in some cases, include only a subset of the ledger entries illustrated in the example shown in FIG. 3 (e.g., may include only ledger entries 310 corresponding to subsets of media data 212, such as, for example, only ledger entries 310-c through 310-f; or may include on ledger entries 310-b through 310-g).

It is also to be understood that the certification system 110 may span any number of logically or physically distinct devices and that, in some cases, the certification system 110 may replicate a single immutable ledger 305 at each of any number of logically or physically distinct devices. Thus, the immutable ledger 305 may in some cases be a distributed ledger. Such replication may further enhance the robustness and security of the immutable ledger 305 and the certification system 110, as polling techniques may be used as described herein to confirm the validity of the contents of a given ledger entry 310. Where the certification system 110 spans multiple logically or physically distinct devices, the distinct devices may be commonly owned by a single entity (e.g., a government entity such as a police department or judicial body or a private entity such as a provider of trusted media systems or a surveillance company) or may have distinct ownership.

Figure 4:
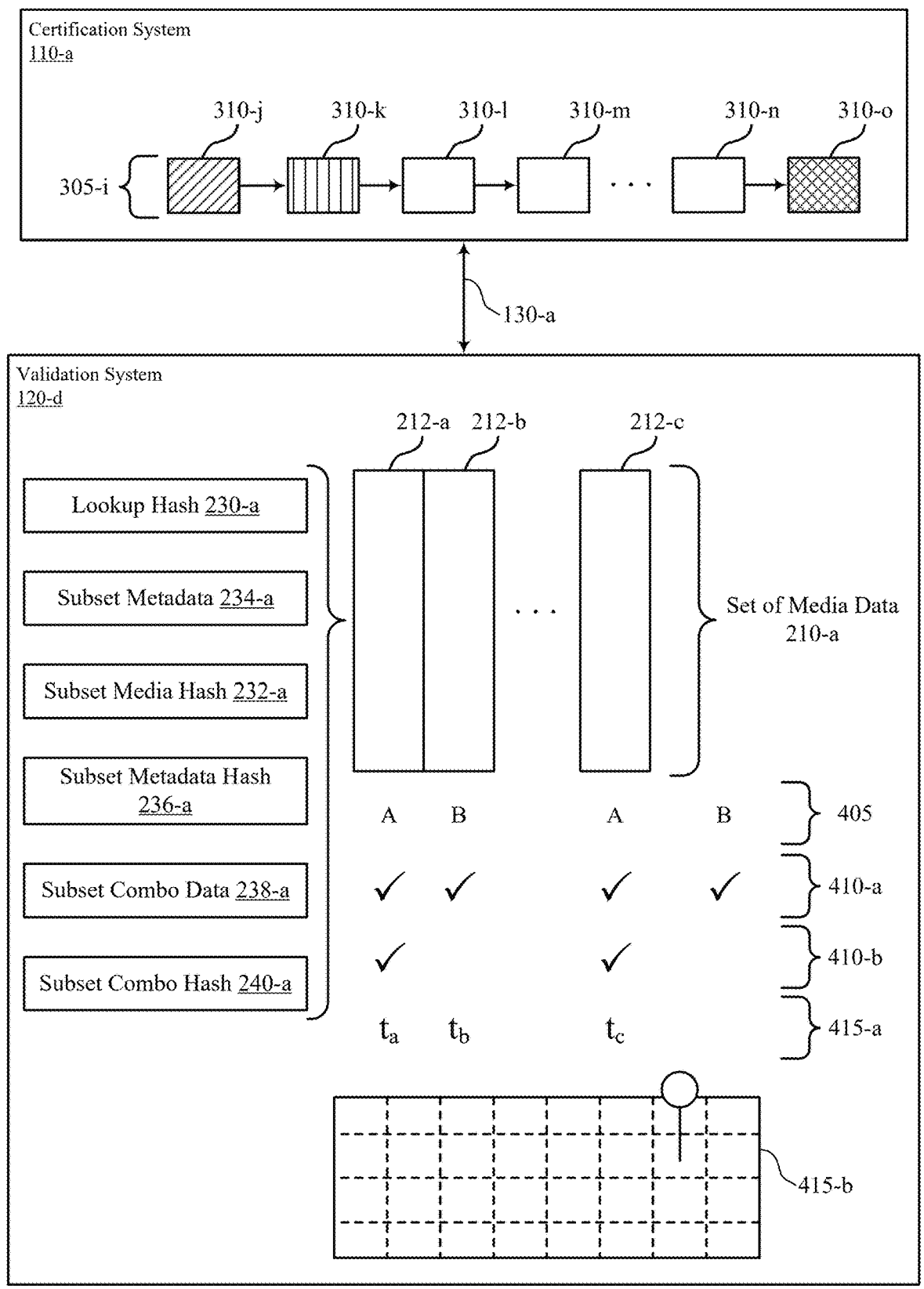
FIG. 4 illustrates an example of a process for validating media data that supports ledger-based validation and re-encoding of media data in accordance with aspects of the present disclosure.

FIG. 4 illustrates an example of a validation process 400 that supports identifying altered media data in accordance with aspects of the present disclosure. In some examples, the validation process 400 may be implemented by a certification system 110-a and a validation system 120-d, which may be examples of a certification system 110 and a validation system 120 as described with reference to FIG. 1. The certification system 110-a and the validation system 120-d may be communicatively coupled by a communications link 130-a, which may comprise aspects of a network 130 as described with reference to FIG. 1. The validation system 120-d may, for example, be included in a media platform 140 or a client system 145 as described with reference to FIG. 1.

The validation system 120-*d* may receive a set of media data 210-*a*. The set of media data 210-*a* may be a purported copy of some corresponding (e.g., initial, original, base) set of media data 210 that was previously captured by a capture system 105. In some cases, a user of the validation system 120-*d* may upload or import the set of media data 210-*a* to the validation system 120-*d* (e.g., to a media platform 140 or a client system 145 that includes the validation system 120-*d*). Additionally or alternatively, the validation system 120-*d* may receive the set of media data 210-*a* from a capture system 105 via a communications link between the validation system 120-*d* and the capture system 105 (e.g., via a communications link included in network 130). In some cases, the validation system 120-*d* may receive the set of media data 210-*a* by way of a distribution system 115 (e.g., via a peer-to-peer or app-to-app transfer from capture system 105 to validation system 120-*d* that is facilitated by a distribution system 115). In some cases, the set of media data 210-*a* may comprise only a portion a set of media data 210 as captured by a capture system 105 (e.g., a capture system 105 may have captured a video, and the set of media data 210-*a* may be a purported copy of only an excerpt of the video).

The validation system 120-*d* may identify one or more subsets of media data 212 included in the set of media data 210-*a*. For example, the validation system 120-*d* may be preconfigured with information regarding the predefined duration (e.g., 15 second intervals or intervals of some other duration) or portion size (e.g., X frames, Y audio samples, Z pixels of an image, or like portion) used by capture systems 105 to segment (e.g., divide) sets of media data 210 into subsets of media data 212. In some cases, the duration or amount of media data in a subset of media data 212 may be configured by the certification system 110 on a periodic or ad hoc basis and may thus change over time. If the size of the set of media data 210-*a* is smaller than the predefined duration or portion size, the validation system 120-*d* may identify only one subset of media data 212 included in the set of media data 210-*a* (e.g., the only one subset of media data 212 may be coextensive with the set of media data 210-*a*). If the size of the set of media data 210-*a* is larger than the predefined duration or portion size, as in the example illustrated in FIG. 4, the validation system 120-*d* may identify multiple subsets of media data 212 included in the set of media data 210-*a*. In some cases, the validation system 120-*d* may identify one or more subsets of media data 212 included in set of media data 210-*a* based on a header file for set of media data 210-*a* that may be received by the validation system 120-*d*.

The validation system 120-*d* may identify a first subset of media data 212-*a* included in the set of media data 210-*a*. If the size of the set of media data 210-*a* is smaller than the predefined duration or portion size, validation system 120 may identify the only one subset of media data 212 as the first subset of media data 212-*a*. If the size of the set of media data 210-*a* is larger than the predefined duration or portion size, as in the example illustrated in FIG. 4, the validation system 120-*d* may identify the first subset of media data 212-*a* according to a predefined set of rules (e.g., a temporally first subset of media data 212 in the case of audio or video data, or a subset of media data 212 corresponding to a predefined position, such as a corner, in the case of image data).

Based on the first subset of media data 212-*a*, the validation system 120-*d* may create a corresponding lookup hash 230-*a*. For example, the validation system 120-*d* may create the lookup hash 230-*a* using an alternative, globally-known hashing algorithm as described herein. The validation system 120-*d* may transmit the lookup hash 230-*a* to the certification system 110-*a*, and the certification system 110-*a* may determine whether a ledger entry 310 corresponding to the first subset of media data 212-*a* exists based on the lookup hash 230-*a*. For example, the certification system 110-*a* may use lookup hashes 230 as ledger entry identifiers, and the certification system 110-*a* may determine whether a ledger entry 310 corresponding to the first subset of media data 212-*a* exists by determining whether there exists a ledger entry 310 with an identifier (e.g., a lookup hash 230 included in the ledger entry 310) identical to the lookup hash 230-*a*. In some cases, along with the lookup hash 230-*a*, the validation system 120 may transmit to the certification system 110 an indication of a number of subsets of media data 212 included in the set of media data 210—that is, an indication of how many subsets of media data 212 are included in the set of media data 210—or an indication of a duration or size of the set of media data 210, from which the certification system 110-*a* may determine the number of subsets of media data 212 included in the set of media data 210.

In some cases, the validation system 120-*d* may create a corresponding lookup hash 230 for any number of subsets 212 and engage in a like routine (e.g., transmitting the lookup hash 230 to the certification system 110 for determination of whether a corresponding subset of media data 212 and ledger entry 310 (and thus ledger 305) exists) for each lookup hash 230 created. For example, as described herein, a capture system 105 or distribution system 150 may create (in conjunction with the certification system 110) a ledger entry 310 only for some subsets 212 (e.g., every eighth subset 212), and thus validation system 120 may engage in a trial and error procedure involving multiple lookup hashes to determine whether a corresponding ledger 305 exists.

In some cases, the validation system 120-*d* or the certification system 110-*a* may identify the set of media data 210-*a* or the corresponding immutable ledger 305-*i* based on other information included in a file that includes the set of media data 210-*a*, such as information included in a header of such a file. Such other information may be a unique identifier, metadata, or a hash (e.g., the lookup hash 230-*a* or some other type of hash).

If the certification system 110-*a* determines that no ledger entry 310 corresponding to the first subset of media data 212-*a* exists, the certification system 110-*a* may transmit to the validation system 120-*d* an indication that no immutable ledger 305 corresponding to the set of media data 210-*a* exists. Where no immutable ledger 305 corresponding to the set of media data 210-*a* exists, the validation system 120-*d* and the certification system 110-*a* may be unable to validate the set of media data 210-*a*. In such cases, based on receiving the indication that no immutable ledger 305 corresponding to the set of media data 210-*a* exists, the validation system 120-*d* may output an alert that the set of media data 210-*a* cannot be validated (e.g., by audibly or visibly presenting a notification to a user via display or speaker hardware included in or coupled with the validation system 120-*d*, by storing or outputting a flag that indicates that the set of media data 210-*a* cannot be validated).

In the example illustrated in FIG. 4, the certification system 110-*a* may determine that a ledger entry 310-1 corresponds to the first subset of media data 212-*a*, and thus that immutable ledger 305-*i* corresponds to set of media data 210-*a*. Based on determining that the ledger entry 310-1 corresponding to first subset of media data 212-*a* exists, the certification system 110-*a* may evaluate a blockchain hash 325 included in the corresponding ledger entry 310-1 (e.g., determine whether the blockchain hash 325 included in the corresponding ledger entry 310-1 is valid). In some cases, the certification system 110-*a* may evaluate the blockchain hash 325 included in the corresponding ledger entry 310-1 at least in part by hashing the other contents of the corresponding ledger entry 310-1 plus the blockchain hash 325 included in another ledger entry 310 within the corresponding immutable ledger 305 (e.g., a blockchain hash 325 included in immediately prior ledger entry 310-*k*). Additionally or alternatively, in some cases the certification system 110-*a* may evaluate the blockchain hash 325 included in the corresponding ledger entry 310-1 at least in part by polling a plurality of replicas of immutable ledger 305-*i* and determining whether the plurality of replicas are unanimous with respect to the blockchain hash 325 included in corresponding ledger entry 310-1. In addition or as an alternative to evaluating the blockchain hash 325, in some cases the certification system 110-*a* may evaluate a certification system hash 330 included in in corresponding ledger entry 310-1, and it is to be understood that all validation techniques described herein related to a blockchain hash 325 may additionally or alternatively apply to a certification system hash 330.

If the certification system 110-*a* determines that the blockchain hash 325 included in the ledger entry 310-1 corresponding to first subset of media data 212-*a* is not valid, the certification system 110-*a* may transmit to the validation system 120-*d* an indication that the corresponding ledger entry 310-1 is not valid. In such cases, based on receiving the indication that the corresponding ledger entry 310-1 is not valid, the validation system 120-*d* may output an alert that the ledger entry 310-1 or the immutable ledger 305-*i* corresponding to the first subset of media data 212-*a* is not valid, and that the set of media data 210-*a* therefore cannot be validated (e.g., by audibly or visibly presenting a notification to a user via display or speaker hardware included in or coupled with the validation system 120-*d*, by storing or outputting a flag that indicates that the set of media data 210-*a* cannot be validated).

If the certification system 110-*a* determines that the blockchain hash 325 included in the corresponding ledger entry 310-1 is valid, the certification system 110-*a* may transmit to the validation system 120-*d* an indication of the validity of the corresponding ledger entry 310-1. In some cases, the indication of the validity of the corresponding ledger entry 310-1 may be implicit. For example, the certification system 110-*a* may implicitly indicate to the validation system 120-*d* that the corresponding ledger entry 310-1 is valid by transmitting to the validation system 120-*d* certain data from the corresponding ledger entry 310-1. For example, the certification system 110-*a* may transmit to the validation system 120-*d* one or more of a primary hashing algorithm indication 315, subset metadata 234, subset media hash 232, subset metadata hash 236, or subset combo hash 240 included in the corresponding ledger entry 310-1. The validation system 120-*d* may treat any ledger entry data received from the certification system 110-*a* as a trusted version thereof (e.g., the validation system 120-*d* may treat a subset media hash 232 received from the certification system 110-*a* as a trusted subset media hash 232).

In some cases, validation system 120-*d* may receive subset metadata 234 independent of the certification system 110-*a* (e.g., from a capture system 105, via a distribution system 115, included in a header file associated with the set of media data 210-*a*, or as a separate file that may be associated with the set of media data 210-*a*). In such cases, validation system 120-*d* may not receive subset metadata 234 or a corresponding subset metadata hash 236, but may otherwise validate the subset metadata 234 in accordance with the techniques described herein (e.g., creating of a candidate subset metadata hash 236 based on the subset metadata 234 and local or remote comparison with a trusted version thereof).

In some examples, for any trusted version of a subset media hash 232, subset metadata hash 236, or subset combo hash 240 received from the certification system 110-*a*, the validation system 120-*d* may use the indicated primary hashing algorithm to create its own candidate version thereof, which the validation system 120-*d* may then compare with the corresponding trusted version. Such examples may be referred to as local validation examples because comparisons of candidate hashes with trusted versions thereof may be performed by the validation system 120-*d*.

For example, the validation system 120-*d* may hash the first subset of media data 212-*a* using the indicated primary hashing algorithm to create a candidate subset media hash 232-*a*, may compare the candidate subset media hash 232-*a* with a trusted version thereof received from the certification system 110-*a*, and may determine that the first subset of media data 212-*a* is valid only if the candidate subset media hash 232-*a* matches the trusted version thereof. Additionally, the validation system 120-*d* may hash the subset metadata 234-*a* using the indicated primary hashing algorithm to create a candidate subset metadata hash 236-*a*, may compare the candidate subset metadata hash 236-*a* with a trusted version thereof received from the certification system 110-*a*, and may determine that the first subset of media data 212-*a* is valid only if the candidate subset metadata hash 236-*a* matches the trusted version thereof. Alternatively or additionally, in some cases the validation system 120-*d* may combine the subset metadata 234-*a* with the first subset of media data 212-*a* to create corresponding subset combo data 238-*a*, may hash the subset combo data 238-*a* using the indicated primary hashing algorithm to create a candidate subset combo hash 240-*a*, may compare the candidate subset combo hash 240-*a* with a trusted version thereof received from the certification system 110-*a*, and may determine that the first subset of media data 212-*a* is valid only if the candidate subset combo hash 240-*a* matches the trusted version thereof.

In some examples, the validation system 120-*d* may use the indicated primary hashing algorithm to create its own version of a subset media hash 232, subset metadata hash 236, or subset combo hash 240, which the validation system 120-*d* may then send to the certification system 110-*a* in order for the certification system 110-*a* to compare with the corresponding trusted version. Such examples may be referred to as remote validation examples because comparisons of hashes created by the validation system 120-*d* with trusted versions thereof may be performed by the certification system 110-*a*, and thus remotely from validation system 120. In some remote validation examples, the validation system 120-*d* may receive from certification system 110 only one or more of a primary hashing algorithm indication 315 or subset metadata 234, exclusive of any trusted versions of a subset media hash 232, subset metadata hash 236, or subset combo hash 240.

For example, the validation system 120-*d* may hash the first subset of media data 212-*a* using the indicated primary hashing algorithm to create a candidate subset media hash 232-*a* and transmit the candidate subset media hash 232-*a* to the certification system 110-*a*, which may then compare the candidate subset media hash 232-*a* with a trusted version thereof already stored by the certification system 110-*a*. The certification system 110-*a* may transmit to the validation system 120-*d* an indication of whether the candidate subset media hash 232-*a* matches the trusted version thereof, which may be referred to as an evaluation result. The validation system 120-*d* may determine that the first subset of media data 212-*a* is valid only if the candidate subset media hash 232-*a* matches the trusted version thereof. Additionally, the validation system 120-*d* may hash the subset metadata 234-*a* using the indicated primary hashing algorithm to create a candidate subset metadata hash 236-*a* and transmit the candidate subset metadata hash 236-*a* to the certification system 110-*a*, which may then compare the candidate subset metadata hash 236-*a* with a trusted version thereof already stored by the certification system 110-*a*. The certification system 110-*a* may transmit to the validation system 120-*d* an indication of whether the candidate subset metadata hash 236-*a* matches the trusted version thereof, which may be referred to as an evaluation result. In some cases, the validation system 120-*d* may determine that the first subset of media data 212-*a* is valid only if the candidate subset metadata hash 236-*a* matches the trusted version thereof. Additionally or alternatively, the validation system 120-*d* may combine the subset metadata 234-*a* with the first subset of media data 212-*a* to create subset combo data 238-*a*, may hash the subset combo data 238-*a* using the indicated primary hashing algorithm to create a candidate subset combo hash 240-*a*, and may transmit the candidate subset combo hash 240-*a* to the certification system 110-*a*, which may then compare the candidate subset combo hash 240-*a* with a trusted version thereof already stored by the certification system 110-*a*. The certification system 110-*a* may transmit to the validation system 120-*d* an indication of whether the candidate subset combo hash 240-*a* matches the trusted version thereof, which may be referred to as an evaluation result. The validation system 120-*d* may determine that the first subset of media data 212-*a* is valid only if the candidate subset combo hash 240-*a* matches the trusted version thereof.

The validation system 120-*d* and certification system 110 may repeat a validation process-either a local validation example or a remote validation example—for each subset of media data 212 included in set of media data 210-*a*. Thus, for each subset of media data 212, either validation system 120 or certification system 110 may compare a candidate version of one or more of a subset media hash 232, subset metadata hash 236, or subset combo hash 240 with a trusted version thereof. In some cases, some subsets of media data 212 may be determined to be valid and others may be determined to be invalid. The validation system 120-*d* may continue attempting to validate each received subset of media data 212, or in other cases, may stop attempting to validate received subsets of media data 212 after a certain number (e.g., satisfying a threshold) are determined to be invalid.

In some cases, the validation process for subsets of media data 212 may occur concurrently with the validation system 120-*d* presenting the set of media data 210-*a* (e.g., playing the video or audio data, or displaying the image data). For example, upon completion of the validation process for first subset of media data 212-*a*, the validation system 120-*d* may present to a user first subset of media data 212-*a*, and the validation process for second subset of media data 212-*b* may occur concurrently with the validation system 120-*d* presenting first subset of media data 212-*a*—thus, validation of one subset of media data 212 may occur concurrent with presentation of at least one other subset of media data 212. In other cases, the validation system 120-*d* and the certification system 110-*a* may complete the validation process for each subset of media data 212, then the validation system 120-*d* may begin presenting the set of media data 210-*a*.

In some cases, the validation system 120-*d* and the certification system 110-*a* may conduct a global validation process for set of media data 210-*a*, either as an alternative or in addition to conducting a validation process for each subset of media data 212 therein. For example, the validation system 120-*d* may hash the entire set of media data 210-*a* using the indicated primary hashing algorithm to create a candidate global media hash 250, may compare the candidate global media hash 250 with a trusted version thereof received from the certification system 110-*a*, and may determine that the set of media data 210-*a* is valid only if the candidate global media hash 250 matches the trusted version thereof. Additionally, the validation system 120-*d* may hash all received subset metadata 234 (or global metadata 252 received from certification system 110) using the indicated primary hashing algorithm to create a candidate global metadata hash 254, may compare the candidate global metadata hash 254 with a trusted version thereof received from certification system 110, and may determine that the set of media data 210-*a* is valid only if the candidate global metadata hash 254 matches the trusted version thereof. Additionally or alternatively, in some cases the validation system 120-*d* may combine the global metadata 252 with the set of media data 210-*a* to create corresponding global combo data 256, hash the global combo data 256 using the indicated primary hashing algorithm to create a candidate global combo hash 258, may compare the candidate global combo hash 258 with a trusted version thereof received from certification system 110, and may determine that the set of media data 210-*a* is valid only if the candidate subset combo hash 240-*a* matches the trusted version thereof.

As another example, the validation system 120-*d* may hash the entire set of media data 210-*a* using the indicated primary hashing algorithm to create a candidate global media hash 250 and transmit the candidate global media hash 250 to the certification system 110-*a*, which may then compare the candidate global media hash 250 with a trusted version thereof already stored by the certification system 110-*a*. The certification system 110-*a* may transmit to the validation system 120-*d* an indication of whether the candidate global media hash 250 matches the trusted version thereof, which may be referred to as an evaluation result. The validation system 120-*d* may determine that the set of media data 210-*a* is valid only if the candidate global media hash 250 matches the trusted version thereof. Additionally, the validation system 120-*d* may hash all received subset metadata 234 (or global metadata 252 received from certification system 110) using the indicated primary hashing algorithm to create a candidate global metadata hash 254 and transmit the candidate global metadata hash 254 to the certification system 110-*a*, which may then compare the candidate global metadata hash 254 with a trusted version thereof already stored by the certification system 110-*a*. The certification system 110-*a* may transmit to the validation system 120-*d* an indication of whether the candidate global metadata hash 254 matches the trusted version thereof, which may be referred to as an evaluation result. The validation system 120-*d* may determine that the set of media data 210-*a* is valid only if the candidate global metadata hash 254 matches the trusted version thereof. Additionally or alternatively, the validation system 120-*d* may combine all received subset metadata 234 (or global metadata 252 received from certification system 110) with the set of media data 210-*a* to create global combo data 256, hash the global combo data 256 using the indicated primary hashing algorithm to create a candidate global combo hash 258, and transmit the candidate global combo hash 258 to the certification system 110-*a*, which may then compare the candidate global combo hash 258 with a trusted version thereof already stored by the certification system 110-*a*. The certification system 110-*a* may transmit to the validation system 120-*d* an indication of whether the candidate global combo hash 258 matches the trusted version thereof, which may be referred to as an evaluation result. In some cases, the validation system 120-*d* may determine that the set of media data 210-*a* is valid only if the candidate global combo hash 258 matches the trusted version thereof.

In some examples, a purported copy of media data may be compressed (e.g., in accordance with a compression algorithm or codec) when obtained by the validation system 120-*d*, such as due to having been previously compressed by a capture system 105 or duplication system 150. The capture system 105 may create a candidate cryptographic representation based on the purported copy of the media data (e.g., a lookup hash 230, subset media hash 232, subset metadata hash 236, subset combo hash 240, global media hash 250, global metadata hash 254, or global combo hash 258 for a purported copy of a set of media data 210 or subset of media data 212) before decompressing (e.g., using a corresponding decompression algorithm or codec) the media data. This may allow for an apples-to-apples comparison as between a candidate cryptographic representation created by the validation system 120-*d* and a corresponding trusted cryptographic representation previously created by the capture system 105 or duplication system 150 (e.g., due to the trusted cryptographic representation having been created after compression of the original media data), may allow for decompression-related processing to be performed only as-needed (e.g., only in the event of a validity determination, such as based on one or more sets of matching candidate and trusted cryptographic representations), or any combination thereof, among other potential benefits.

In some examples, a purported copy of media data may be encrypted (e.g., in accordance with an encryption scheme) when obtained by the validation system 120-*d*, such as due to having been previously encrypted by a capture system 105 or duplication system 150. The capture system 105 may create a candidate cryptographic representation based on the purported copy of the media data (e.g., a lookup hash 230, subset media hash 232, subset metadata hash 236, subset combo hash 240, global media hash 250, global metadata hash 254, or global combo hash 258 for a purported copy of a set of media data 210 or subset of media data 212) before encrypting (e.g., using a corresponding decryption scheme) the media data. This may allow for an apples-to-apples comparison as between a candidate cryptographic representation created by the validation system 120-*d* and a corresponding trusted cryptographic representation previously created by the capture system 105 or duplication system 150 (e.g., due to the trusted cryptographic representation having been created after encryption of the original media data), may allow for encryption-related processing to be performed only as-needed (e.g., only in the event of a validity determination, such as based on one or more sets of matching candidate and trusted cryptographic representations), or any combination thereof, among other potential benefits.

The validation system 120-*d* may determine a level of validity of set of media data 210-*a* based on one or more comparisons of candidate versions and trusted versions of hashes as described herein. In some cases, the validation system 120-*d* may further determine a level of validity of each subset of media data 212 within set of media data 210-*a* based on one or more comparisons of candidate version and trusted versions of hashes as described herein. In some cases, the level of validity may be binary (e.g., valid/invalid, pass/fail, etc.), with a first level of validity (e.g., valid) determined if each compared candidate version of a hash matches the trusted version thereof, and a second level of validity (e.g., invalid) determined if any compared candidate version of a hash does not match the trusted version thereof. In some cases, the level of validity of each subset of media data 212 may be binary, but the level of validity of set of media data 210-*a* as a whole may be non-binary (e.g., an A/B/C/D/F scale, a ten point scale etc.) and may, for example, be based on a weighted average or other blend of the level of validity of each subset of media data 212.

In some cases, the level of validity of each subset of media data 212 may be non-binary (and the level of validity of set of media data 210-*a* as a whole non-binary), and the level of validity of each subset of media data 212 may be based on one or more factors in addition to the hash comparisons described herein. For example, the validation system 120-*d* may also determine a level of validity of set of media data 210-*a* (or a subset of media data 212) based on associated metadata. As one example, the validation system 120-*d* may determine a level of validity of the set of media data 210-*a* (or a subset of media data 212) based on a presence or absence of one or more types of metadata. For example, the presence of a type of metadata (e.g., a presence of location data) may increase the level of validity, whereas the absence of the type of metadata may decrease the level of validity. Thus, the level of validity of each subset of media data 212 may in some cases be based on a quantity of associated metadata, as more associated metadata (e.g., more types of associated metadata), may increase the level of validity.

As another example, the validation system 120-*d* may determine a level of validity of set of media data 210-*a* (or a subset of media data 212) based on substantive content of one or more types of metadata, which may include the quality of one or more types of metadata. For example, user profile data may indicate a history of a user profile associated with the set of media data 210-*a*, and substantive aspects of such user profile data (e.g., number of associated sets of media data 210-*a*, longevity of user profile, etc.) may positively or negatively influence the determined level of validity. As another example, the validation system 120-*d* may determine a level of validity of the set of media data 210-*a* (or a subset of media data 212) based on variation or a lack thereof of one or more types of metadata across subsets of media data 212 (e.g., variation in sensor data, such as temperature data or location data), with less variation positively influencing the determined level of validity.

In some cases, determining a level of validity of set of media data 210-*a* (or a subset of media data 212) based on associated metadata may include determining the level of validity based on a latency between creation of the set of media data 210-*a* (or subset of media data 212) and creation of the corresponding immutable ledger 305 (or ledger entry 310). A lower latency may positively influence the determined level of validity, whereas a greater latency may negatively influence the determined level of validity.

In some cases, determining a level of validity of set of media data 210-*a* (or a subset of media data 212) based on associated metadata may include determining the level of validity based on a number or identity of additional devices (e.g., other capture systems 105) within a threshold distance of a capturing device (e.g., the capture system 105 for the set of media data 210-a) at a time associated with capturing the set of media data 210-a. An increased number of additional devices, or additional devices associated with user profiles having elevated trust indicia, may positively influence the determined level of validity, whereas fewer devices or additional devices associated with user profiles having low trust indicia may negatively influence the determined level of validity.

In some cases, determining a level of validity of set of media data 210-a (or a subset of media data 212) based on associated metadata may include determining the level of validity based on a quality of a type of metadata. For example, one type of metadata may be GPS data, and an accuracy of GPS metadata corresponding to a set of media data 210 may be determined (e.g., a certification system 110 may consult a database of GPS satellite locations at a time of capture, and may determine or otherwise ascertain a quality of the GPS data associated with the set of media data 210-a).

In some cases, determining a level of validity of set of media data 210-a (or a subset of media data 212) based on associated metadata may include determining the level of validity based on publicly available information. For example, a capture system 105, a distribution system 150, or the certification system 110-a may ascertain (e.g., via a network 130) the position of, speed of, distance to, or other data for GPS satellites at a time of capture, location data for the sun or moon or other celestial bodies, a world light map or related data, a time or other data for a world clock, or the address corresponding to a location indicated by location-related metadata captured by the capture system 105 or distribution system 150, or the identity of Wi-Fi networks available at a location indicated by location-related metadata captured by the capture system 105 or distribution system 150. Such publicly available information may be associated with the set of media data 210-a (or the subset of media data 212) as corresponding metadata. In some cases, the certification system 110-a may cross-check metadata received from the capture system 105 or distribution system 150 for consistency with such publicly available information and may store one or more flags indicative of any inconsistences, which may later be used to determine the level of validity. In some cases, the certification system 110-a may transmit such publicly available metadata to the capture system 105 or distribution system 150 as part of a handshake procedure associated with (e.g., responsive to) an initiation event 205, and the capture system 105 or distribution system 150 may subsequently leverage such metadata in accordance with the metadata-related techniques described herein.

It is to be understood that, in some cases, the level of validity of the set of media data 210-a (or a subset of media data 212) may be determined by the certification system 110-a in accordance with the techniques described herein, and the certification system 110-a may transmit to the validation system 120-d an indication of the level of validity of the set of media data 210-a (or a subset of media data 212).

In some examples, the validation system 120-d may present, to a user, via one or more of visible display or audio speaker included in the validation system 120-d, an indication of the level of validity of set of media data 210-a (or a subset of media data 212). For example, as in the example shown in FIG. 4, the validation system 120-d may display a trust score 405 for the set of media data 210-a as a whole and for each subset of media data 212 therein. In some cases, the validation system 120-d may present a trust score 405 for a subset of media data 212 concurrently with presenting the subset of media data 212. For example, the set of media data 210-a may be a video, and as the validation system 120-d plays each subset of media data 212 included in the received video, the validation system 120-d may present a corresponding trust score 405. Additionally or alternatively, the validation system 120-d may present a trust score 405 for the set of media data 210-a as a whole while presenting the set of media data 210-a or after having completed presenting set of media data 210-a.

In some cases, the validation system 120-d may also present, to a user, an indication of the presence or absence of metadata for the set of media data 210-a (or a subset of media data 212), or the substance of metadata for the set of media data 210-a (or a subset of media data 212). Thus, because a level of validity may be determined based on the presence or absence of metadata, or the substance of metadata, the validation system 120-d may in some cases present, to a user, an indication of one or more factors used in determining the level of validity (e.g., a factor in a trust score 405). For example, as in the example shown in FIG. 4, the validation system 120-d may display indicators of the presence or absence of different metadata types 410 for a subset of media data 212 or for the set of media data 210-a as a whole. Also as in the example shown in FIG. 4, the validation system 120-d may display the substance of metadata (e.g., latencies 415-a associated with a concurrently presented subset of media data 212, or location data (e.g., a map) 415-b corresponding to a concurrently presented subset of media data 212, which may reflect a location of a capture system 105 used to capture the operative subset of media data 212). It is to be understood that the substance of any other type of metadata may also be presented concurrently with presenting a corresponding subset of media data 212 (e.g., some the checkmark indicators in the example shown in FIG. 4 may indicate whether a latency between creating the corresponding subset of media data 212 and creating a corresponding ledger entry 310 is below a threshold latency).

Figure 5:
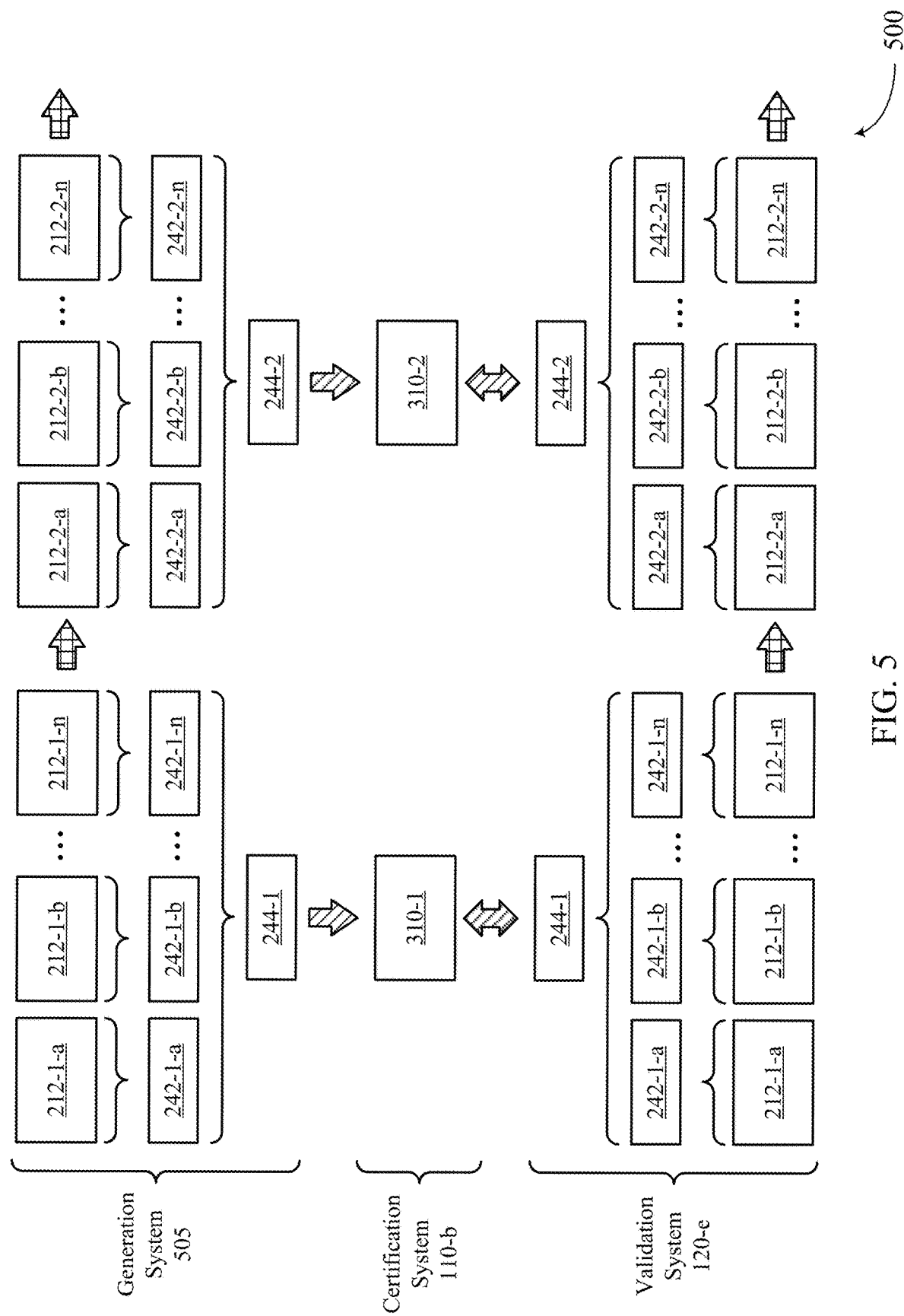
FIG. 5 illustrates an example of a process for generating ledger entries and validating media data that supports ledger-based validation and re-encoding of media data in accordance with aspects of the present disclosure.

FIG. 5 illustrates an example of a process 500 for generating ledger entries and validating media data in accordance with aspects of the present disclosure. In some examples, aspects of the process 500 may be implemented by a generation system 505, a certification system 110-b, or a validation system 120-e. The generation system 505 may, for example, be a capture system 105 or a duplication system 150 as described with reference to FIG. 1. The certification system 110-b may be an example of a certification system 110 as described with reference to FIG. 1, and the validation system 120-e may be an example of a validation system 120 as described with reference to FIG. 1. The validation system 120-e may, for example, be included in a media platform 140 or a client system 145 as described with reference to FIG. 1. The certification system 110-a and the validation system 120-e may be communicatively coupled by a communications link 130-a, which may comprise aspects of a network 130 as described with reference to FIG. 1.

The generation system 505 may create one or more cryptographic representations 242 for each subset of media data 112 within a set of media data 201 (as described elsewhere herein—e.g., with reference to FIG. 2), but the generation system 505 may transmit to the certification system 110-b one or more cryptographic representations 244 for only a subset (e.g., some) of the subsets of media data 212. For example, the one or more cryptographic representations 244 may correspond to N subsets of media data 212 and may be based on one or more cryptographic representations 242 for an Nth subset of media data in addition to some or all of the one or more cryptographic representations 242 for a preceding group of N–1 subsets of media data. A cryptographic representation 242 may be referred to as a first-level cryptographic representation, and a cryptographic representation 244 may be referred to as a second-level cryptographic representation due to being based on one or more previously created first-level cryptographic representations. The use of multiple levels of cryptographic representations associated with the same media data may be referred to, for ease of reference and without limiting the scope thereof, as layered or nested hashing (with hash being an exemplary type of cryptographic representation, and hashing used for brevity and ease of reference without limiting the scope of possible types of cryptographic representations). The transmission between computer systems of second-level cryptographic representations each based on a corresponding set of multiple first-level cryptographic representations may reduce the amount of information exchange (e.g., as compared with potentially transmitting all the first-level cryptographic representations; between the certification system 110-*b* and the generation system 505, between the certification system 110-*b* and the validation system 120-*e*, or both) while retaining security and authenticity benefits.

As shown in the example process 500, the generation system 505 may generate one or more cryptographic representations 242 (e.g., one or more first-level cryptographic representations) for each of N subsets of media data 212 (for each of subset of media data 212-1-*a* through subset of media data 212-1-*n*). For a subset of media data 212, the corresponding one or more cryptographic representations 242 may include any type of cryptographic representation described herein as being created or a subset of media data 212. Thus, for example, the one or more cryptographic representations 242 for a subset of media data 212 may include a lookup hash 230 for the subset of media data 212, a subset media hash 232 for the subset of media data 212, a subset metadata hash 236 for the subset of media data, a subset combo hash 240 for the subset of media, or any combination thereof. In some cases, the one or more cryptographic representations 242 for a subset of media data 212 may each be specific to a particular channel within the subset of media data 212. For example, the one or more cryptographic representations 242 for a subset of media data 212 may include a first cryptographic representations 242 based on a video channel within the subset of media data 212, a second cryptographic representations 242 based on an audio channel within the subset of media data 212, a third cryptographic representations 242 based on a metadata channel within the subset of media data 212, or any combination thereof.

In some examples, the generation system 505 may compress (e.g., using a compression algorithm or codec) each of the subsets of media data 212 prior to the corresponding one or more cryptographic representations 242 thereof being created (e.g., the one or more cryptographic representations 242 for a subset of media data 212 may be based on a corresponding compressed subset of media data). Additionally or alternatively, the generation system may encrypt (e.g., in accordance with an encryption scheme) each of the subsets of media data 212 prior to the corresponding one or more cryptographic representations 242 thereof being created (e.g., the one or more cryptographic representations 242 for a subset of media data 212 may be based on a corresponding encrypted subset of media data).

In some examples, the generation system 505 may create one or more cryptographic representations 244 (e.g., one or more second-level cryptographic representations) for each group of N subsets of media data 212, where N may be any quantity two or more. For example, as shown in the example process 500 of FIG. 5, the generation system 505 may create one or more cryptographic representations 244-1 for a first group that includes the N subsets of media data 212-1-*a* through 212-1-*n*, create one or more cryptographic representations 244-2 for a second group that includes the N subsets of media data 212-2-*a* through 212-2-*n*, and so on, for any quantity of groups that may be included in a set of media data 210. Accordingly, a cryptographic representation included in the one or more cryptographic representations 244 for a group of N subsets of media data 212 may be a cryptographic representation of cryptographic representations (e.g., a hash of hashes).

Within a playback order for the set of media data, the subsets of media data 212 in the second group may be subsequent to the subsets of media data 212 in the first group, and any quantity of addition groups may be subsequent to the second group. For a group of N subsets of media data 212, some or all of the corresponding one or more cryptographic representations 244 may be based at least one cryptographic representation 242 for each of the subsets of media data 212 within the group. Thus, for example, a cryptographic representation included in the one or more cryptographic representations 244-1 may be based on a first cryptographic representation 242 for subset of media data 212-1-*a*, a second cryptographic representation 242 for subset of media data 212-1-*b*, and so on, through an nth cryptographic representation 242 for subset of media data 212-1-*n*. Similarly, for example, a cryptographic representation included in the one or more cryptographic representations 244-2 may be based on a first cryptographic representation 242 for subset of media data 212-2-*a*, a second cryptographic representation 242 for subset of media data 212-2-*b*, and so on, through an nth cryptographic representation 242 for subset of media data 212-2-*n*.

In some examples, the same cryptographic algorithm is used to create the cryptographic representations 242 is also used to create the cryptographic representations 244. In other examples, a first cryptographic algorithm is used to create the cryptographic representations 242, and a different second cryptographic algorithm is used to create the cryptographic representations 244. In some examples, the cryptographic algorithm used to create the cryptographic representations 242, the cryptographic algorithm used to create the cryptographic representations 244, or both may vary (e.g., rotate, change dynamically) from one set of media data to another. For example, the certification system 110-*b* may determine the cryptographic algorithm used to create the cryptographic representations 242, the cryptographic algorithm used to create the cryptographic representations 244, or both for a particular set of media data, and the certification system 110-*b* may indicate such one or more cryptographic algorithms to the generation system 505, the validation system 120-*c*, or both so that the generation system 505, the validation system 120-*e*, or both may create corresponding cryptographic representations 242, cryptographic representations 244, or both using the indicated one or more cryptographic algorithms.

For a group of N subsets of media data 212, the corresponding one or more cryptographic representations 244 may include a respective cryptographic representations 244 for each type of cryptographic representation 242 that is created for the subsets of media data 212 within the group.

Thus, for a group of N subsets of media data 212, the corresponding one or more cryptographic representations 244 may include, for example, a group lookup hash created based on the N lookup hashes 230 for the N subsets of media data 212 (e.g., a group lookup hash created using an alternative cryptographic algorithm as described herein), a group media hash created based on the N media hashes 232 for the N subsets of media data 212 (e.g., a group media hash created using a primary cryptographic algorithm as described herein), a group metadata hash created based on the N metadata hashes 236 for the N subsets of media data 212 (e.g., a group metadata hash created using a primary cryptographic algorithm as described herein), a group combo hash created based on the N combo hashes 240 for the N subsets of media data 212 (e.g., a group metadata hash created using a primary cryptographic algorithm as described herein), a group video channel hash based on the N video channel hashes for the N subsets of media data 212, a group audio channel hash based on the N audio channel hashes for the N subsets of media data 212, a group metadata channel hash based on the N metadata channel hashes for the N subsets of media data 212, or any combination thereof.

For each group of N subsets of media data 212, the generation system 505 may transmit the corresponding one or more cryptographic representations 244 to the certification system 110-b. In some cases, the generation system 505 may transmit cryptographic representations 244 to the certification system 110-b in accordance with an order of playback for the associated groups of subsets of media data 212 (e.g., the one or more cryptographic representations 244-1 for the first group may be transmitted before the one or more cryptographic representations 244-2 for the second group, and so on). In some examples, the generation system 505 may not transmit any of the cryptographic representations 242 to the certification system 110-b.

The certification system 110-b may create a corresponding ledger entry 310 for each of the groups of N subsets of media data 212 (e.g., a first ledger entry 310-1 for the first group of N subsets of media data 212 corresponding to the one or more cryptographic representations 244-1, a second ledger entry 310-2 for the second group of N subsets of media data 212 corresponding to the one or more cryptographic representations 244-2, and so on). As described elsewhere herein (e.g., with reference to FIG. 3), the ledger entry 310 for a corresponding group of N subsets of media data 212 may include any of the corresponding one or more cryptographic representations 244 that is received by the certification system 110-b for the group. In addition, the ledger entry 310 for a corresponding group of N subsets of media data 212 may include a corresponding blockchain hash 325.

In some examples, the ledger entry 310 for a corresponding group of N subsets of media data 212 may include a corresponding blockchain hash 325 may include metadata that identifies the N subsets of media data 212 included in the corresponding group. For example, the ledger entry 310-1 may include metadata that identifies subset of media data 212-1-a through subset of media data 212-1-n, the ledger entry 310-2 may include metadata that identifies subset of media data 212-2-a through subset of media data 212-2-n, and so on. For example, a ledger entry 310 may include information that indicates a first (e.g., earliest or according to some other order) subset of media data 212 included in the corresponding group along with information indicates a quantity of subsets of media data 212 included in the corresponding group (e.g., how many subsets of media data 212 are included in the corresponding group—that is, the quantity N, which may be the same for each group or alternative may vary across groups). As another example, a ledger entry 310 may include information that indicates a first (e.g., earliest in time or according to some other order) subset of media data 212 included in the corresponding group along with information indicates a last (e.g., latest in time or according to some other order) subset of media data 212 included in the corresponding group. In some examples, where the primary cryptographic algorithm may vary (e.g., rotate, be dynamically determined or selected) from one set of media data 210 to another, the ledger entry 310 for a corresponding group of N subsets of media data 212 may include metadata that indicates the primary cryptographic algorithm associated with the one or more cryptographic representations 242, the one or more cryptographic representations 244, or each thereof for the group.

The validation system 120-e may receive a set of media data 210, which may be referred to as a candidate set of media data 210 (or as a purported copy of a set of media 210), and the validation system 120-e may perform a validation process to determine a validity of the candidate set of media data 210 (e.g., whether the candidate set of media data 210 is a valid—e.g., legitimate, authentic-copy of the set of media data 210 of which the candidate set of media data 210 is a purported copy). As shown in the example process 500 of FIG. 5, the validation system 120-e may process the candidate set of media data 210 in like fashion as generation system 505 processes a set of media data 210 such that the validation system 120-e obtains candidate cryptographic representations 242 and candidate cryptographic representations 244 corresponding to the candidate set of media data 210.

The validation system 120-e may determine the validity of the candidate set of media data 210 (e.g., determine the validity of each group of N candidate subsets of media data 212 therein) based on the corresponding candidate cryptographic representations 244. For example, the validation system 120-e may receive trusted cryptographic representations from the certification system 110-b and compare such trusted cryptographic representations with the candidate cryptographic representations 244 created by the validation system 120-c, and the validation system 120-e may determine that a group of candidate subsets of media data 212 is valid if the one or more corresponding candidate cryptographic representations 244 match the trusted cryptographic representations received from the certification system 110-b; otherwise, if there's a mismatch, the validation system 120-e may determine that the group of candidate subsets of media data 212 is not valid. As another example, the validation system 120-e may transmit the candidate cryptographic representations 244 created by the validation system 120-e to the certification system 110-b, the certification system 110-b and compare the candidate cryptographic representations 244 created by the validation system 120-c with corresponding trusted cryptographic representations, and the certification system 110-b may transmit an indication to the validation system 120-e of whether a group of candidate subsets of media data 212 is valid based on whether the one or more corresponding candidate cryptographic representations 244 match one or more corresponding trusted cryptographic representations. The validation system 120-e may present the set of media data and one or more corresponding indications of levels of validity (e.g., indications of respective levels of validity for the different subsets of media data 212 or groups thereof) consistent with the techniques described herein (e.g., with reference to FIG. 5).

In examples in which the candidate set of media data 210 or the subsets of media data 212 therein were compressed prior to the corresponding candidate cryptographic representations 242 being created, the validation system 120-*e* may decompress the candidate set of media data 210 or the subsets of media data 212 to obtain corresponding uncompressed subsets of media data 212 (e.g., after the corresponding candidate cryptographic representations 242 have been created). Additionally or alternatively, in examples in which the candidate set of media data 210 or the subsets of media data 212 therein were encrypted prior to the corresponding candidate cryptographic representations 242 being created, the validation system 120-*e* may decrypt the candidate set of media data 210 or the subsets of media data 212 to obtain corresponding decrypted subsets of media data 212 (e.g., after the corresponding candidate cryptographic representations 242 have been created).

Figure 6:
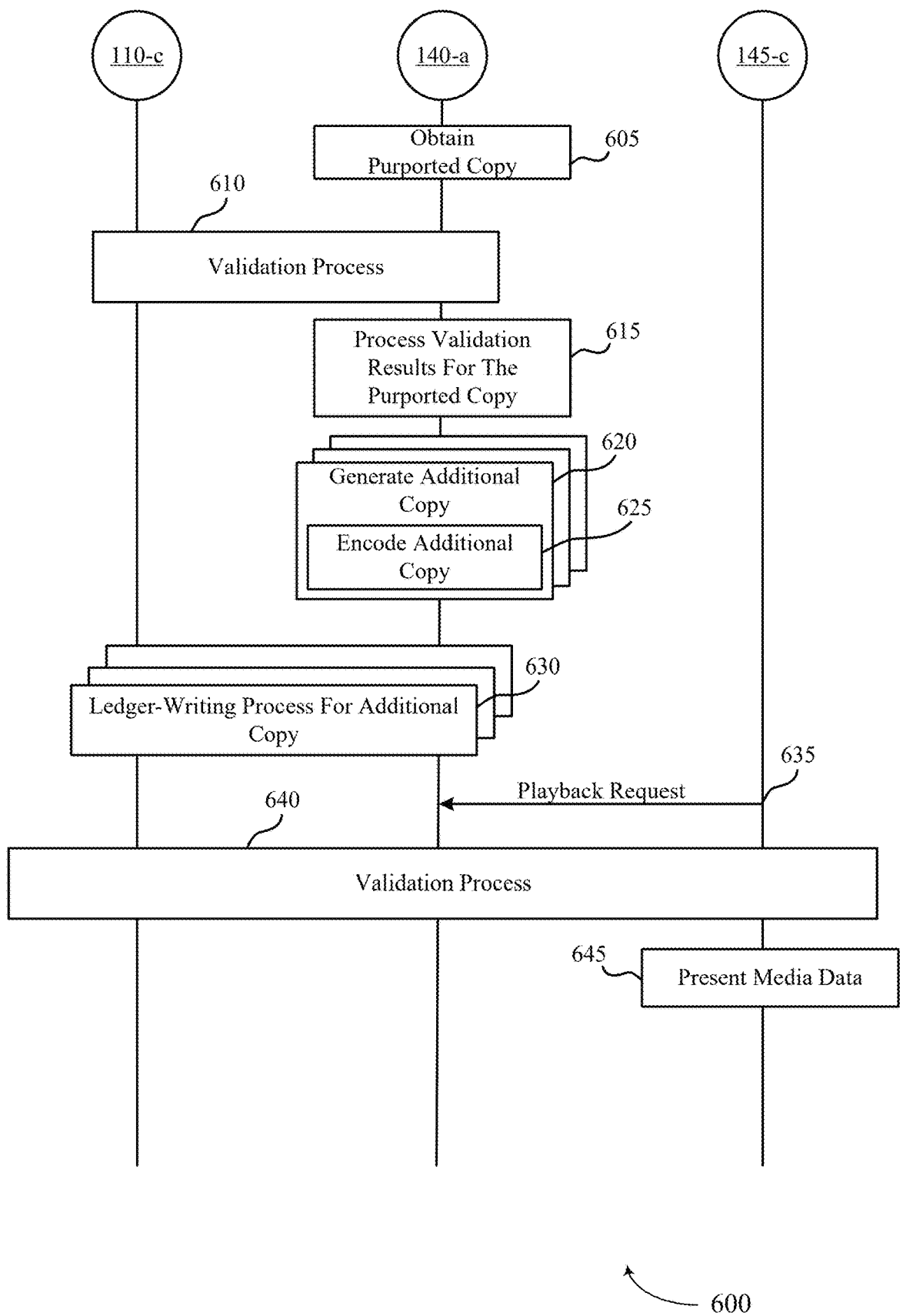
FIG. 6 illustrates an example of a process for validating, re-encoding, and capturing media data that supports ledger-based validation and re-encoding of media data in accordance with aspects of the present disclosure.

FIG. 6 illustrates an example of a process flow 600 that supports identifying altered media data in accordance with aspects of the present disclosure. In some examples, process flow 600 may be implemented by a certification system 110-*c*, a media platform 140-*a*, and a client system 145-*c*, which may be examples of a certification system 110, a media platform 140, and a client system 145 as described with reference to FIG. 1.

In some cases, the media platform 140-*a* may comprise a server-based system that hosts (e.g., stores) sets of media data 210, and makes the hosted sets of media data 210 accessible to client systems 145, for example, via one or more communication links (e.g., via network 130) and a remote (e.g., web-based) interface. For example, the media platform 140-*a* may make (or be coupled with a system that makes) the hosted sets of media data 210 accessible to client systems 145 via a smartphone application, via a web browser-based application, via a social media network, via a video-hosting service, etc. The media platform 140-*a* may support searching for and playing of the hosted sets of media data 210 by users of the client systems 145 (e.g., via a web-based interface that may be provided by or otherwise associated with the media platform 140-*a*).

At 605, the media platform 140-*a* may obtain a purported copy of a set of media data 210. For example, the media platform 140-*a* may receive the purported copy from a capture system 105 or a distribution system 115 via a communications link (e.g., via an application-to-application transfer mechanism). As another example, a user of the media platform 140-*a* or a client system 145 may upload or import the set of media data 210 to the media platform 140-*a* (e.g., via a web-based portal or interface for the media platform 140-*a*).

At 610, the media platform 140-*a* may perform a validation process to validate the purported copy (e.g., determine whether the purported copy of the set of media data 210 is valid—e.g., unaltered, identical-copy of the set of media data 210 as it was previously captured by a capture system 105) in accordance with the techniques described herein. For example, a validation system 120 that is included in (or coupled with) the media platform 140-*a* may perform the validation process at 610 in coordination with the certification system 110-*c*. For example, at 610, the media platform 140-*a* (e.g., the validation system therein or coupled therewith) may validate the purported copy in accordance with some or all aspects of a validation process 400 (including aspects of a local validation process or a remote validation process) as described with reference to FIG. 4.

At 615, the media platform 140-*a* may process one or more validation results associated with the validation process performed at 610 (e.g., trust scores 405 for the set of media data 210, metadata for the set of media data 210, ledger entry data for the set of media data, etc.). To process a validation result, the media platform 140-*a* may store the validation result (e.g., at the media platform 140-*a* or by outputting to a separate computer system for storage by the separate computer system), present the validation result (e.g., audibly, visually, or both, such as via a user interface associated with the media platform 140-*a*), or any combination thereof. For example, the media platform 140-*a* may store or present a global trust score 405 for the set of media data 210 as determined at 1210, one or more trust scores 405 for individual subsets of media data 212 as determined at 1210, or any combination thereof.

In some cases, at 620, the media platform 140-*a* may generate one or more additional copies of the set of media data 210, which may be copies of the purported copy that was obtained at 605. For example, a duplication system 150 that is included in (or coupled with) the media platform 140-*a* may generate the one or more additional copies. In some examples, the media platform 140-*a* may generate the one or more additional copies only if the validation process at 610 indicates that the purported copy is valid (e.g., is unaltered relative to the original set of media data 210, or has a trust score 405 that satisfies a threshold, or includes at least a threshold quantity of valid portions (e.g., a threshold quantity of subsets of media data 212 that are unaltered or have a corresponding trust score 405 that satisfies a threshold). For each additional copy that is generated at 620, the media platform 140-*a* may store the additional copy or output the additional copy to a separate computer system for storage at the separate computer system, to support servicing a subsequent playback or distribution request using the additional copy (e.g., the computer system that stores an additional copy may be referred to as a target computer system, and the target computer system may be the media platform 140-*a* or a separate computer system).

For each additional copy that is generated at 620, the media platform 140-*a* may encode the additional copy at 625. For example, a duplication system 150 that is included in (or coupled with) the media platform 140-*a* may encode each additional copy. Though illustrated separately in the example of FIG. 6, it is to be understood that in some cases encoding an additional copy may occur, at least in part, as part of the process of generating the additional copy—e.g., an additional copy may be generated and then encoded in accordance with one or more aspects of an encoding scheme, or the additional copy may be generated such that as-generated it is in accordance with one or more aspects of the encoding scheme, or any combination thereof (e.g., some aspects of the additional copy generated and then encoded in accordance with an encoding scheme, other aspects of the additional copy generated such as to be in accordance with the encoding scheme as-generated).

In some examples, each additional copy of the set of media data 210 may be encoded in accordance with a different encoding scheme, relative to each other and relative to the purported copy obtained at 605. Two copies of the set of media data 210 being encoded in accordance with a different encoding scheme may comprise the two copies being encoded in accordance with a different codec, a different file format (e.g., coding format, container format), a different compression ratio, a different resolution (e.g., sampling resolution, playback resolution), a different bit rate (e.g., playback bit rate), different aspect ratios (e.g., playback aspect ratios), or any combination thereof. Examples of different video codecs may include Moving Picture Experts Group (MPEG) codecs or VPx (e.g., VP7, VP8, VP9, and so on) codecs, among other possibilities. Examples of different audio codecs may include lossless audio codecs, lossy audio codecs, Dolby codecs, MPEG codecs, Windows Media Audio codecs, voice codecs, among other possibilities. Image codecs may include Joint Photographic Experts Group (JPEG) codecs, Graphics Interchange Format (GIF) codecs, Portable Network Graphics (PNG) codecs, among other possibilities. In some case a codec may be associated with a corresponding file format. Examples of media file formats may include MPEG file formats, Waveform Audio File Format (WAVE or WAV) file formats, MOV file formats, JPEG file formats, GIF file formats, PNG file formats, among other possibilities.

Generating additional copies of the set of media data 210 that are encoded in accordance with different encoding schemes may enable the media platform 140-a to provide (e.g. transmit, stream, output) different versions (e.g., different copies) of the set of media data 210 to different client systems 145, in accordance with capabilities, constraints, or preferences of the different client systems 145, among other potential benefits. For example, different client systems 145 may be configured to provide playback of media in accordance with different encoding schemes, and generating additional copies of the set of media data 210 that are encoded in accordance with different encoding schemes may enable the media platform 140-a to, in response to requests for the set of media data 210 from a client system 145, select a particular version (e.g., copy) of the set of media data 210 that is compatible with (e.g., matched to, in accordance with) the capabilities, constraints, or preferences of the client system 145.

At 630, the media platform 140-a may perform, for some or all of the additional copies of the set of media data 210, a ledger-writing process to create, for each additional copy for which the ledger-writing process is performed, one or more cryptographic representations thereof and output the one or more cryptographic representations to the certification system 110-c, so the certification system 110-c may write the one or more cryptographic representations to an immutable ledger (e.g. blockchain). For example, a duplication system 150 that is included in (or coupled with) the media platform 140-a may perform, for each additional copy for which the ledger-writing process is performed, the ledger-writing process at 630 in accordance with some or all aspects of a ledger-writing process 200 as described with reference to FIG. 2. Correspondingly, the certification system 110-c may process information (e.g., cryptographic representations) received for an additional of a set of media data 210 in like fashion as the certification system 110-c may process information received for a newly captured set of media data 210 received from a capture system 105 (e.g., as described with reference to FIG. 2).

In some cases, a ledger-writing process performed at 630 for an additional copy of a set of media data 210 may reuse some or all aspects of the metadata associated with the purported copy that was obtained at 605. For example, initiation metadata 220, subset metadata 234, global metadata 252, or any combination thereof associated with the purported copy that was obtained at 605 may be ascribed to the additional copy and processed as described with reference to FIG. 2 when performing the ledger-writing process for the additional copy. In some cases, a ledger-writing process performed at 630 for an additional copy of a set of media data 210 may use some new metadata that is specific to the additional copy. For example, metadata (e.g., timestamps, concurrent satellite position information, location information, or any other type of metadata described herein) may be identified in connection with the generation of the additional copy at 625, encoding of the additional copy 625, or both. Such newly identified metadata may be treated as a type of initiation metadata 220 (e.g., if associated with a time or other aspects of initiating the generation of the additional copy), a type of subset metadata 234 (e.g., if associated with a time or other aspects of generating or encoding a particular subset 212 of the additional copy), a type of global metadata 252 (e.g., if associated with a time or other aspects of generating or encoding the additional copy as a whole), or any combination thereof for the additional copy and processed as described with reference to FIG. 2 when performing the ledger-writing process for the additional copy. Further, in some cases, a ledger-writing process performed at 630 may use a combination of some or all aspects of the metadata associated with the purported copy that was obtained at 605 and some or all aspects of newly identified metadata for the additional copy, such as ascribing such a combination of metadata to the additional copy and then processing such metadata as described with reference to FIG. 2.

For each additional copy for which a ledger-writing process is performed at 630, the certification system 110-c may process information associated with the additional copy as described elsewhere herein for a set of media data 210 (e.g., with reference to FIGS. 2 and 3). For example, the certification system 110-c may generate a respective immutable ledger 305, one or more respective ledger entries 310, or any combination thereof for the additional copy.

Performing the ledger-writing process at 630—including the certification system 110-c generating a respective immutable ledger 305, one or more respective ledger entries 310, or any combination thereof for an additional copy of the set of media data 210—may beneficially support the subsequent validation of a purported copy of the additional copy, among other possible benefits. For example, at 635, the media platform 140-a may receive, from the client system 145-c, a playback request for the set of media data 210. The playback request may include information indicative of one or more capabilities, constraints, or preferences of the client system 145-c (e.g., information that explicitly indicates one or more capabilities, constraints, or preferences of the client system 145-c, or information that allows the media platform 140-a to determine the one or more capabilities, constraints, or preferences of the client system 145-c), and the media platform 140-a may use such information to determine (e.g., select) a copy (e.g., version) of the set of media data 210 to use to service the playback request. For example, the media platform 140-a may select, from among a set of multiple copies of the media data 210 that includes the purported copy obtained at 605 and the one or more additional copies generated at 620, and based on the one or more capabilities, constraints, or preferences of the client system 145-c, a copy of the set of media data 210 that is encoded in accordance with an encoding scheme that is compatible with the one or more capabilities, constraints, or preferences, and the media platform 140-a may use the selected copy to service the playback request (e.g., by streaming, transmitting, or otherwise providing the selected copy to the client system 145-c). In some examples, in addition or in the alternative to a playback request, a distribution request may be received at 635, and the media platform 140-a may use the selected copy to service the distribution request (e.g., by transmitting or otherwise outputting the selected copy to a destination computer system indicated by or otherwise associated with the distribution request).

In some examples, at 640, the media platform 140-*a*, the client system 145-*c*, or both may perform a validation process to validate the copy of the set of media data 210 that the media platform 140-*a* selects to service the playback request (e.g., to determine whether the selected copy of the set of media data 210 is valid—e.g., unaltered, identical-copy of the set of media data 210 as it was previously captured by a capture system 105) in accordance with the techniques described herein (e.g., in accordance with some or all aspects of a validation process 400 (including aspects of a local validation process or a remote validation process) as described with reference to FIG. 4). For example, a validation system 120 that is included in (or coupled with) the media platform 140-*a* may perform a validation process at 640 in coordination with the certification system 110-*c*, or a validation system 120 that is included in (or coupled with) the client system 145-*c* may perform a validation process at 640 in coordination with the certification system 110-*c*, or both. A lookup hash 230 corresponding to the selected copy of the set of media data 210 may be used to identify the respective ledger 305, respective ledger entries 310, or any combination thereof associated with that particular copy of the set of media data 210.

In examples in which the client system 145-*c* performs a validation process at 640, the client system 145-*c* may first receive the selected copy of the set of media data 210 from the media platform 140-*a*, so the client system 145-*c* may perform the validation process (as the selected copy may be a purported copy from the perspective of the client system 145-*c*). In examples, in which the client system 145-*c* does not perform a validation process at 640, the media platform 140-*a* may validate the selected copy before providing the selected copy to the client system 145-*c*. Performing one or more validation processes at 640 may enhance the trustworthiness of the copy of the set of media data 210 that is used to service the playback request, among other possible benefits. For example, performing, by the media platform 140-*a*, a validation process to validate the copy selected in response to playback request may enable the media platform 140-*a* to trust that the selected copy is valid (e.g., has not been hacked or otherwise altered since being generated at 630) before providing it to the client system. Additionally or alternatively, performing, by the client system 145-*c*, a validation process to validate the copy received in response to playback request may enable the client system 145-*c* to trust that the received copy is valid.

In some examples, in response to the playback request received at 625, the media platform 140-*a* may output to the client system 145-*c* one or more validity indications (e.g., associated with a copy of a set of media data 210 or a subset 212 thereof). Such a validity indication may be based on the validation process performed at 610, a validation process performed at 640, or any combination thereof. For example, a validity indication corresponding to a validation process performed at 640 may in some cases also be indirectly based on a prior validation process performed at 610, as the validation process performed at 640 may use information (e.g., trusted cryptographic representations) that is created based on the prior validation process performed at 610 being successful (e.g., indicating the validity of one or more portions of the purported copy of the set of media data 210).

At 645, the client system 145-*c* may present (e.g., display, play, or otherwise output) the copy of the set of media data 210 that it receives in response to the playback request. For example, along with presenting the content of the received copy, the client system 145-*c* may present associated metadata or validity information (e.g., trust scores 405) in accordance with media playback techniques as described herein (e.g., with reference to FIG. 4), which may be based on the validation process performed at 610, a validation process performed at 640, or any combination thereof.

In some examples, if any portion (e.g., subset 212) of the set of media data 210 obtained at 605 is invalid (e.g., is determined at 610 to have been altered or to otherwise have a trust score 405 below a threshold), the media platform 140-*a* may refrain from (e.g., may skip or otherwise not perform) generating and encoding any additional copy thereof (and accordingly may also not perform any related ledger-writing process at 630). Instead, for example, the media platform 140-*a* may generate and encode one or more additional copies only for sets of media data 210 that are entirely valid. This may ensure that any additional copy served (e.g., provided, output) by the media platform 140-*a* is entirely valid, among other potential benefits.

In some examples, if a threshold quantity (e.g., threshold count or threshold percentage) of portions (e.g., subsets 212) of the set of media data 210 obtained at 605 are valid, the media platform 140-*a* may generate and encode one or more corresponding additional copies at 620 and 625, and perform one or more corresponding ledger-writing processes at 630, despite one or more portions of the purported copy of the set of media data 210 (and hence one or more corresponding portions of the additional copy thereof) being invalid. If less than a threshold quantity (e.g., threshold count or threshold percentage) of portions (e.g., subsets 212) of the set of media data 210 are valid, the media platform 140-*a* may refrain from (e.g., may skip or otherwise not perform) generating and encoding any additional copy thereof (and accordingly may also not perform any related ledger-writing process at 630). Generating and encoding an additional copy despite one or more portions thereof being invalid may support servicing playback requests associated with (e.g., for which one or more constraints, preferences, or capabilities of a requesting client system 145 are compatible with) the encoding schemes corresponding to the additional copy, among other potential benefits. Refraining from generating and encoding an additional copy due to one or more portions thereof being invalid (e.g., less than a threshold quantity of portions being valid), however, may ensure that any additional copy served (e.g., provided, output) by the media platform 140-*a* is at least valid to a certain extent, among other potential benefits.

As part of a ledger-writing process performed at 630 for an additional copy of a set of media data 210 for which one or more portions (e.g., subsets 212) are invalid, the media platform 140-*a* may in some examples refrain from (e.g., may skip or otherwise not perform) encoding of any invalid portion in accordance with a different encoding scheme. For example, the media platform 140-*a* may generate one or more additional copies that are truncated or otherwise modified so as to include only the one or more valid portions (e.g., subsets 212) of the set of media data 210, and the media platform 140-*a* thus may encode only the one or more valid portions in accordance with a different encoding scheme relative to an encoding scheme associated with the purported copy obtained at 605. Additionally or alternatively in such examples, the media platform 140-*a* may not create any cryptographic representations specifically of an invalid portion (e.g., may refrain from generating a lookup hash 230, a subset media hash 232, a subset metadata hash 236, a subset combo hash 240, or any combination thereof based on an invalid subset 212)—e.g., as such invalid portions may be omitted from any additional copy generated at 620. This may ensure that any additional copy served (e.g., provided, output) by the media platform 140-*a* includes only valid portions (e.g., subsets 212), among other potential benefits.

Additionally or alternatively, as part of a ledger-writing process performed at 630 for an additional copy of a set of media data 210 for which one or more portions (e.g., subsets 212) are invalid, the media platform 140-*a* may in some cases generate one or more additional copies that include both the valid and the invalid portions, but the media platform 140-*a* may generate one or more subset-specific cryptographic representations only for valid portions (e.g., subsets 212) within the additional copy of the set of media data. For an invalid portion (e.g., subset 212) within an additional copy, an indication of invalidity or other substitute information may be output to the certification system 110-*c*) (e.g., and thus written by the certification system 110-*c* to an immutable ledger entry corresponding to the invalid portion), stored by the media platform 140-*a* (e.g., locally at the media platform 140-*a* or within another computer system to which the media platform 140-*a* is coupled), or any combination thereof-rather than (e.g., in lieu of, as a substitute for, instead of) any cryptographic representation specifically of that invalid portion. This may allow the media platform 140-*a* to service (e.g., provide, output) one or more complete additional copies in accordance with alternative encoding schemes, while still ensuring that a subsequent validation process 640 performed for an additional copy that includes an invalid portion (as inherited from the purported copy obtained at 605) properly results in the invalid portion therein being identified as invalid, among other potential benefits.

Figure 7:
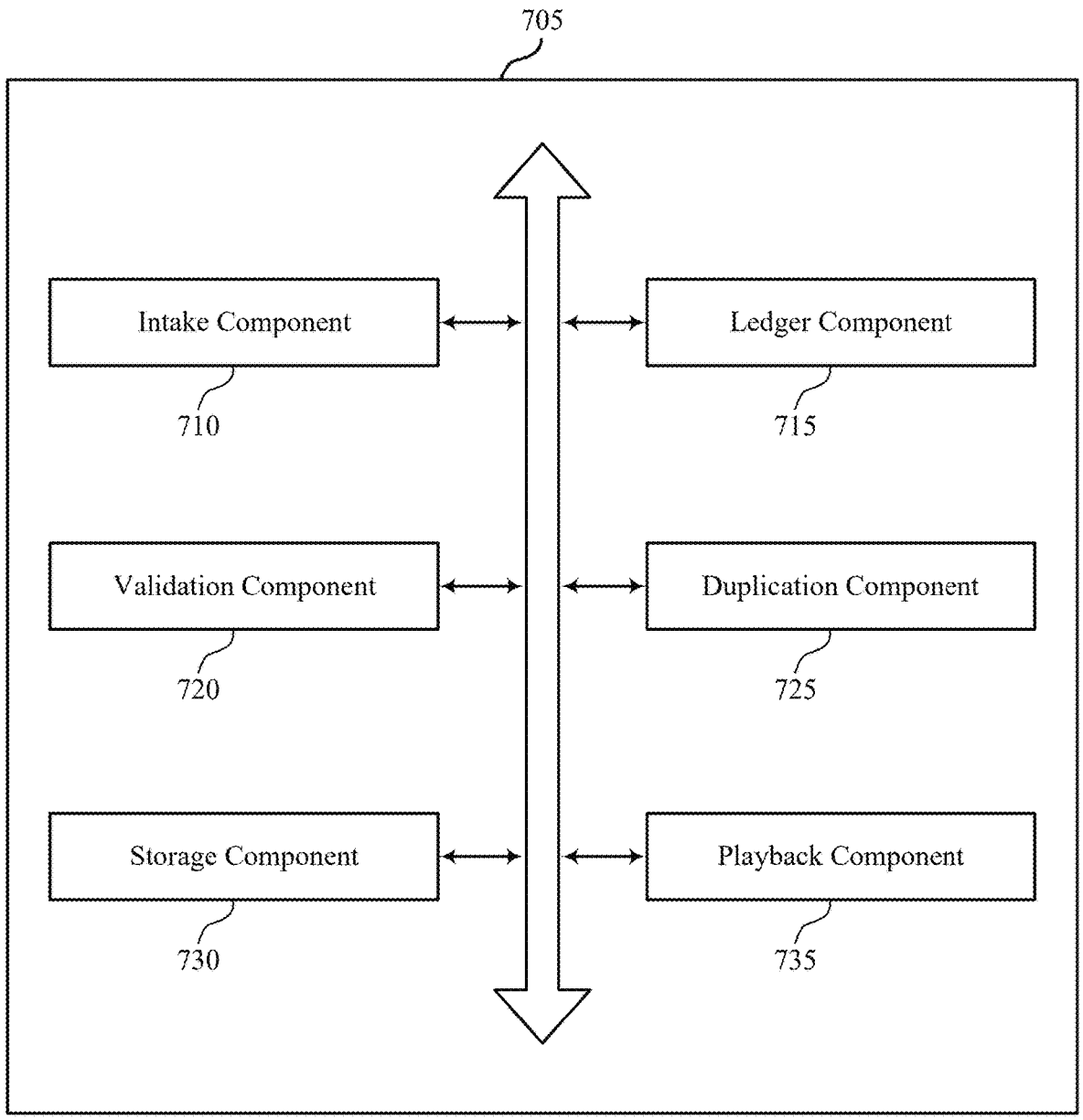
FIGS. 7 through 8 illustrate block diagrams of systems that support ledger-based validation and re-encoding in accordance with aspects of the present disclosure.

FIG. 7 shows a block diagram 700 of a system 705 that supports ledger-based validation and re-encoding of media data in accordance with aspects of the present disclosure. The system 705 may be an example of or include aspects of a media platform 140 as described herein. The system 705 may include an intake component 710, a ledger component 715, a validation component 720 (e.g., which may be, include, or be coupled with a validation system 120 as described herein), a duplication component 725 (e.g., which may be, include, or be coupled with a duplication system 150 as described herein), a storage component 730, and a playback component 735.

Each component of the system 705 may be in communication with one another (e.g., via one or more buses). Each component of the system 705 may be implemented in hardware, code (e.g., software or firmware) executed by a processor, or any combination thereof. If implemented in code executed by a processor, the functions of a component, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The system 705, or its sub-components, may be physically located at various positions, including being distributed such that portions of functions are implemented at different physical locations or by one or more physical or logically distinct components. In some examples, the system 705, or its sub-components, may be a separate and distinct component in accordance with various aspects of the present disclosure. In some examples, the system 705, or its sub-components, may be combined with one or more other hardware components, including but not limited to an input/output (I/O) component, a transceiver, another computing device, one or more other components described in the present disclosure, or a combination thereof in accordance with various aspects of the present disclosure.

The intake component 710 is capable of, configured to, or operable to support a means for obtaining, by a first computer system, a purported copy of a set of media data, where the purported copy of the set of media data is encoded in accordance with a first encoding scheme. The validation component 720 is capable of, configured to, or operable to support a means for determining, by the first computer system, that at least a portion of the purported copy of the set of media data is valid, where the portion of the purported copy of the set of media data being valid is based on the portion of the purported copy being a valid copy of a corresponding portion of the set of media data. The duplication component 725 is capable of, configured to, or operable to support a means for encoding, by the first computer system and based on determining that at least the portion of the purported copy of the set of media data is valid, at least the portion of the purported copy of the set of media data in accordance with a second encoding scheme that is different from the first encoding scheme to obtain a re-encoded version of the set of media data, the re-encoded version of the set of media data including a re-encoded version of the portion of the set of media data. The duplication component 725 is capable of, configured to, or operable to support a means for creating, by the first computer system, one or more cryptographic representations of the re-encoded version of the set of media data. The ledger component 715 is capable of, configured to, or operable to support a means for writing the one or more cryptographic representations of the re-encoded version of the set of media data to an immutable ledger.

In some examples, the validation component 720 is capable of, configured to, or operable to support a means for determining, by the first computer system, that a second portion of the purported copy of the set of media data is invalid, where the second portion of the purported copy of the set of media data being invalid is based on the second portion of the purported copy not being a valid copy of a corresponding second portion of the set of media data. In some examples, the duplication component 725 is capable of, configured to, or operable to support a means for encoding, by the first computer system and despite determining that the second portion of the purported copy of the set of media data is invalid, the second portion of the purported copy of the set of media data in accordance with the second encoding scheme to obtain a re-encoded version of the second portion of the purported copy of the set of media data. In some examples, the duplication component 725 is capable of, configured to, or operable to support a means for refraining, by the first computer system and based on determining that the second portion of the purported copy of the set of media data is invalid, from creating a cryptographic representation of the re-encoded version of the second portion of the purported copy of the set of media data.

In some examples, the validation component 720 is capable of, configured to, or operable to support a means for storing at the first computer system, outputting to a third computer system separate from the first computer system, or writing to the immutable ledger, an indication that the re-encoded version of the second portion of the purported copy of the set of media data is invalid.

In some examples, the validation component 720 is capable of, configured to, or operable to support a means for determining, by the first computer system, that a second portion of the purported copy of the set of media data is invalid, where the second portion of the purported copy of the set of media data being invalid is based on the second portion of the purported copy not being a valid copy of a corresponding second portion of the set of media data. In some examples, the duplication component 725 is capable of, configured to, or operable to support a means for refraining, by the first computer system and based on determining that the second portion of the purported copy of the set of media data is invalid, from encoding the second portion of the purported copy of the set of media data in accordance with the second encoding scheme.

In some examples, the purported copy of the set of media data includes a plurality of portions, and encoding at least the portion of the purported copy of the set of media data in accordance with the second encoding scheme is based on determining that at least a threshold quantity of portions from among the plurality of portions are each a valid copy of a respective portion of the set of media data.

In some examples, the duplication component 725 is capable of, configured to, or operable to support a means for encoding, by the first computer system and based on determining that at least the portion of the purported copy of the set of media data is valid, at least the portion of the purported copy of the set of media data in accordance with a third encoding scheme that is different from the first encoding scheme and the second encoding scheme to obtain a second re-encoded version of the set of media data, the second re-encoded version of the set of media data including a second re-encoded version of the portion of the set of media data. In some examples, the duplication component 725 is capable of, configured to, or operable to support a means for creating, by the first computer system, one or more cryptographic representations of the second re-encoded version of the set of media data. In some examples, the duplication component 725 is capable of, configured to, or operable to support a means for writing the one or more cryptographic representations of the second re-encoded version of the set of media data to the immutable ledger.

In some examples, to support determining that at least the portion of the purported copy of the set of media data is valid, the validation component 720 is capable of, configured to, or operable to support a means for creating, by the first computer system, a candidate cryptographic representation based on the portion of the purported copy of the set of media data. In some examples, to support determining that at least the portion of the purported copy of the set of media data is valid, the validation component 720 is capable of, configured to, or operable to support a means for determining that the candidate cryptographic representation matches a trusted cryptographic representation, the trusted cryptographic representation included in the immutable ledger and based on the corresponding portion of the set of media data.

In some examples, to support determining that the candidate cryptographic representation matches the trusted cryptographic representation, the validation component 720 is capable of, configured to, or operable to support a means for receiving, by the first computer system, the trusted cryptographic representation from a second computer system associated with the immutable ledger. In some examples, to support determining that the candidate cryptographic representation matches the trusted cryptographic representation, the validation component 720 is capable of, configured to, or operable to support a means for comparing, by the first computer system, the candidate cryptographic representation and the trusted cryptographic representation.

In some examples, to support determining that the candidate cryptographic representation matches the trusted cryptographic representation, the validation component 720 is capable of, configured to, or operable to support a means for transmitting, by the first computer system, the candidate cryptographic representation to a second computer system associated with the immutable ledger. In some examples, to support determining that the candidate cryptographic representation matches the trusted cryptographic representation, the validation component 720 is capable of, configured to, or operable to support a means for receiving, by the first computer system from the second computer system, an indication that the candidate cryptographic representation matches the trusted cryptographic representation.

In some examples, the first encoding scheme is in accordance with a first codec and the second encoding scheme is in accordance with a second codec that is different than the first codec.

In some examples, the first encoding scheme is in accordance with a first file format and the second encoding scheme is in accordance with a second file format that is different than the first file format.

In some examples, the first encoding scheme is associated with a first compression ratio and the second encoding scheme is associated with a second compression ratio that is different than the first compression ratio.

In some examples, the first encoding scheme is a first encryption scheme and the second encoding scheme is a second encryption scheme that is different than the first encryption scheme.

In some examples, the second encoding scheme is associated with at least one of a different resolution, a different bit rate, or a different aspect ratio than the first encoding scheme.

In some examples, the storage component 730 is capable of, configured to, or operable to support a means for causing, by the first computer system, the re-encoded version of the set of media data to be stored at a target computer system, where the target computer system is the first computer system or a different computer system, and where the re-encoded version of the set of media data is available for playback or distribution based at least in on being stored at the target computer system.

In some examples, the playback component 735 is capable of, configured to, or operable to support a means for receiving, by the first computer system, a request for playback of media content associated with the set of media data. In some examples, the playback component 735 is capable of, configured to, or operable to support a means for outputting, by the first computer system, the re-encoded version of the set of media data in response to the request for playback.

In some examples, the playback component 735 is capable of, configured to, or operable to support a means for outputting, by the first computer system, an indication of validity in response to the request for playback, where the indication of validity is based on determining that at least the portion of the purported copy of the set of media data is valid, determining that at least the re-encoded version of the portion of the set of media data is valid, or both.

In some examples, to support creating the one or more cryptographic representations of the re-encoded version of the set of media data, the duplication component 725 is capable of, configured to, or operable to support a means for creating, for one or more portions of the re-encoded version of the set of media data, a respective cryptographic representation of each of the one or more portions of the re-encoded version of the set of media data.

In some examples, to support writing the one or more cryptographic representations of the re-encoded version of the set of media data to the immutable ledger, the ledger component 715 is capable of, configured to, or operable to support a means for outputting the one or more cryptographic representations from the first computer system to a second computer system, where the second computer system is configured to write the one or more cryptographic representations to the immutable ledger, the immutable ledger being remote from the first computer system.

In some examples, the immutable ledger is or includes a blockchain.

Figure 8:
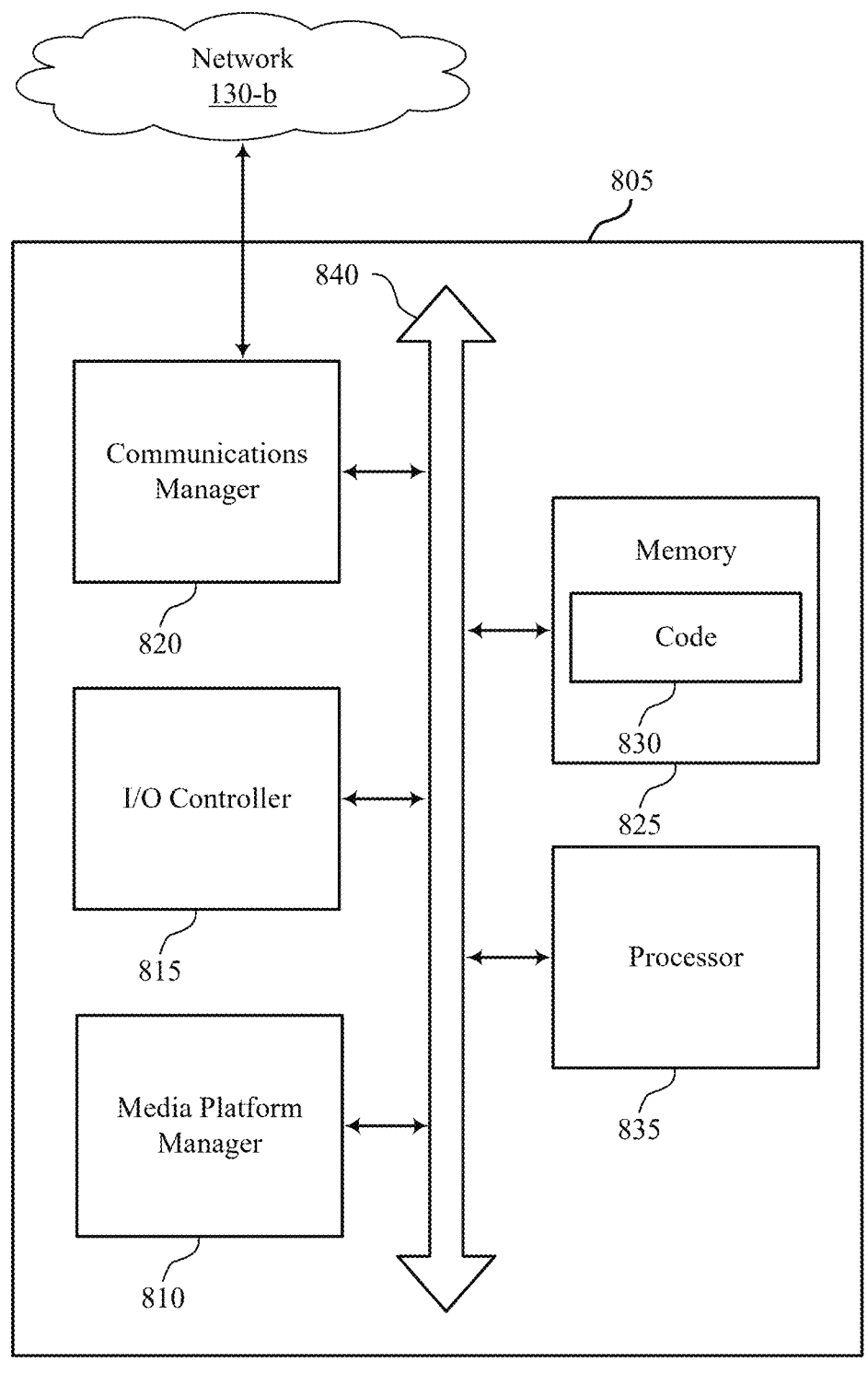

FIG. 8 shows a diagram of a system 800 including a device 805 that supports ledger-based validation and re-encoding of media data in accordance with aspects of the present disclosure. The device 805 may be an example of or include aspects of a media platform 140 as described herein. The device 805 may include a media platform manager 810, which may include aspects of a system 705. The device 805 may also include components for bi-directional communications with user as well as with other devices or computer systems, such as the various devices and computer systems described herein. Along with a media platform manager 810, the device 805 may include an I/O controller 815, a communications manager 820, memory 825, and a processor 835. These components may be in electronic communication via one or more buses (e.g., bus 840).

The media platform manager 810 may obtain, by a first computer system, a purported copy of a set of media data, where the purported copy of the set of media data is encoded in accordance with a first encoding scheme, determine, by the first computer system, that at least a portion of the purported copy of the set of media data is valid, where the portion of the purported copy of the set of media data being valid is based on the portion of the purported copy being a valid copy of a corresponding portion of the set of media data, encode, by the first computer system and based on determining that at least the portion of the purported copy of the set of media data is valid, at least the portion of the purported copy of the set of media data in accordance with a second encoding scheme that is different from the first encoding scheme to obtain a re-encoded version of the set of media data, the re-encoded version of the set of media data comprising a re-encoded version of the portion of the set of media data, create, by the first computer system, one or more cryptographic representations of the re-encoded version of the set of media data, and write the one or more cryptographic representations of the re-encoded version of the set of media data to an immutable ledger.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The communications manager 820 may manage communications between the device 805 and one or more other devices or computer systems (e.g., via one or more wired or wireless links). For example, communications manager 820 may manage communications with a certification system 110, distribution system 115, validation system 120, or profile management system 125 as described herein (e.g., via a network 130-b). In some cases, communications manager 820 may manage a transceiver. The transceiver may communicate bi-directionally over wired or wireless links. The transceiver may also include a modem to modulate packets for transmission and to demodulate received packets.

The memory 825 may include RAM and ROM. The memory 825 may store computer-readable, computer-executable code 830 including instructions that, when executed by a processor, cause the device 805 to perform various functions described herein. In some cases, the memory 825 may contain, among other things, a BIOS which may control basic hardware or software operation such as the interaction with peripheral components or devices.

The processor 835 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 835 may be configured to operate a memory array using a memory controller. In other cases, a memory controller may be integrated into the processor 835. The processor 835 may be configured to execute computer-readable instructions stored in a memory (e.g., the memory 825) to cause the device 805 to perform various functions (e.g., functions or tasks as described herein).

The code 830 may include instructions to implement aspects of the present disclosure, including instructions to support the operations described herein. The code 830 may be stored in a non-transitory computer-readable medium such as system memory or other type of memory. In some cases, the code 830 may not be directly executable by the processor 835 but may cause a computer (e.g., when compiled and executed) to perform functions described herein.

Figure 9:
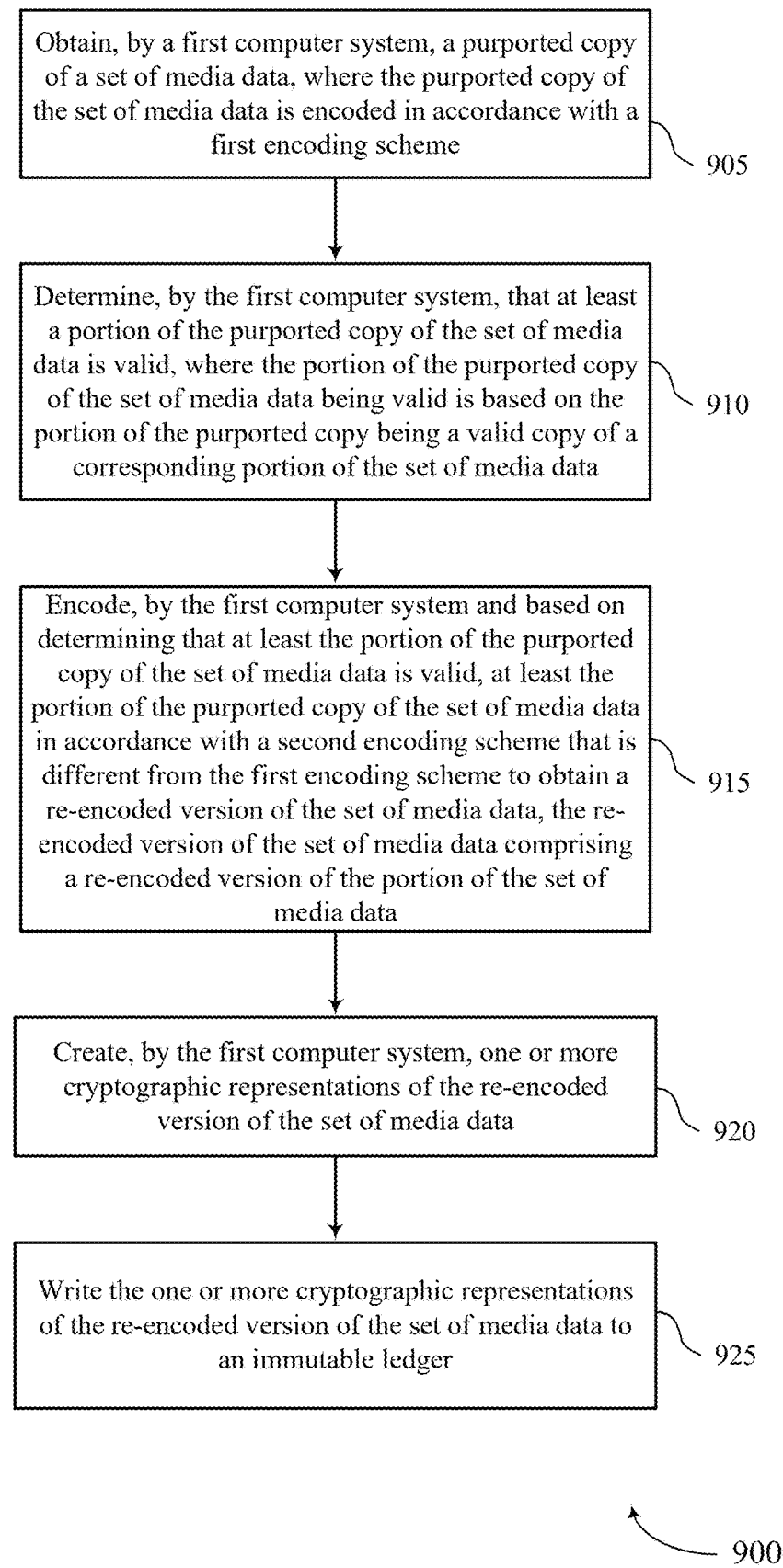
FIGS. 9 through 11 illustrate flowcharts illustrating methods that support ledger-based validation and re-encoding of media data in accordance with aspects of the present disclosure.

FIG. 9 shows a flowchart illustrating a method 900 that supports ledger-based validation and re-encoding of media data in accordance with aspects of the present disclosure. The operations of method 900 may be implemented by a media platform 140 or its components as described herein. For example, the operations of method 900 may be performed by a media platform manager as described with reference to FIGS. 7 to 8. In some examples, a media platform 140 may execute a set of instructions to control the functional elements of the media platform 140 to perform the functions described below. Additionally or alternatively, a media platform 140 may perform aspects of the functions described below using special-purpose hardware.

At 905, the method may include obtaining, by a first computer system, a purported copy of a set of media data, where the purported copy of the set of media data is encoded in accordance with a first encoding scheme. The operations of 905 may be performed according to the techniques described herein. In some examples, aspects of the operations of 905 may be performed by an intake component 710 as described with reference to FIGS. 7 to 8.

At 910, the method may include determining, by the first computer system, that at least a portion of the purported copy of the set of media data is valid, where the portion of the purported copy of the set of media data being valid is based on the portion of the purported copy being a valid copy of a corresponding portion of the set of media data. The operations of 910 may be performed according to the techniques described herein. In some examples, aspects of the operations of 910 may be performed by a validation component 720 as described with reference to FIGS. 7 to 8.

At 915, the method may include encoding, by the first computer system and based on determining that at least the portion of the purported copy of the set of media data is valid, at least the portion of the purported copy of the set of media data in accordance with a second encoding scheme that is different from the first encoding scheme to obtain a re-encoded version of the set of media data, the re-encoded version of the set of media data including a re-encoded version of the portion of the set of media data. The operations of 915 may be performed according to the techniques described herein. In some examples, aspects of the operations of 915 may be performed by a duplication component 725 as described with reference to FIGS. 7 to 8.

At 920, the method may include creating, by the first computer system, one or more cryptographic representations of the re-encoded version of the set of media data. The operations of 920 may be performed according to the techniques described herein. In some examples, aspects of the operations of 920 may be performed by a duplication component 725 as described with reference to FIGS. 7 to 8.

At 925, the method may include writing the one or more cryptographic representations of the re-encoded version of the set of media data to an immutable ledger. The operations of 925 may be performed according to the techniques described herein. In some examples, aspects of the operations of 925 may be performed by a ledger component 715 as described with reference to FIGS. 7 to 8.

Figure 10:
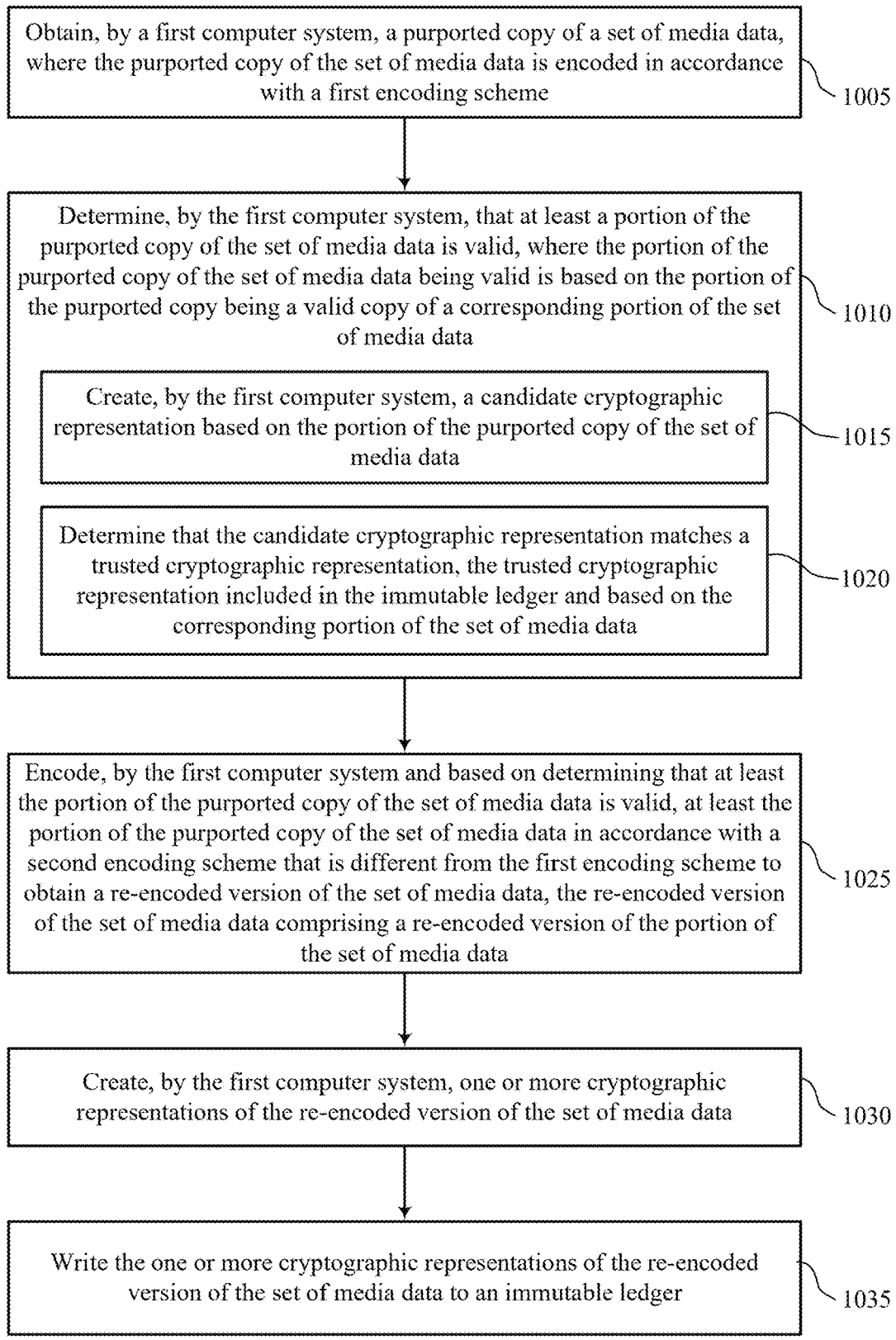

FIG. 10 shows a flowchart illustrating a method 1000 that supports ledger-based validation and re-encoding of media data in accordance with aspects of the present disclosure. The operations of method 1000 may be implemented by a media platform 140 or its components as described herein. For example, the operations of method 1000 may be performed by a media platform manager as described with reference to FIGS. 7 to 8. In some examples, a media platform 140 may execute a set of instructions to control the functional elements of the media platform 140 to perform the functions described below. Additionally or alternatively, a media platform 140 may perform aspects of the functions described below using special-purpose hardware.

At 1005, the method may include obtaining, by a first computer system, a purported copy of a set of media data, where the purported copy of the set of media data is encoded in accordance with a first encoding scheme. The operations of 1005 may be performed according to the techniques described herein. In some examples, aspects of the operations of 1005 may be performed by an intake component 710 as described with reference to FIGS. 7 to 8.

At 1010, the method may include determining, by the first computer system, that at least a portion of the purported copy of the set of media data is valid, where the portion of the purported copy of the set of media data being valid is based on the portion of the purported copy being a valid copy of a corresponding portion of the set of media data. The operations of 1010 may be performed according to the techniques described herein. In some examples, aspects of the operations of 1010 may be performed by a validation component 720 as described with reference to FIGS. 7 to 8.

Determining that at least the portion of the purported copy of the set of media data is valid may include, at 1015, creating, by the first computer system, a candidate cryptographic representation based on the portion of the purported copy of the set of media data. The operations of 1015 may be performed according to the techniques described herein. In some examples, aspects of the operations of 1015 may be performed by a validation component 720 as described with reference to FIGS. 7 to 8.

Determining that at least the portion of the purported copy of the set of media data is valid may further include, at 1020, determining that the candidate cryptographic representation matches a trusted cryptographic representation, the trusted cryptographic representation included in the immutable ledger and based on the corresponding portion of the set of media data. The operations of 1020 may be performed according to the techniques described herein. In some examples, aspects of the operations of 1015 may be performed by a validation component 720 as described with reference to FIGS. 7 to 8.

At 1025, the method may include encoding, by the first computer system and based on determining that at least the portion of the purported copy of the set of media data is valid, at least the portion of the purported copy of the set of media data in accordance with a second encoding scheme that is different from the first encoding scheme to obtain a re-encoded version of the set of media data, the re-encoded version of the set of media data including a re-encoded version of the portion of the set of media data. The operations of 1025 may be performed according to the techniques described herein. In some examples, aspects of the operations of 1025 may be performed by a duplication component 725 as described with reference to FIGS. 7 to 8.

At 1030, the method may include creating, by the first computer system, one or more cryptographic representations of the re-encoded version of the set of media data. The operations of 1030 may be performed according to the techniques described herein. In some examples, aspects of the operations of 1030 may be performed by a duplication component 725 as described with reference to FIGS. 7 to 8.

At 1035, the method may include writing the one or more cryptographic representations of the re-encoded version of the set of media data to an immutable ledger. The operations of 1035 may be performed according to the techniques described herein. In some examples, aspects of the operations of 1035 may be performed by a ledger component 715 as described with reference to FIGS. 7 to 8.

Figure 11:
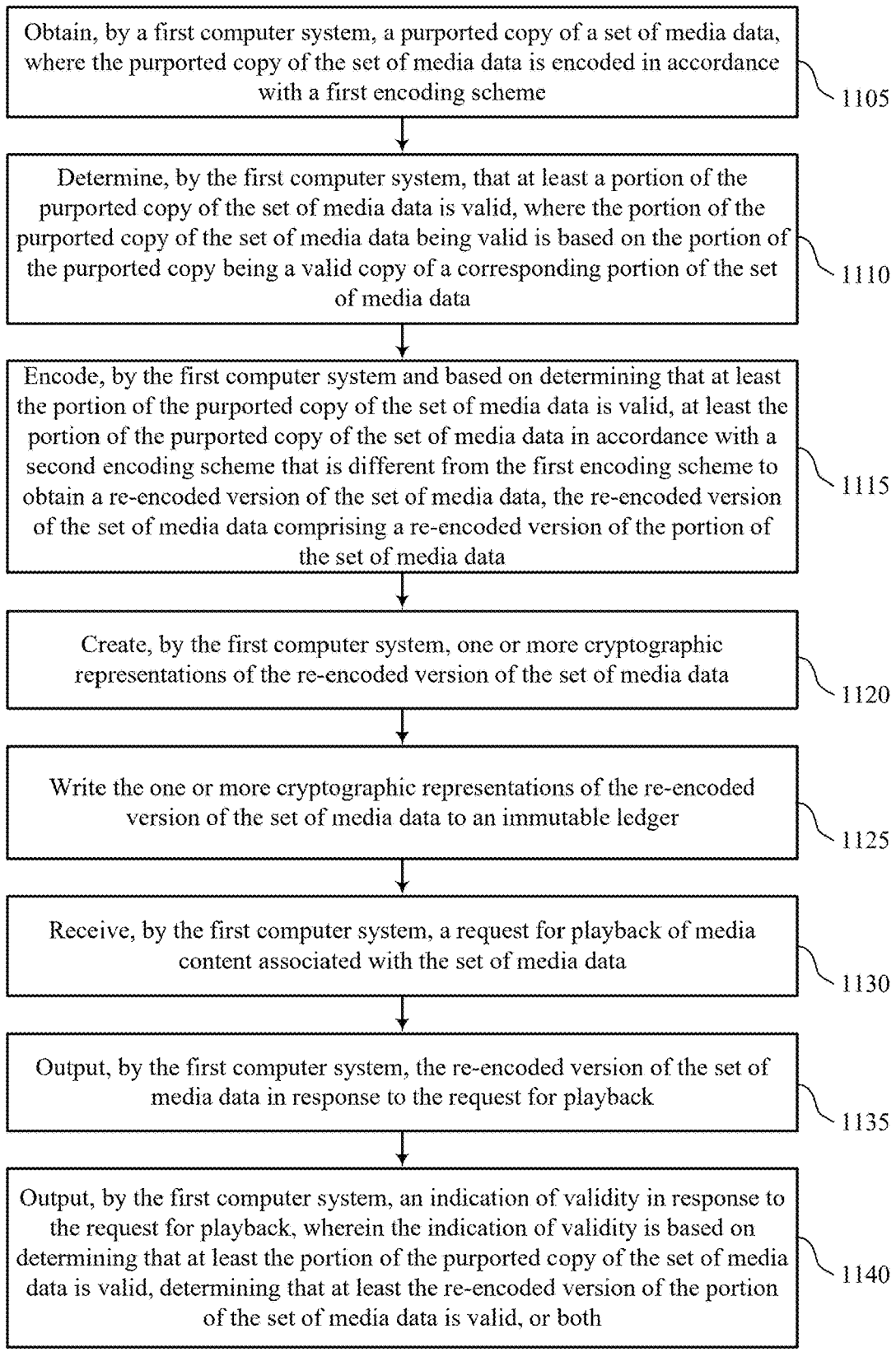

FIG. 11 shows a flowchart illustrating a method 1100 that supports ledger-based validation and re-encoding of media data in accordance with aspects of the present disclosure. The operations of method 1100 may be implemented by a media platform 140 or its components as described herein. For example, the operations of method 1100 may be performed by a media platform manager as described with reference to FIGS. 7 to 8. In some examples, a media platform 140 may execute a set of instructions to control the functional elements of the media platform 140 to perform the functions described below. Additionally or alternatively, a media platform 140 may perform aspects of the functions described below using special-purpose hardware.

At 1105, the method may include obtaining, by a first computer system, a purported copy of a set of media data, where the purported copy of the set of media data is encoded in accordance with a first encoding scheme. The operations of 1105 may be performed according to the techniques described herein. In some examples, aspects of the operations of 1105 may be performed by an intake component 710 as described with reference to FIGS. 7 to 8.

At 1110, the method may include determining, by the first computer system, that at least a portion of the purported copy of the set of media data is valid, where the portion of the purported copy of the set of media data being valid is based on the portion of the purported copy being a valid copy of a corresponding portion of the set of media data. The operations of 1110 may be performed according to the techniques described herein. In some examples, aspects of the operations of 1110 may be performed by a validation component 720 as described with reference to FIGS. 7 to 8.

At 1115, the method may include encoding, by the first computer system and based on determining that at least the portion of the purported copy of the set of media data is valid, at least the portion of the purported copy of the set of media data in accordance with a second encoding scheme that is different from the first encoding scheme to obtain a re-encoded version of the set of media data, the re-encoded version of the set of media data including a re-encoded version of the portion of the set of media data. The operations of 1115 may be performed according to the techniques described herein. In some examples, aspects of the operations of 1115 may be performed by a duplication component 725 as described with reference to FIGS. 7 to 8.

At 1120, the method may include creating, by the first computer system, one or more cryptographic representations of the re-encoded version of the set of media data. The operations of 1120 may be performed according to the techniques described herein. In some examples, aspects of the operations of 1120 may be performed by a duplication component 725 as described with reference to FIGS. 7 to 8.

At 1125, the method may include writing the one or more cryptographic representations of the re-encoded version of the set of media data to an immutable ledger. The operations of 1125 may be performed according to the techniques described herein. In some examples, aspects of the operations of 1125 may be performed by a ledger component 715 as described with reference to FIGS. 7 to 8.

At 1130, the method may include receiving, by the first computer system, a request for playback of media content associated with the set of media data. The operations of 1130 may be performed according to the techniques described herein. In some examples, aspects of the operations of 1130 may be performed by a playback component 735 as described with reference to FIGS. 7 to 8.

At 1135, the method may include outputting, by the first computer system, the re-encoded version of the set of media data in response to the request for playback. The operations of 1135 may be performed according to the techniques described herein. In some examples, aspects of the operations of 1135 may be performed by a playback component 735 as described with reference to FIGS. 7 to 8.

At 1140, the method may include outputting, by the first computer system, an indication of validity in response to the request for playback, where the indication of validity is based on determining that at least the portion of the purported copy of the set of media data is valid, determining that at least the re-encoded version of the portion of the set of media data is valid, or both. The operations of 1140 may be performed according to the techniques described herein. In some examples, aspects of the operations of 1140 may be performed by a playback component 735 as described with reference to FIGS. 7 to 8.

It should be noted that the methods described above describe possible implementations, and that the operations and the steps may be rearranged or otherwise modified and that other implementations are possible. Further, aspects from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, a graphics processing unit (GPU), a neural processing unit (NPU), an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk, and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," and "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components." Also, as used herein, the phrase "a set" shall be construed as including the possibility of a set with one member. That is, the phrase "a set" shall be construed in the same manner as "one or more.'" to support this interpretation.

The term "determine" or "determining" encompasses a variety of actions and, therefore, "determining" can include calculating, computing, processing, deriving, investigating, looking up (such as via looking up in a table, a database, or another data structure), ascertaining, and the like. Also, "determining" can include receiving (e.g., receiving information), accessing (e.g., accessing data stored in memory), and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label or other subsequent reference label.

The description set forth herein, in connection with the appended drawings, describes example configurations and does not represent all the examples that may be implemented or that are within the scope of the claims. The term "example" used herein means "serving as an example, instance, or illustration" and not "preferred" or "advantageous over other examples." The detailed description includes specific details for the purpose of providing an understanding of the described techniques. These techniques, however, may be practiced without these specific details. In some figures, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method, comprising:
   obtaining, by a first computer system, a purported copy of a set of media data, wherein the purported copy of the set of media data is encoded in accordance with a first encoding scheme;
   determining, by the first computer system, that at least a first portion of the purported copy of the set of media data is valid, wherein the first portion of the purported copy of the set of media data being valid is based at least in part on the first portion of the purported copy being a valid copy of a corresponding first portion of the set of media data;
   determining, by the first computer system, that a second portion of the purported copy of the set of media data is invalid, wherein the second portion of the purported copy of the set of media data being invalid is based at least in part on the second portion of the purported copy not being a valid copy of a corresponding second portion of the set of media data;
   encoding, by the first computer system and based at least in part on determining that at least the first portion of the purported copy of the set of media data is valid, at least the first portion of the purported copy of the set of media data in accordance with a second encoding scheme that is different from the first encoding scheme to obtain a re-encoded version of the set of media data, wherein encoding at least the first portion of the purported copy of the set of media data in accordance with the second encoding scheme is dependent upon at least a portion of the purported copy of the set of media data being valid, wherein the re-encoded version of the set of media data comprises a re-encoded version of the first portion of the set of media data, and wherein encoding at least the first portion of the purported copy of the set of media data in accordance with the second encoding scheme comprises:
      encoding, by the first computer system and despite determining that the second portion of the purported copy of the set of media data is invalid, the second portion of the purported copy of the set of media data in accordance with the second encoding scheme to obtain a re-encoded version of the second portion of the purported copy of the set of media data;

creating, by the first computer system, one or more cryptographic representations of the re-encoded version of the set of media data, wherein creating the one or more cryptographic representations of the re-encoded version of the set of media data comprises:

refraining, by the first computer system and based at least in part on determining that the second portion of the purported copy of the set of media data is invalid, from creating a cryptographic representation of the re-encoded version of the second portion of the purported copy of the set of media data; and writing the one or more cryptographic representations of the re-encoded version of the set of media data to an immutable ledger.

2. The method of claim 1, wherein:

storing at the first computer system, outputting to a third computer system separate from the first computer system, or writing to the immutable ledger, an indication that the re-encoded version of the second portion of the purported copy of the set of media data is invalid.

3. The method of claim 1, wherein the purported copy of the set of media data comprises a plurality of portions, and wherein encoding at least the first portion of the purported copy of the set of media data in accordance with the second encoding scheme is based at least in part on determining that at least a threshold quantity of portions from among the plurality of portions each comprise a valid copy of a respective portion of the set of media data.

4. The method of claim 1, further comprising:

encoding, by the first computer system and based at least in part on determining that at least the first portion of the purported copy of the set of media data is valid, at least the first portion of the purported copy of the set of media data in accordance with a third encoding scheme that is different from the first encoding scheme and the second encoding scheme to obtain a second re-encoded version of the set of media data, the second re-encoded version of the set of media data comprising a second re-encoded version of the first portion of the set of media data;

creating, by the first computer system, one or more cryptographic representations of the second re-encoded version of the set of media data; and writing the one or more cryptographic representations of the second re-encoded version of the set of media data to the immutable ledger.

5. The method of claim 1, wherein determining that at least the first portion of the purported copy of the set of media data is valid comprises:

creating, by the first computer system, a candidate cryptographic representation based at least in part on the first portion of the purported copy of the set of media data; and determining that the candidate cryptographic representation matches a trusted cryptographic representation, the trusted cryptographic representation included in the immutable ledger and based at least in part on the corresponding first portion of the set of media data.

6. The method of claim 5, wherein determining that the candidate cryptographic representation matches the trusted cryptographic representation comprises:

receiving, by the first computer system, the trusted cryptographic representation from a second computer system associated with the immutable ledger; and comparing, by the first computer system, the candidate cryptographic representation and the trusted cryptographic representation.

7. The method of claim 5, wherein determining that the candidate cryptographic representation matches the trusted cryptographic representation comprises:

transmitting, by the first computer system, the candidate cryptographic representation to a second computer system associated with the immutable ledger; and receiving, by the first computer system from the second computer system, an indication that the candidate cryptographic representation matches the trusted cryptographic representation.

8. The method of claim 1, wherein the first encoding scheme is in accordance with a first codec and the second encoding scheme is in accordance with a second codec that is different than the first codec.

9. The method of claim 1, wherein the first encoding scheme is in accordance with a first file format and the second encoding scheme is in accordance with a second file format that is different than the first file format.

10. The method of claim 1, wherein the first encoding scheme is associated with a first compression ratio and the second encoding scheme is associated with a second compression ratio that is different than the first compression ratio.

11. The method of claim 1, wherein the first encoding scheme comprises a first encryption scheme and the second encoding scheme comprises a second encryption scheme that is different than the first encryption scheme.

12. The method of claim 1, wherein the second encoding scheme is associated with at least one of a different resolution, a different bit rate, or a different aspect ratio than the first encoding scheme.

13. The method of claim 1, further comprising:

causing, by the first computer system, the re-encoded version of the set of media data to be stored at a target computer system, wherein the target computer system comprises the first computer system or a different computer system, and wherein the re-encoded version of the set of media data is available for playback or distribution based at least in part on being stored at the target computer system.

14. The method of claim 1, further comprising:

receiving, by the first computer system, a request for playback of media content associated with the set of media data; and outputting, by the first computer system, the re-encoded version of the set of media data in response to the request for playback.

15. The method of claim 14, further comprising:

outputting, by the first computer system, an indication of validity in response to the request for playback, wherein the indication of validity is based at least in part on determining that at least the first portion of the purported copy of the set of media data is valid, determining that at least the re-encoded version of the first portion of the set of media data is valid, or both.

16. A method, comprising:

obtaining, by a first computer system, a purported copy of a set of media data, wherein the purported copy of the set of media data is encoded in accordance with a first encoding scheme;

determining, by the first computer system, that at least a first portion of the purported copy of the set of media data is valid, wherein the first portion of the purported copy of the set of media data being valid is based at least in part on the first portion of the purported copy being a valid copy of a corresponding first portion of the set of media data;

determining, by the first computer system, that a second portion of the purported copy of the set of media data is invalid, wherein the second portion of the purported copy of the set of media data being invalid is based at least in part on the second portion of the purported copy not being a valid copy of a corresponding second portion of the set of media data;

encoding, by the first computer system and based at least in part on determining that at least the first portion of the purported copy of the set of media data is valid, at least the first portion of the purported copy of the set of media data in accordance with a second encoding scheme that is different from the first encoding scheme to obtain a re-encoded version of the set of media data, wherein encoding at least the first portion of the purported copy of the set of media data in accordance with the second encoding scheme is dependent upon at least a portion of the purported copy of the set of media data being valid, wherein the re-encoded version of the set of media data comprises a re-encoded version of the first portion of the set of media data, and wherein encoding at least the first portion of the purported copy of the set of media data in accordance with the second encoding scheme comprises:

refraining, by the first computer system and based at least in part on determining that the second portion of the purported copy of the set of media data is invalid, from encoding the second portion of the purported copy of the set of media data in accordance with the second encoding scheme;

creating, by the first computer system, one or more cryptographic representations of the re-encoded version of the set of media data; and writing the one or more cryptographic representations of the re-encoded version of the set of media data to an immutable ledger.

17. The method of claim 1, wherein writing the one or more cryptographic representations of the re-encoded version of the set of media data to the immutable ledger comprises:

outputting the one or more cryptographic representations from the first computer system to a second computer system, wherein the second computer system is configured to write the one or more cryptographic representations to the immutable ledger, the immutable ledger being remote from the first computer system.

18. The method of claim 1, wherein the immutable ledger comprises a blockchain.

19. The method of claim 16, wherein creating the one or more cryptographic representations of the re-encoded version of the set of media data comprises:

creating, for one or more portions of the re-encoded version of the set of media data, a respective cryptographic representation of each of the one or more portions of the re-encoded version of the set of media data.

20. An apparatus, comprising:

one or more memories storing processor-executable code; and one or more processors coupled with the one or more memories, the one or more processors individually or collectively operable to execute the code to cause the apparatus to:

obtain, by a first computer system, a purported copy of a set of media data, wherein the purported copy of the set of media data is encoded in accordance with a first encoding scheme;

determine, by the first computer system, that at least a first portion of the purported copy of the set of media data is valid, wherein the first portion of the purported copy of the set of media data being valid is based at least in part on the first portion of the purported copy being a valid copy of a corresponding first portion of the set of media data;

determine, by the first computer system, that a second portion of the purported copy of the set of media data is invalid, wherein the second portion of the purported copy of the set of media data being invalid is based at least in part on the second portion of the purported copy not being a valid copy of a corresponding second portion of the set of media data;

encode, by the first computer system and based at least in part on determining that at least the first portion of the purported copy of the set of media data is valid, at least the first portion of the purported copy of the set of media data in accordance with a second encoding scheme that is different from the first encoding scheme to obtain a re-encoded version of the set of media data, wherein encoding at least the first portion of the purported copy of the set of media data in accordance with the second encoding scheme is dependent upon at least a portion of the purported copy of the set of media data being valid, | wherein the re-encoded version of the set of media data comprises a re-encoded version of the first portion of the set of media data, and wherein, to encode at least the first portion of the purported copy of the set of media data in accordance with the second encoding scheme, the one or more processors are individually or collectively operable to execute the code to cause the apparatus to:

encode, by the first computer system and despite determining that the second portion of the purported copy of the set of media data is invalid, the second portion of the purported copy of the set of media data in accordance with the second encoding scheme to obtain a re-encoded version of the second portion of the purported copy of the set of media data;

create, by the first computer system, one or more cryptographic representations of the re-encoded version of the set of media data, wherein, to create the one or more cryptographic representations of the re-encoded version of the set of media data, the one or more processors are individually or collectively operable to execute the code to cause the apparatus to:

refrain, by the first computer system and based at least in part on determining that the second portion of the purported copy of the set of media data is invalid, from creating a cryptographic representation of the re-encoded version of the second portion of the purported copy of the set of media data; and write the one or more cryptographic representations of the re-encoded version of the set of media data to an immutable ledger.

21. The apparatus of claim 20, wherein the one or more processors are individually or collectively further operable to execute the code to cause the apparatus to:
store at the first computer system, output to a third computer system separate from the first computer system, or write to the immutable ledger, an indication that the re-encoded version of the second portion of the purported copy of the set of media data is invalid.

22. The apparatus of claim 20, wherein the purported copy of the set of media data comprises a plurality of portions, and wherein the one or more processors are individually or collectively operable to execute the code to cause the apparatus to encode at least the first portion of the purported copy of the set of media data in accordance with the second encoding scheme is based at least in part on determining that at least a threshold quantity of portions from among the plurality of portions comprises a valid copy of a respective portion of the set of media data.

23. The apparatus of claim 20, wherein the one or more processors are individually or collectively further operable to execute the code to cause the apparatus to:
encode, by the first computer system and based at least in part on determining that at least the first portion of the purported copy of the set of media data is valid, at least the first portion of the purported copy of the set of media data in accordance with a third encoding scheme that is different from the first encoding scheme and the second encoding scheme to obtain a second re-encoded version of the set of media data, the second re-encoded version of the set of media data comprising a second re-encoded version of the first portion of the set of media data;
create, by the first computer system, one or more cryptographic representations of the second re-encoded version of the set of media data; and
write the one or more cryptographic representations of the second re-encoded version of the set of media data to the immutable ledger.

24. The apparatus of claim 20, wherein, to determine that at least the first portion of the purported copy of the set of media data is valid, the one or more processors are individually or collectively operable to execute the code to cause the apparatus to:
create, by the first computer system, a candidate cryptographic representation based at least in part on the first portion of the purported copy of the set of media data; and
determine that the candidate cryptographic representation matches a trusted cryptographic representation, the trusted cryptographic representation included in the immutable ledger and based at least in part on the corresponding first portion of the set of media data.

25. The apparatus of claim 20, wherein the one or more processors are individually or collectively further operable to execute the code to cause the apparatus to:
receive, by the first computer system, a request for playback of media content associated with the set of media data; and
output, by the first computer system, the re-encoded version of the set of media data in response to the request for playback.

26. An apparatus, comprising:
one or more memories storing processor-executable code; and
one or more processors coupled with the one or more memories, the one or more processors individually or collectively operable to execute the code to cause the apparatus to:
obtain, by a first computer system, a purported copy of a set of media data, wherein the purported copy of the set of media data is encoded in accordance with a first encoding scheme;
determine, by the first computer system, that at least a first portion of the purported copy of the set of media data is valid, wherein the first portion of the purported copy of the set of media data being valid is based at least in part on the first portion of the purported copy being a valid copy of a corresponding first portion of the set of media data;
determine, by the first computer system, that a second portion of the purported copy of the set of media data is invalid, wherein the second portion of the purported copy of the set of media data being invalid is based at least in part on the second portion of the purported copy not being a valid copy of a corresponding second portion of the set of media data;
encode, by the first computer system and based at least in part on determining that at least the first portion of the purported copy of the set of media data is valid, at least the first portion of the purported copy of the set of media data in accordance with a second encoding scheme that is different from the first encoding scheme to obtain a re-encoded version of the set of media data, wherein encoding at least the first portion of the purported copy of the set of media data in accordance with the second encoding scheme is dependent upon at least a portion of the purported copy of the set of media data being valid, wherein the re-encoded version of the set of media data comprises a re-encoded version of the first portion of the set of media data, and wherein, to encode at least the first portion of the purported copy of the set of media data in accordance with the second encoding scheme, the one or more processors are individually or collectively operable to execute the code to cause the apparatus to:
refrain, by the first computer system and based at least in part on determining that the second portion of the purported copy of the set of media data is invalid, from encoding the second portion of the purported copy of the set of media data in accordance with the second encoding scheme;
create, by the first computer system, one or more cryptographic representations of the re-encoded version of the set of media data; and
write the one or more cryptographic representations of the re-encoded version of the set of media data to an immutable ledger.

27. An apparatus, comprising:
means for obtaining, by a first computer system, a purported copy of a set of media data, wherein the purported copy of the set of media data is encoded in accordance with a first encoding scheme;
means for determining, by the first computer system, that at least a first portion of the purported copy of the set of media data is valid, wherein the first portion of the purported copy of the set of media data being valid is based at least in part on the first portion of the purported copy being a valid copy of a corresponding first portion of the set of media data;

means for determining, by the first computer system, that a second portion of the purported copy of the set of media data is invalid, wherein the second portion of the purported copy of the set of media data being invalid is based at least in part on the second portion of the purported copy not being a valid copy of a corresponding second portion of the set of media data;

means for encoding, by the first computer system and based at least in part on determining that at least the first portion of the purported copy of the set of media data is valid, at least the first portion of the purported copy of the set of media data in accordance with a second encoding scheme that is different from the first encoding scheme to obtain a re-encoded version of the set of media data, wherein encoding at least the first portion of the purported copy of the set of media data in accordance with the second encoding scheme is dependent upon at least a portion of the purported copy of the set of media data being valid, | wherein the re-encoded version of the set of media data comprises a re-encoded version of the first portion of the set of media data, and wherein the means for encoding at least the first portion of the purported copy of the set of media data in accordance with the second encoding scheme comprises;

means for encoding, by the first computer system and despite determining that the second portion of the purported copy of the set of media data is invalid, the second portion of the purported copy of the set of media data in accordance with the second encoding scheme to obtain a re-encoded version of the second portion of the purported copy of the set of media data;

means for creating, by the first computer system, one or more cryptographic representations of the re-encoded version of the set of media data, wherein the means for creating the one or more cryptographic representations of the re-encoded version of the set of media data comprises:

means for refraining, by the first computer system and based at least in part on determining that the second portion of the purported copy of the set of media data is invalid, from creating a cryptographic representation of the re-encoded version of the second portion of the purported copy of the set of media data; and means for writing the one or more cryptographic representations of the re-encoded version of the set of media data to an immutable ledger.

28. A non-transitory computer-readable medium storing code, the code comprising instructions executable by one or more processors to:

obtain, by a first computer system, a purported copy of a set of media data, wherein the purported copy of the set of media data is encoded in accordance with a first encoding scheme;

determine, by the first computer system, that at least a first portion of the purported copy of the set of media data is valid, wherein the first portion of the purported copy of the set of media data being valid is based at least in part on the first portion of the purported copy being a valid copy of a corresponding first portion of the set of media data;

determine, by the first computer system, that a second portion of the purported copy of the set of media data is invalid, wherein the second portion of the purported copy of the set of media data being invalid is based at least in part on the second portion of the purported copy not being a valid copy of a corresponding second portion of the set of media data;

encode, by the first computer system and based at least in part on determining that at least the first portion of the purported copy of the set of media data is valid, at least the first portion of the purported copy of the set of media data in accordance with a second encoding scheme that is different from the first encoding scheme to obtain a re-encoded version of the set of media data, wherein encoding at least the first portion of the purported copy of the set of media data in accordance with the second encoding scheme is dependent upon at least a portion of the purported copy of the set of media data being valid, wherein the re-encoded version of the set of media data comprises a re-encoded version of the first portion of the set of media data, and wherein, to encode at least the first portion of the purported copy of the set of media data in accordance with the second encoding scheme, the instructions are executable by one or more processors to:

encode, by the first computer system and despite determining that the second portion of the purported copy of the set of media data is invalid, the second portion of the purported copy of the set of media data in accordance with the second encoding scheme to obtain a re-encoded version of the second portion of the purported copy of the set of media data;

create, by the first computer system, one or more cryptographic representations of the re-encoded version of the set of media data, wherein, to create the one or more cryptographic representations of the re-encoded version of the set of media data, the instructions are executable by one or more processors to:

refrain, by the first computer system and based at least in part on determining that the second portion of the purported copy of the set of media data is invalid, from creating a cryptographic representation of the re-encoded version of the second portion of the purported copy of the set of media data; and write the one or more cryptographic representations of the re-encoded version of the set of media data to an immutable ledger.

29. An apparatus, comprising:

means for obtaining, by a first computer system, a purported copy of a set of media data, wherein the purported copy of the set of media data is encoded in accordance with a first encoding scheme;

means for determining, by the first computer system, that at least a first portion of the purported copy of the set of media data is valid, wherein the first portion of the purported copy of the set of media data being valid is based at least in part on the first portion of the purported copy being a valid copy of a corresponding first portion of the set of media data;

means for determining, by the first computer system, that a second portion of the purported copy of the set of media data is invalid, wherein the second portion of the purported copy of the set of media data being invalid is based at least in part on the second portion of the purported copy not being a valid copy of a corresponding second portion of the set of media data;

means for encoding, by the first computer system and based at least in part on determining that at least the first portion of the purported copy of the set of media data is valid, at least the first portion of the purported copy of the set of media data in accordance with a second encoding scheme that is different from the first encoding scheme to obtain a re-encoded version of the set of media data, wherein encoding at least the first portion of the purported copy of the set of media data in accordance with the second encoding scheme is dependent upon at least a portion of the purported copy of the set of media data being valid, wherein the re-encoded version of the set of media data comprises a re-encoded version of the first portion of the set of media data, and wherein the means for encoding at least the first portion of the purported copy of the set of media data in accordance with the second encoding scheme comprises:

means for refraining, by the first computer system and based at least in part on determining that the second portion of the purported copy of the set of media data is invalid, from encoding the second portion of the purported copy of the set of media data in accordance with the second encoding scheme;

means for creating, by the first computer system, one or more cryptographic representations of the re-encoded version of the set of media data; and means for writing the one or more cryptographic representations of the re-encoded version of the set of media data to an immutable ledger.

30. A non-transitory computer-readable medium storing code, the code comprising instructions executable by one or more processors to:

obtain, by a first computer system, a purported copy of a set of media data, wherein the purported copy of the set of media data is encoded in accordance with a first encoding scheme;

determine, by the first computer system, that at least a first portion of the purported copy of the set of media data is valid, wherein the first portion of the purported copy of the set of media data being valid is based at least in part on the first portion of the purported copy being a valid copy of a corresponding first portion of the set of media data;

determine, by the first computer system, that a second portion of the purported copy of the set of media data is invalid, wherein the second portion of the purported copy of the set of media data being invalid is based at least in part on the second portion of the purported copy not being a valid copy of a corresponding second portion of the set of media data;

encode, by the first computer system and based at least in part on determining that at least the first portion of the purported copy of the set of media data is valid, at least the first portion of the purported copy of the set of media data in accordance with a second encoding scheme that is different from the first encoding scheme to obtain a re-encoded version of the set of media data, wherein encoding at least the first portion of the purported copy of the set of media data in accordance with the second encoding scheme is dependent upon at least a portion of the purported copy of the set of media data being valid, wherein the re-encoded version of the set of media data comprises a re-encoded version of the first portion of the set of media data, and wherein, to encode at least the first portion of the purported copy of the set of media data in accordance with the second encoding scheme, the instructions are executable by one or more processors to:

refrain, by the first computer system and based at least in part on determining that the second portion of the purported copy of the set of media data is invalid, from encoding the second portion of the purported copy of the set of media data in accordance with the second encoding scheme;

create, by the first computer system, one or more cryptographic representations of the re-encoded version of the set of media data; and write the one or more cryptographic representations of the re-encoded version of the set of media data to an immutable ledger.

* * * * *